United States Patent
Anyashiki et al.

[11] Patent Number: 6,136,455
[45] Date of Patent: Oct. 24, 2000

[54] COATING COMPOSITION FOR PRECOATED STEEL SHEET, PRECOATED STEEL SHEET, AND PROCESS FOR PREPARING THE SAME

[75] Inventors: Takashi Anyashiki; Keiji Yoshida; Masaru Sagiyama; Masaaki Yamashita; Yasuyuki Kajita; Hiroyuki Kato; Kenichi Sasaki; Keiichi Kotani; Yasuhiro Toyoda, all of Tokyo; Mamoru Ehara, Yokohama; Katsuyoshi Tanaka, Kawaguchi, all of Japan

[73] Assignee: NKK Corporation, Tokyo, Japan

[21] Appl. No.: 09/155,275

[22] PCT Filed: Jan. 28, 1998

[86] PCT No.: PCT/JP98/00350

§ 371 Date: Oct. 22, 1998

§ 102(e) Date: Oct. 22, 1998

[87] PCT Pub. No.: WO98/32808

PCT Pub. Date: Jul. 30, 1998

[30] Foreign Application Priority Data

| Jan. 28, 1997 | [JP] | Japan | 9-28548 |
| Jan. 28, 1997 | [JP] | Japan | 9-28549 |
| Mar. 21, 1997 | [JP] | Japan | 9-87388 |
| Jan. 27, 1998 | [JP] | Japan | 10-29240 |
| Jan. 27, 1998 | [JP] | Japan | 10-29241 |
| Jan. 27, 1998 | [JP] | Japan | 10-29242 |

[51] Int. Cl.⁷ .................................................. B32B 15/00
[52] U.S. Cl. ................ 428/659; 428/425.8; 428/458; 428/422; 428/484; 427/379; 427/409; 525/440; 525/437; 528/45; 528/176; 528/272; 528/298; 528/307
[58] Field of Search ................ 528/45, 176, 272, 528/298, 307; 525/437, 440; 428/480, 481, 458, 423.1, 425.8, 422, 484, 659; 427/409, 379, 410

[56] References Cited

U.S. PATENT DOCUMENTS 5,817,731  10/1998  Yoshida et al. .................... 528/45

FOREIGN PATENT DOCUMENTS

| 57-10375 | 1/1982 | Japan . |
| 7-233349 | 9/1995 | Japan . |
| 7-316497 | 12/1995 | Japan . |
| 7-316498 | 12/1995 | Japan . |

*Primary Examiner*—Paul Thibodeau
*Assistant Examiner*—Ramsey Zacharia
*Attorney, Agent, or Firm*—Neilds & Lemack

[57] ABSTRACT

The invention relates to a thermosetting coating composition for precoated steel sheets which are required to have high hardness, good workability and stain resistance, to a precoated steel sheet having a film of the coating composition, and to a method for producing such precoated steel sheets. The coating composition for precoated steel sheets of the invention consists essentially of a polyol and contains a specific compound and a curing agent composed of polyisocyanate compounds added thereto, in which the curing agent is a mixture composed of a blocked polyisocyanate compound as obtained by blocking one or more polyisocyanate compounds selected from polyisocyanates of the following group (a) and their derivatives, and a blocked polyisocyanate compound as obtained by blocking one or more polyisocyanate compounds selected from polyisocyanates of the following group (b) and their derivatives:

(a) 4,4'-diphenylmethane diisocyanate, isophorone diisocyanate, tolylene diisocyanate, xylylene diisocyanate, naphthalene-1,5-diisocyanate;

(b) hexamethylene diisocyanate, trimethylhexamethylene diisocyanate, hydrogenated 4,4'-diphenylmethane diisocyanate, hydrogenated tolylene diisocyanate, hydrogenated xylylene diisocyanate.

The coating composition forms a coating film having good workability, high hardness and good stain resistance.

16 Claims, 1 Drawing Sheet

COATING COMPOSITION FOR PRECOATED STEEL SHEET, PRECOATED STEEL SHEET, AND PROCESS FOR PREPARING THE SAME

TECHNICAL FIELD OF THE INVENTION

The present invention relates to a thermosetting coating composition for precoated steel sheets which are required to have high hardness, good workability and stain resistance, to a precoated steel sheet having a film of the coating composition, and to a method for producing such precoated steel sheets. The precoated steel sheet of the invention is suitable for use in household electric appliances and as construction materials, and also can be used in producing vehicles.

BACKGROUND ART

Coating compositions for precoated steel sheets are required to have various properties, such as high hardness, good workability, stain resistance, chemical resistance, water-proofness and distinction of image. Of these, the hardness and the workability are important characteristics, which, however, are contradictory to each other but the levels of which are required to be high. The workability as referred to herein indicates that, when flat, precoated steel sheets are worked into various shaped structures through bending, cutting or drawing, the paint films are damaged slightly. Therefore, it shall be said that the larger the degrees of elongation and flexibility of paint films themselves, the better the workability of the paint films. In particular, the bending workability (flexibility) of paint films varies, depending on the thickness of the steel sheets coated with the films.

In the T-shape bending test (according to 12.2.2 in JIS G3312) which is generally used in evaluating the flexibility of precoated steel sheets, a precoated steel sheet to be tested is bent, with putting a plural number, n, of specimen plates all having the same thickness inside the sheet being bent, and the bent part of the sheet is observed under a magnifier as to whether or not the paint film on that part is cracked. In the test, the smallest number of the specimen plates as put inside the precoated steel sheet being tested with no paint film cracking is determined as 1T, 2T, and this indicates the tested steel sheet flexibility. In this T-shape bending work, the degree of elongation of the outermost periphery of the sheet being bent is represented by the following equation:

$$\epsilon = (t/2)/(r+t/2)$$

wherein;
$\epsilon$=elongation strain of the outermost periphery (%),
t=thickness (mm),
r=R(radius of curvature) at the inside of the bent part (mm).

Accordingly, where precoated steel sheets as tested in the T-shape bending test give the same value, those having a thinner thickness shall have a larger elongation strain (%) at their outermost periphery and have a smaller curvature at their bent part, indicating that they have good workability.

To evaluate the workability of precoated steel sheets, the T-shape bending test noted above is generally employed. However, stamping and roll forming which are generally effected in industrial production of household electric appliances by manufacturers differ from the working in the T-shape bending test in the working history and the working speed, and the former require severer working conditions than the latter. The working history includes the working steps up to the final working level. For precoated steel sheets worked up to the same final working level, those as worked to have a large value R in the initial working stage shall receive a small degree of stress at their paint films as the strain resulting from the initial working may disperse throughout the part as bent to have the value R, while those as worked to have a small value R in the initial working stage shall receive a large degree of stress at their paint films as the strain resulting from the initial working may concentrate in the limited area of the part as bent to have the value R. Therefore, as compared with precoated steel sheets tested in the T-shape being test comprising U-shape bending followed by contact bending, those as tested by V-shape bending followed by contact bending shall receive a larger degree of stress at their paint films even though they are all worked up to the same final working level. Accordingly, the latter testing method is useful for simple evaluation of severe working.

On the other hand, it is desirable that the hardness of paint films is higher in order to make them have higher durability, while paint films having higher hardness tend to have lower workability.

In general, precoated steel sheets are required to have good corrosion resistance and good scratch resistance. The corrosion resistance indicates that, while the shaped articles of precoated steel sheets are used in the environment, the paint films do not peel off and the articles are rusted little or are not rusted at all. The scratch resistance indicates that, while precoated steel sheets are worked, they are hardly scratched due to friction with the parts of the working machine used to have shaping faults, and while the shaped articles of precoated steel sheets are conveyed, they are hardly scratched to have handling faults.

Regarding coating compositions for precoated steel sheets, polyester resins and epoxy resins have heretofore been used essentially in prime coating compositions for outside and in coating compositions for back sides, while polyester, acrylic or polyvinyl coating compositions in topcoating compositions for outside. Polyester resin coating compositions comprising a combination of polyester resins (main ingredients) and melamine compounds (curing agents) are the most typical as topcoating compositions for outside, in which the polyester resins give the workability and the melamine compounds give the hardness. However, their properties are not always satisfactory when they are used in precoated steel sheets which are required to have the highest level properties with severity, especially in those for household electric appliances, and therefore, the improvement in the properties of such topcoating compositions for outside is required.

For these requirements, various proposals such as those mentioned below have heretofore been made. For example, in Japanese Patent Application Laid-Open (JP-A) No. 6-234752, the film formation is tried by reacting a polyester resin with a melamine resin (curing agent) as modified to have orientability. They say that the coating film has high flexibility and high hardness.

In JP-A No. 7-233349, proposal is a coating composition for precoated steel sheets, which comprises a polyol as the essential ingredient and an isocyanate compound and/or an amino resin as the curing agent, to which is added a polyester compound as obtained by reacting essentially naphthalene-2,6-dicarboxylic acid and/or its lower alkyl ester with an alcohol component. The coating composition is intended to give a coating film having good workability and high hardness.

In JP-A No. 7-316497, proposal is a coating composition for precoated steel sheets, which comprises a polyol as the essential ingredient and an isocyanate compound and/or an amino resin as the curing agent, to which is added a polyester compound as obtained by reacting essentially 1,4-cyclohexane-dicarboxylic acid and/or its lower alkyl ester with an alcohol component. The coating composition is intended to give a coating film having good workability and high hardness.

In JP-A No. 7-316498, proposal is a coating composition for precoated steel sheets, which comprises a polyol as the essential ingredient and an isocyanate compound and/or an amino resin as the curing agent, to which is added a compound having a specific structure of the following chemical formula:

$$HO-(CH_2)_n-O-R-O-(CH_2)_n-OH$$

wherein n is an integer of from 2 to 10, and R represents

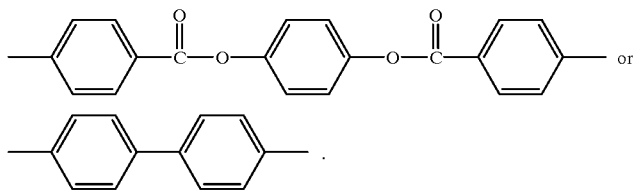

or

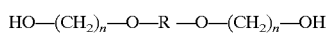

.

The coating composition is intended to give a coating film having good workability and high hardness.

Of those prior art techniques, one disclosed in JP-A No. 6-234752 is problematic in that, at present, it is difficult to produce practicable modified melamine resins on an industrial scale as the process for producing the resins is long.

The others disclosed in JP-A Nos. 7-233349, 7-316497 and 7-316498 are also problematic in that they are ineffective in improving the properties, including the stain resistance, of the coating films formed. Therefore, even though both the hardness and the workability of the coating films are good, the stain resistance thereof is poor; or if the hardness and the stain resistance of the coating films formed are good, the workability thereof is poor. Anyhow, according to the techniques disclosed, it is impossible to obtain coating films that satisfy all the requirements, hardness, workability and stain resistance.

To improve the scratch resistance of precoated steel sheets while they are worked, wax (lubricant) may be added to the coating films. Wax for this use includes, for example, natural wax such as carnauba wax and palm oil, and synthetic wax.

However, the conventional coating films containing such a lubricant are problematic in that (1) wax or the like lubricant existing on the surface of the films is peeled off, when contacted with other substances, thereby soiling the surface of the objects contacted with the films, (2) it coagulates, when contacted with water, thereby fogging the surface of the films, and (3) it forms cissing faults and eye holes on the surface of the films.

Given the situation, accordingly, one object of the present invention is to solve various problems in the prior art such as those mentioned hereinabove, and to provide a coating composition for precoated steel sheets which can form a coating film having both good workability and high hardness and additionally good stain resistance even on relatively thin steel sheets.

Another object of the invention is to provide a precoated steel sheet, of which the coating film has high hardness and good stain resistance and additionally such good workability that the coating film is hardly cracked even under severe working conditions.

Still another object of the invention is to provide a precoated steel sheet, of which the coating film has not only high hardness, good workability and good stain resistance, but also good corrosion resistance.

Still another object of the invention is to provide a precoated steel sheet, of which the coating film has not only high hardness, good workability and good stain resistance but also good scratch resistance, and is not fogged on its surface by coagulation of wax.

Still another object of the invention is to provide an inexpensive and efficient method for producing those precoated steel sheets noted above.

DISCLOSURE OF THE INVENTION

We, the present inventors have assiduously studied in order to obtain a coating composition for precoated steel sheets which has excellent properties and which therefore can solve the above-mentioned problems, and, as a result, have found that a coating composition consisting essentially of a polyol and containing a curing agent of a polyisocyanate compound and any of the following compounds (I) to (III), in which the curing agent comprises at least two blocked polyisocyanate compounds each selected from any of two groups of specific blocked polyisocyanate compounds, forms a coating film having good workability, high hardness and good stain resistance, and that the other properties including surface gloss of the coating film are also good.

(I) Polyester compounds to be obtained by reacting essentially naphthalene-2,6-dicarboxylic acid and/or its lower alkyl ester with an alcohol component. These polyester compounds comprise main repeating units of the following chemical formula:

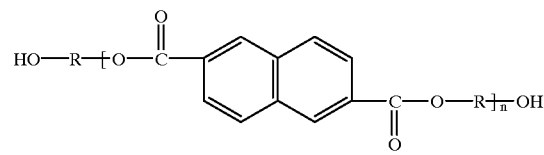

wherein n represents an integer; and R represents an alkylene group having 10 or less carbon atoms, or a 1,4-cyclohexylene-dimethylene group, or a neopentylene group, or a polyoxyalkylene group.

(II) Polyester compounds to be obtained by reacting essentially 1,4-cyclohexane-dicarboxylic acid and/or its lower alkyl ester with an alcohol component. These polyester compounds comprise main repeating units the following chemical formula:

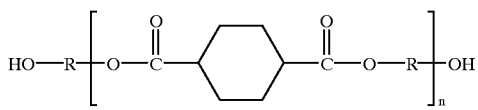

wherein n represents an integer; and R represents an alkylene group having 10 or less carbon atoms, or a 1,4-cyclohexylene-dimethyl group, or a neopentylene group, or a polyoxyalkylene group.

(III) Bifunctional compounds having a rigid dibenzoyloxy-p-phenylene or biphenyl skeleton and hydroxyl groups at the both terminals of the skeleton via an oxygen and a methylene chain. These bifunctional compounds have the structure of the following chemical formula:

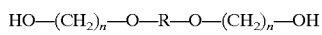

wherein n represents an integer of from 2 to 10; and R represents

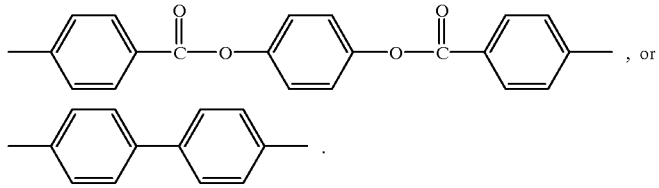

In addition, the inventors have further found that, as precoated steel sheets having the coating film of the specific coating composition noted above, preferred are those having a prime coating film and a topcoating film of the coating composition on the surface of a chemically-treated, zinc or zinc alloy plated steel sheet substrate, that the precoated steel sheets, of which the prime coating film has specifically-defined physical properties, have especially excellent workability, that the precoated steel sheets, of which the prime coating film contains a suitable amount of strontium chromate, have especially excellent corrosion resistance, and that the precoated steel sheets, of which the topcoating film contains a suitable amount of wax, have especially excellent scratch resistance and are hardly fogged on their surface by coagulation of wax.

The present invention has been achieved on the basis of these findings, and is characterized by the following constitutions.

[1] A coating composition for precoated steel sheets, which consists essentially of a resin component comprising the following i), ii) and iii):

i) from 1 to 15% by weight, relative to the solid resin content of the composition, of a polyester compound comprising main repeating units of a chemical formula:

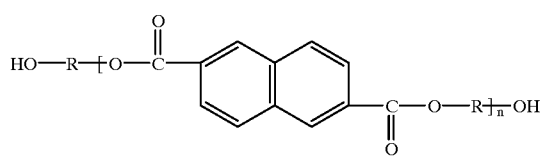

wherein n represents an integer; and R represents an alkylene group having 10 or less carbon atoms, or a 1,4-cyclohexylene-dimethylene group, or a neopentylene group, or a polyoxyalkylene group;

ii) a polyol except i); and iii) a curing agent of a mixture composed of a blocked polyisocyanate compound as obtained by blocking one or more polyisocyanate compounds selected from polyisocyanates of the following group (a) and their derivatives, and a blocked polyisocyanate compound as obtained by blocking one or more polyisocyanate compounds selected from polyisocyanates of the following group (b) and their derivatives:

(a) 4,4'-diphenylmethane diisocyanate, isophorone diisocyanate, tolylene diisocyanate, xylylene diisocyanate, naphthalene-1,5-diisocyanate;

(b) hexamethylene diisocyanate, trimethylhexamethylene diisocyanate, hydrogenated 4,4'-diphenylmethane diisocyanate, hydrogenated tolylene diisocyanate, hydrogenated xylylene diisocyanate.

[2] A coating composition for precoated steel sheets, which consists essentially of a resin component comprising the following i), ii) and iii):

i) from 1 to 18% by weight, relative to the solid resin content of the composition, of a polyester compound comprising main repeating units of a chemical formula:

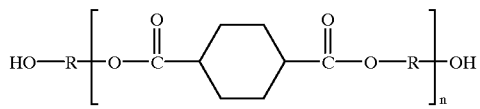

wherein n represents an integer; and R represents an alkylene group having 10 or less carbon atoms, or a 1,4-cyclohexylene-dimethyl group, or a neopentylene group, or a polyoxyalkylene group;

ii) a polyol except i); and iii) a curing agent of a mixture composed of a blocked polyisocyanate compound as obtained by blocking one or more polyisocyanate compounds selected from polyisocyanates of the following group (a) and their derivatives, and a blocked polyisocyanate compound as obtained by blocking one or more polyisocyanate compounds selected from polyisocyanates of the following group (b) and their derivatives:

(a) 4,4'-diphenylmethane diisocyanate, isophorone diisocyanate, tolylene diisocyanate, xylylene diisocyanate, naphthalene-1,5-diisocyanate;

(b) hexamethylene diisocyanate, trimethylhexamethylene diisocyanate, hydrogenated 4,4'-diphenylmethane diisocyanate, hydrogenated tolylene diisocyanate, hydrogenated xylylene diisocyanate.

[3] A coating composition for precoated steel sheets, which consists essentially of a resin component comprising the following i), ii) and iii):

i) from 1 to 15% by weight, relative to the solid resin content of the composition, of a compound of a chemical formula:

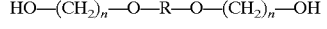

wherein n represents an integer of from 2 to 10; and R represents

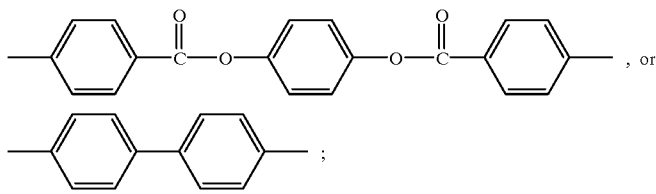, or ii) a polyol except i); and iii) a curing agent of a mixture composed of a blocked polyisocyanate compound as obtained by blocking one or more polyisocyanate compounds selected from polyisocyanates of the following group (a) and their derivatives, and a blocked polyisocyanate compound as obtained by blocking one or more polyisocyanate compounds selected from polyisocyanates of the following group (b) and their derivatives:

(a) 4,4[1]-diphenylmethane diisocyanate, isophorone diisocyanate, tolylene diisocyanate, xylylene diisocyanate, naphthalene-1,5-diisocyanate;

(b) hexamethylene diisocyanate, trimethylhexamethylene diisocyanate, hydrogenated 4,4'-diphenylmethane diisocyanate, hydrogenated tolylene diisocyanate, hydrogenated xylylene diisocyanate.

Preferred embodiments of the coating compositions of [1] to [3] noted above, precoated steel sheets having a coating film of the composition, and a method for producing them are mentioned below.

[4] A coating composition for precoated steel sheets of any one of [1] to [3], wherein the compositional ratio of the blocked polyisocyanate compound (A) as obtained by blocking one or more polyisocyanate compounds selected from polyisocyanates of the group (a) and their derivatives to the blocked polyisocyanate compound (B) as obtained by blocking one or more polyisocyanate compounds selected from polyisocyanates of the group (b) and their derivatives, (A)/(B), is from 70/30 to 30/70, in terms of the ratio by weight of the solid contents.

[5] A coating composition for precoated steel sheets of any one of [1] to [4], wherein the amount of the curing agent of iii) is so defined that the ratio by mol of the isocyanato groups, [NCO], in the curing agent to the total of the hydroxyl groups, [OH], in the polyester compound of i) and the polyol of ii), [NCO]/[OH], is from 0.8 to 1.2.

[6] A coating composition for precoated steel sheets of any one of [1] to [5], wherein the blocked polyisocyanate compound as obtained by blocking the polyisocyanate compound selected from polyisocyanates of the group (a) and their derivatives is any of isocyanurates, adducts and prepolymers, and the blocked polyisocyanate compound as obtained by blocking the polyisocyanate compound selected from polyisocyanates of the group (b) and their derivatives is any of burettes, isocyanurates, adducts and prepolymers.

[7] A coating composition for precoated steel sheets of any one of [1] to [6], wherein the polyol except i) comprises an acrylic resin having 2 or more hydroxyl groups in one molecule and having a number-average molecular weight of from 1500 to 12000, and/or a polyester resin having 2 or more hydroxyl groups in one molecule and having a number-average molecular weight of from 1000 to 8000.

[8] A precoated steel sheet having a coating film formed from a coating composition of any one of [1] to [7].

[9] A precoated steel sheet with high hardness and good workability, which has a prime coating film and a topcoating film formed on the chemically-treated surface of a zinc or zinc alloy plated steel sheet substrate and in which the topcoating film is formed from a coating composition of any one of [1] to [7].

[10] A precoated steel sheet with high hardness and good workability of [9], wherein the prime coating film has a breaking strength of not smaller than 50 kg/cm$^2$ and a breaking elongation of not smaller than 50%, when measured in the form of the film having a width of 5 mm and a thickness of 8±1 µm.

[11] A precoated steel sheet with high hardness and good workability of [10], wherein the prime coating film is formed from a coating composition consisting essentially of a bisphenol A-added polyester resin.

[12] A precoated steel sheet with high hardness and good workability of [9], wherein the prime coating film contains strontium chromate in an amount of from 0.06 to 0.26 g/m$^2$ of the film of 1 µm thick.

[13] A precoated steel sheet with high hardness and good workability of [12], wherein the prime coating film is formed from a coating composition consisting essentially of a polyester resin.

[14] A precoated steel sheet with high hardness and good workability of any of [9] to [13], wherein the prime coating film has a dry thickness of from 2 to 12 µm.

[15] A precoated steel sheet with high hardness and good workability of [9], wherein the topcoating film contains wax in an amount of from 0.3 to 30 parts by weight, relative to 100 parts by weight of the solid content of the coating composition exclusive of wax.

[16] A precoated steel sheet with high hardness and good workability of [15], wherein the wax to be in the topcoating film has a melting point of not lower than 100° C.

[17] A precoated steel sheet with high hardness and good workability of [15] or [16], wherein the wax to be in the topcoating film is a mixture composed of polyethylene wax and polytetrafluoroethylene.

[18] A method for producing precoated steel sheets with high hardness and good workability, which comprises applying a prime coating composition onto the chemically-treated surface of a zinc or zinc alloy plated steel sheet, then baking it at a peak metal temperature of from 180 to 260° C., then applying thereto a topcoating composition of any of [1] to [7], and thereafter baking it at a peak metal temperature of from 180 to 260° C.

As has been mentioned hereinabove, the coating composition for precoated steel sheets of the invention forms a coating film having good workability and high hardness and additionally having good stain resistance. Accordingly, the precoated steel sheets having the coating film of the composition of the invention are extremely useful as materials for producing household electric appliances and also as construction materials.

In particular, the precoated steel sheets as formed by applying a prime coating film and a topcoating film of the composition of the invention onto the surface of chemically-treated zinc or zinc alloy plated steel sheet substrates have good workability, in which the hardness of the topcoating film is high, the film appearance thereof is good, and the film adhesion to the substrate is high. Of those, the precoated steel sheets, of which the prime coating film has specifically-defined physical properties, have especially excellent workability, the precoated steel sheets, of which the prime coating film contains a suitable amount of strontium chromate, have especially excellent corrosion resistance, and the precoated steel sheets, of which the topcoating film contains a suitable amount of wax, have especially excellent scratch resistance and are hardly fogged on their surface by coagulation of wax. Accordingly, these precoated steel sheets are favorably used in various fields that require precoated steel sheets with high film hardness and good workability, for example, in the field of household electric appliances, construction materials and cars. In particular, the precoated steel sheets of the invention are especially advantageous in industrial use, as the method for producing them is more simple than conventional methods.

MODES OF CARRYING OUT THE INVENTION

Figure 1:
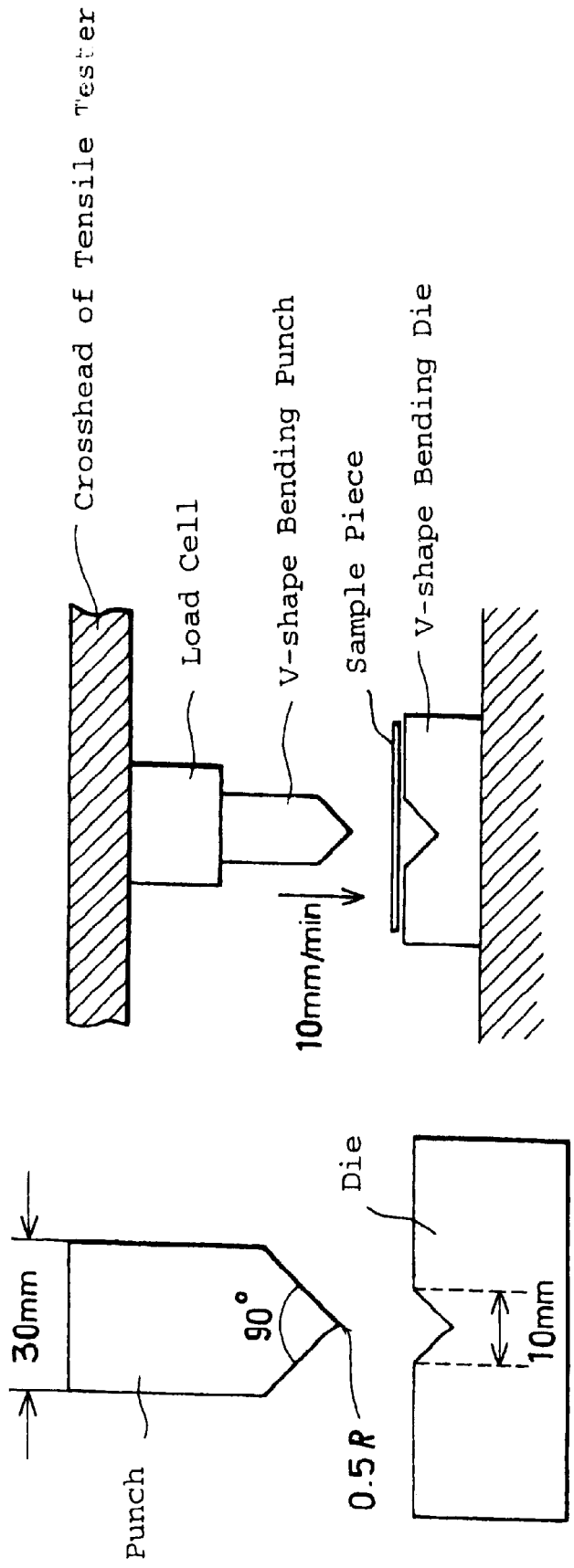
FIG. 1 shows a V-shape bending mold and a testing method for a precoated steel sheet.

The coating composition for precoated steel sheets of the invention consists essentially of a resin component comprising;

i) a specific compound, ii) a polyol except i), and iii) as a curing agent, a mixture of at least two blocked polyisocyanate compounds each selected from any of two groups of specific blocked polyisocyanate compounds.

The compound i) may be any of the compounds (I) to (III) mentioned above. The coating composition for precoated steel sheets of the invention is described in detail hereinunder, containing any of those three different types of compounds.

In the first coating composition for precoated steel sheets of the invention, the compound i) is a polyester compound comprising main repeating units of a chemical formula:

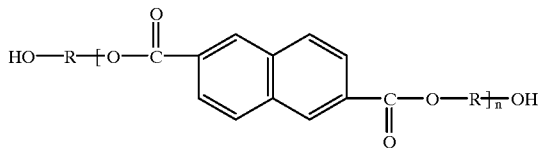

wherein n represents an integer; and R represents an alkylene group having 10 or less carbon atoms, or a 1,4-cyclohexylene-dimethylene group, or a neopentylene group, or a polyoxyalkylene group.

The acid component to be used to give the polyester compound i) consists essentially of naphthalene-2,6-dicarboxylic acid and/or its lower alkyl ester, but a part of this can be substituted with any of dicarboxylic acids such as terephthalic acid, isophthalic acid, naphthalene-2,7-dicarboxylic acid and diphenyldicarboxylic acid, and lower alkyl esters of such dicarboxylic acids. The lower alkyls ester include, for example, methyl esters and ethyl esters having 1 or 2 carbon atoms. However, it is still desirable that the essential constituent, naphthalene-2,6-dicarboxylic acid accounts for 85 mol % or more of the whole acid component, while the proportion of the other substitutable compounds is less than 15 mol %.

The alcohol component to be used to give the polyester compound i) consists essentially of a diol. The diol may be any of aliphatic diols and alicyclic diols, including, for example, ethylene glycol, propylene glycol, 1,4-butanediol, 1,6-hexanediol, neopentyl glycol, and 1,4-cyclohexane-dimethanol. Also usable are polyoxyalkylene glycols, especially polyethylene glycol (hereinafter referred to as PEG) having a number-average molecular weight of not larger than 1000, and polytetraethylene glycol (hereinafter referred to as PTG) having a number-average molecular weight of not larger than 1000. Mixtures of these can also be used.

As the alcohol component, also usable are trihydric or higher polyhydric alcohols in addition to the diols noted above. The polyalcohols include, for example, triethylene glycol, glycerin, pentaerythritol, trimethylolpropane, and trimethylolethane.

The alcohol component is reacted with the acid component to give the polyester compound i). Where PEG having a mean molecular weight of not larger than 1000 or PTG having a mean molecular weight of not larger than 1000 is used, obtained are polyester compounds with ether bonds.

The polyester compound i) for use in the invention can be obtained through ordinary polyester production, such as interesterification or direct esterification. In general, the acid component reacts with the alcohol component in a molar ratio of 1:2. Therefore, in order to effect the reaction efficiently, it is desirable to combine the acid component and the alcohol component in a ratio as near as possible to such a molar ratio of 1:2. The polyester compound can be used either singly or in the form of a mixture of two or more of the compounds.

The polyester compound as formed from the combination of the alcohol component and the acid component is anisotropic, when observed with a polarizing microscope. A coating film comprising a polyester compound of this type is kept still tough, even after having been baked, due to the orientability or the like properties peculiar to liquid crystal compounds. As a result, therefore, it is believed that the film comprising the polyester compound shall have high hardness and good workability.

Where the above-mentioned PEG or PTG is used as the alcohol component, this reacts with the acid component to give a polyester compound with ether bonds. Desirably, the polyester compound with ether bonds has a reduced viscosity of 0.20 dl/g or less. If it has a reduced viscosity of more than 0.20 dl/g, its solubility in solvents and its miscibility with polyols and curing agents are greatly lowered with the result that the properties of the coating film formed from the composition comprising the compound will be poor. The reduced viscosity as referred to herein indicates a value to be obtained by dissolving a sample in a solution of phenol/tetrachloroethane (60/40 by weight) followed by measuring the viscosity of the resulting solution with an Ubelohode Viscometer at 25° C. Where the polyester compound with ether bonds is used in the composition of the invention and the composition is applied to a substrate, the crosslink structures to be in the resulting coating film can be made tough due to the combination of the flexible ether chain and the rigid naphthalene skeleton, and, as a result, it is believed that the film can have high hardness and good workability.

The amount of the polyester compound i) to be in the composition is from 1 to 15% by weight, preferably from 2 to 10% by weight, more preferably from 3 to 8% by weight, relative to the solid resin content of the composition. If its amount is less than 1% by weight, the polyester compound will be ineffective in improving the properties of the coating film to be formed, resulting in that the coating film formed from the composition of the invention could not be significantly superior to conventional coating films. On the other hand, if its amount is more than 15% by weight, the solubility of the polyester compound in solvents and also the miscibility thereof with polyols and curing agents will be poor, resulting in that the appearance of the coating film formed and even the properties thereof are not good.

The polyol ii) may include, for example, acrylic resins and polyester resins.

The acrylic resins for ii) are not specifically defined, provided that they have at least two hydroxyl groups in one molecule and have a number-average molecular weight of from 1500 to 12000. Preferably, however, they have a number-average molecular weight of from 1700 to 10000. The hydroxyl groups to be in the molecule of the acrylic resins may be disposed at random in the main chain of the molecule. If an acrylic resin having a number-average molecular weight of less than 1500 is used as the polyol ii), the workability of the coating film to be formed from the composition containing it is noticeably lowered. On the other hand, however, if an acrylic resin having a number-average molecular weight of more than 12000 is used, the composition containing it is too viscous and therefore needs an excess solvent for diluting it. If so, the proportion of the resin to be in the coating composition shall be reduced, resulting in that the composition cannot form a suitable coating film. If so, moreover, the miscibility of the resin having such a high number-average molecular weight with the other components to constitute the composition is greatly lowered. The number-average molecular weight of the acrylic resin as referred to herein indicates the molecular weight thereof as measured, in terms of polystyrene, through gel permeation chromatography (hereinafter referred to as GPC).

The acrylic resin is a copolymer to be obtained by well-known thermal reaction of a (meth)acrylic monomer having a hydroxyl group and an acrylate or methacrylate. The acrylic monomer and the methacrylic monomer include, for example, 2-hydroxyethyl methacrylate, 2-hydroxyethyl acrylate, hydroxypropyl methacrylate, and hydroxypropyl acrylate. The acrylate and the methacrylate include, for example, methyl acrylate, ethyl acrylate, isopropyl acrylate, n-butyl acrylate, 2-ethylhexyl acrylate, methyl methacrylate, ethyl methacrylate, isopropyl methacrylate, n-butyl methacrylate, and 2-ethylhexyl methacrylate. Commercially-available acrylic resins are employable, including, for example, "Almatex" (produced by Mitsui Toatsu Chemicals Co., Ltd.), "Desmophen" (produced by Sumitomo Bayer Urethane Co., Ltd.), and "Dianal" (produced by Mitsubishi Rayon Co., Ltd.).

The polyester resins for the polyol ii) are not specifically defined, provided that they have at least two hydroxyl groups in one molecule and have a number-average molecular weight of from 1000 to 8000. Preferably, however, they have a number-average molecular weight of from 1200 to 7000, more preferably from 1500 to 6000. The hydroxyl groups to be in the molecule of the polyester resins may be either at the terminals of the molecule or in the side chains thereof. If a polyester resin having a number-average molecular weight of less than 1000 is used as the polyol ii), the workability of the coating film to be formed from the composition containing it is noticeably lowered. On the other hand, however, if a polyester resin having a number-average molecular weight of more than 8000 is used, the composition containing it is too viscous and therefore needs an excess solvent for diluting it. If so, the proportion of the resin to be in the coating composition shall be reduced, resulting in that the composition cannot form a suitable coating film. If so, moreover, the miscibility of the polyester resin having such a high number-average molecular weight with the other components to constitute the composition is greatly lowered. The number-average molecular weight of the polyester resin indicates the molecular weight thereof as measured, in terms of polystyrene, through GPC.

The polyester resin is a copolymer to be obtained by well-known thermal reaction of a poly-basic acid component with a polyalcohol. The poly-basic acid component includes, for example, phthalic anhydride, isophthalic acid, terephthalic acid, trimellitic anhydride, maleic acid, adipic acid, and fumaric acid. The polyalcohol includes, for example, ethylene glycol, diethylene glycol, polyethylene glycol, propylene glycol, dipropylene glycol, polypropylene glycol, 1,4-butanediol, 1,6-hexanediol, neopentyl glycol, triethylene glycol, glycerin, pentaerythritol, trimethylolpropane, and trimethylolethane. Commercially-available polyester resins are employable, including, for example, "Almatex" (produced by Mitsui Toatsu Chemicals Co., Ltd.), "Alkinol" (produced by Sumitomo Bayer Urethane Co., Ltd.), "Desmophen" (produced by Sumitomo Bayer Urethane Co., Ltd.), and "Vylon" (produced by Toyobo Co., Ltd.).

The polyester compound i) and the polyol ii) react with the curing agent iii) to form a cured film.

The curing agent iii) is a mixture composed of a blocked polyisocyanate compound as obtained by blocking at least one or more polyisocyanate compounds selected from polyisocyanates of the following group (a) and their derivatives, and a blocked polyisocyanate compound as obtained by blocking at least one or more polyisocyanate compounds selected from polyisocyanates of the following group (b) and their derivatives:

(a) 4,4'-diphenylmethane diisocyanate (hereinafter referred to as MDI), isophorone diisocyanate (IPDI), tolylene diisocyanate (TDI), xylylene diisocyanate (XDI), naphthalene-1,5-diisocyanate (NDI);

(b) hexamethylene diisocyanate (HDI), trimethylhexamethylene diisocyanate (TMDI), hydrogenated 4,4'-diphenylmethane diisocyanate (hydrogenated MDI), hydrogenated tolylene diisocyanate (hydrogenated TDI), hydrogenated xylylene diisocyanate (hydrogenated XDI).

Comprising, as the curing agent, a mixture of blocked polyisocyanates each prepared by blocking at least one polyisocyanate compound selected from polyisocyanates of the groups (a) and (b) and their derivatives, the coating composition of the invention forms a coating film having high hardness, good workability and good stain resistance.

Though not always clear, the reason why the composition comprising, as the curing agent, a mixture of two or more different types of blocked polyisocyanate compounds forms a coating film having high hardness, good workability and good stain resistance will be because of the synergistic effect of those two different types of blocked polyisocyanate compounds having different properties such as those mentioned below, as combined with the specific polyester compound i).

One probable reason will be because, in the coating film formed from the coating composition, even when formed on a relatively thin steel sheet substrate, the crosslinking density that greatly influences the elongation of the film capable of resisting to 180-degree contact bending and also influences the stain resistance of the film is well controlled in good balance by the synergistic effect of the curing agent composed of those two different types of blocked polyisocyanate compounds having different properties such as those mentioned below, and combined with the specific polyester compound i), which is formed by the combination of the alcohol component and the acid component noted above and which is oriented in the coating film formed.

Of the polyisocyanates of the groups (a) and (b) and their derivatives, those of the group (a) are of the type of a relatively hard curing agent, while those of the group (b) are of the type of a relatively soft curing agent. Where the blocked polyisocyanate compounds as prepared by blocking the polyisocyanates of the group (a) or (b) and their derivatives are used singly in the coating composition, the composition could not form a coating film that is good with respect to all the hardness, the workability and the stain resistance, and any of those properties of the coating film formed from the composition is poor. As opposed to this, where both the relatively hard curing agent selected from the group (a) and the relatively soft curing agent selected from the group (b) are combined and used in the coating composition, the composition forms a coating film that is good with respect to all the properties mentioned above.

In the curing agent, the compositional ratio of the blocked polyisocyanate compound (A) as obtained by blocking at least one or more polyisocyanate compounds selected from polyisocyanates of the group (a) and their derivatives to the blocked polyisocyanate compound (B) as obtained by blocking at least one or more polyisocyanate compounds selected from polyisocyanates of the group (b) and their derivatives, (A)/(B), is preferably from 70/30 to 30/70, more preferably from 60/40 to 40/60, in terms of the ratio by weight of the solid contents. If the ratio by weight of (A)/(B) is larger than 70/30, the coating film formed could not have well-balanced hardness and workability, and, in addition, the impact resistance of the film is poor. On the other hand, if the ratio by weight of (A)/(B) is smaller than 30/70, the stain resistance of the coating film formed is poor. Anyhow, if the compositional ratio in question falls outside the defined range, coating films having high hardness, good workability and good stain resistance are difficult to obtain.

In the coating composition of the invention, it is preferable that the blocked polyisocyanate compound as obtained by blocking the polyisocyanate compound selected from polyisocyanates of the group (a) and their derivatives is any of isocyanurates, adducts and prepolymers, and that the blocked polyisocyanate compound as obtained by blocking the polyisocyanate compound selected from polyisocyanates of the group (b) and their derivatives is any of burettes, isocyanurates, adducts and prepolymers.

It is also preferable that the amount of the curing agent of iii) is so defined that the ratio by mol of the isocyanato groups, [NCO], in the blocked polyisocyanate compounds to the total of the hydroxyl groups, [OH], in the polyester compound of i) and the polyol of ii), [NCO]/[OH], is from 0.8 to 1.2, more preferably from 0.90 to 1.10. If the ratio by mol of [NCO]/[OH] is smaller than 0.8, the coating film formed could not be cured sufficiently, and therefore could not have high hardness and strength. On the other hand, if the ratio by mol of [NCO]/[OH] is larger than 1.2, the excess isocyanato groups react with each other or react with urethane bonds in side reaction whereby the workability of the coating film formed is worsened.

In the second coating composition for precoated steel sheets of the invention, the compound i) is a polyester compound comprising main repeating units of a chemical formula:

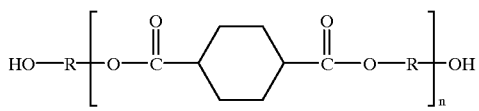

wherein n represents an integer; and R represents an alkylene group having 10 or less carbon atoms, or a 1,4-cyclohexylene-dimethyl group, or a neopentylene group, or a polyoxyalkylene group.

The acid component to be used to give the polyester compound i) consists essentially of 1,4-cyclohexane-dicarboxylic acid and/or its lower alkyl ester, a part of which can be substituted with any of dicarboxylic acids such as terephthalic acid, isophthalic acid, naphthalene-2,6-dicarboxylic acid, naphthalene-2,7-dicarboxylic acid and diphenyldicarboxylic acid, and lower alkyl esters of such dicarboxylic acids. The lower alkyl esters include, for example, methyl esters and ethyl esters having 1 or 2 carbon atoms. However, it is still desirable that the essential constituent, 1,4-cyclohexane-dicarboxylic acid accounts for 85 mol % or more of the whole acid component, while the proportion of the other substitutable compounds is less than 15 mol %. The alcohol component to give the polyester compound i) consists essentially of a diol. The diol may be any of aliphatic diols and alicyclic diols, including, for example, ethylene glycol, propylene glycol, 1,4-butanediol, 1,6-hexanediol, neopentyl glycol, and 1,4-cyclohexane-dimethanol.

As the alcohol component, also usable are trihydric or higher polyhydric alcohols in addition to the diols noted above. The polyalcohols include, for example, triethylene glycol, glycerin, pentaerythritol, trimethylolpropane, and trimethylolethane.

The acid component is reacted with the alcohol component to give the polyester compound i) The polyester compound i) for use in the present invention can be obtained through ordinary polyester production, such as interesterification or direct esterification. In general, the acid component reacts with the alcohol component in a molar ratio of 1:2. Therefore, in order to effect the reaction efficiently, it is desirable to combine the acid component and the alcohol component in a ratio as near as possible to such a molar ratio of 1:2. The polyester compound can be used either singly or in the form of a mixture of two or more of the compounds.

Desirably, the polyester compound i) has a number-average molecular weight of 2000 or less, more preferably 1000 or less, as measured through GPC in terms of styrene. If a polyester compound having a number-average molecular weight, in terms of styrene, of more than 2000 is used in the composition of the invention, the polyester compound is ineffective, resulting in that the film appearance, the hardness and the workability of the coating film to be formed from the composition are poor.

The amount of the polyester compound i) to be in the composition is from 1 to 18% by weight, preferably from 2 to 15% by weight, more preferably from 3 to 10% by weight, relative to the solid resin content of the composition. If its amount is less than 1% by weight, adding effect of the polyester compound will not be effective for improving the properties of the coating film to be formed, resulting in that the coating film properties from the composition of the invention could not be significantly superior to conventional coating films. On the other hand, if the amount of the polyester compound i) is more than 18% by weight, the properties, especially the flexibility, of the coating film formed will be poor.

In the second coating composition of the invention, the other components, the polyol ii) and the curing agent iii) are the same as those in the first coating composition mentioned hereinabove. Also in this, the polyester i) and the polyol ii) react with the curing agent iii) to form a cured film.

In the third coating composition for precoated steel sheets of the invention, the compound i) is a compound of a chemical formula:

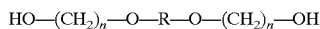

wherein n represents an integer of from 2 to 10; and R represents

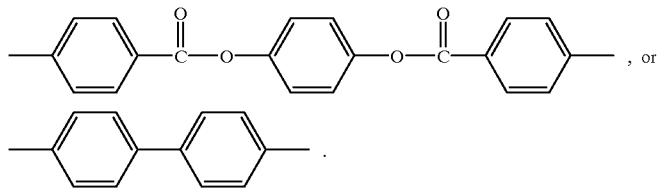

The compound i) is a bifunctional compound comprising a rigid dibenzoyloxy-p-phenylene or biphenyl skeleton with hydroxyl groups at their both terminals via an oxygen and a methylene chain. In this, n (the number of methylene groups) is desirably from 2 to 10. Compounds of the above-mentioned formula where n is 0 or 1 are difficult to produce, while those where n is more than 10 are unfavorable since the properties of the coating films comprising them are poor.

The amount of this compound i) to be in the coating composition is from 1 to 15% by weight, preferably from 2 to 12% by weight, more preferably from 3 to 8% by weight, relative to the solid resin content of the composition. If the content of this compound is less than 1% by weight, the properties of the coating film to be formed from the composition are not good and are superior little to those of conventional coating films. If it is more than 15% by weight, the properties of the coating film to be formed from the composition, especially the flexibility thereof, are poor.

The compound i) is anisotropic, when observed with a polarizing microscope. A coating film comprising a compound of this type is kept still tough, even after having been baked, due to the orientability or the like properties peculiar to liquid crystal compounds. As a result, therefore, it is believed that the film comprising the compound shall have high hardness and good workability.

Bis-hydroxyalkyl terephthalates having the following structural formula are known, of which the skeleton is similar to that of the compounds i) to be used in the invention.

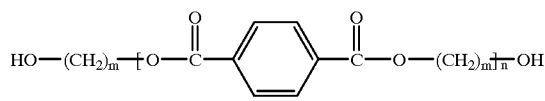

wherein m is generally an integer of from 2 to 6; and n is an integer.

However, the properties of the coating film to be formed from a coating composition comprising this compound are inferior to those of the coating film to be formed from the coating composition of the invention, as so demonstrated as the comparative specimens in the examples to be mentioned hereinunder, and, therefore, the coating film comprising this compound is unsuitable to precoated steel sheets.

In the third coating composition of the invention, the other components, the polyol ii) and the curing agent iii) are the same as those in the first coating composition mentioned hereinabove. Also in this, the compound i) and the polyol ii) react with the curing agent iii) to form a cured film.

Depending on their object and use, the first to third coating compositions of the present invention may optionally contain a curing promoter such as trimethylenediamine, tin octoate, dibutyl tin dilaurate, lead 2-ethylhexoate, etc.; a pigment such as calcium carbonate, kaolin, clay, titanium oxide, talc, barium sulfate, mica, red iron oxide, manganese blue, carbon black, aluminium powder, pearly mica, etc.; and other various additives such as a defoaming agent, an antirunning agent, etc.

The constitutions of the coating compositions of the invention are mentioned above. In practical use of these compositions, they are dissolved in organic solvents. The organic solvent to be used includes, for example, methyl ethyl ketone, methyl isobutyl ketone, cyclohexanone, Solvesso 100 (produced by Exxon Chemical), Solvesso 150 (produced by Exxon Chemical), Solvesso 200 (produced by Exxon Chemical), toluene, xylene, methyl cellosolve, butyl cellosolve, cellosolve acetate, butyl cellosolve acetate, carbitol, ethyl carbitol, butyl carbitol, ethyl acetate, butyl acetate, petroleum ether, and petroleum naphtha.

To prepare the coating composition of the invention, the constitutive components may be mixed while selectively using ordinary dispersing machines and kneaders, such as sand grinding mills, ball mills, blenders, etc.

The steel sheets coated by the present coating composition are not specifically defined. In general, however, the composition may be applied onto chemically-treated steel sheets to be prepared by chemically processing the surfaces of cold-rolled steel sheets or plated steel sheets (e.g., hot-dip galvanized steel sheets, electrolytic galvanized steel sheets, composite galvanized steel sheets, chromium-plated steel sheets) through phosphate treatment or chromate treatment. Where the composition is applied onto the surfaces of such chemically-treated steel sheets, the adhesiveness of the coating film to the steel sheets is improved and the corrosion resistance of the film is also improved. Also in order to further improve the adhesiveness between the coating film by the present composition and the substrate and the corrosion resistance, a primer coating can apply on the steel sheets as the layer finish coat. For this, suitably used are epoxy-type or polyester-type primer coats. To the primer coat, optionally added is a rust-inhibiting pigment to thereby further improve the corrosion resistance of the coating film formed. The primer coat is not indispensable and may be omitted.

The method of coating the coating composition of the invention is not specifically defined. However, preferably employed are a coating method using a roll coater, and a curtain flow coating system. After having been coated, the film is baked by various heating means of, for example, hot air heating, infrared heating or induction heating, to thereby crosslink the resin to give a cured film. The baking for curing the film is suitably conducted at from 200 to 250° C. or so for about from 30 seconds to 3 minutes or so. The dry film thickness may be generally from 10 to 35 μm or so, which, however, is not specifically limitative.

Desirably, the coating composition of the present invention is used as the top coat for a two-coat and two-bake system or a three-coat and three-bake system, which, however, is not always limitative. Where the composition is used in a three-coat and three-bake system, it is desirable to provide an intermediate coat that can be subjected to an ordinary three-coat and three-bake system, between the coat of the composition of the invention and the primer coat.

In order to obtain precoated steel sheets having especially excellent hardness and workability, it is preferable that a prime coating film is first formed on the surface of a chemically-treated zinc or zinc alloy plated steel sheet, for example, phosphate-treated or chromate-treated zinc or zinc alloy plated steel sheet and thereafter a topcoating film of the coating composition of the invention is formed over the prime coating film.

Various zinc or zinc alloy plated steel sheets are employable as the base substrate for the precoated steel sheets, which include, for example, hot-dip galvanized steel sheets, hot-dip galvannealed steel sheets, electrolytic galvanized steel sheets, hot-dip Zn-55% Al alloy-plated steel sheets, hot dip Zn-5% Al alloy-plated steel sheets, Zn—Ni alloy-plated steel sheets, Zn—Co alloy-plated steel sheets, Zn—Cr alloy-plated steel sheets, composite galvanized steel sheets (e.g., electrolytic Zn—$SiO_2$ dispersion-plated steel sheets), etc.

In working the precoated steel sheet into shaped articles under relatively mild bending conditions, the sheet of which the coating film has a higher degree of elongation and flexibility worked better. However, under severe working conditions for drawing, not only the elongability and flexibility of the coating film but also the mechanical strength thereof capable of resisting to the stress to be imparted to the film during working operation is an additional important factor of the workability of the sheet. Therefore, in order to enhance the workability and the hardness of the coating film composed of an undercoat and an overcoat, the elongability and the strength of the prime coating film are important. For this, regarding the data of its physical properties, the prime coating film is desired to have a breaking strength of not smaller than 50 kg/cm2 and a breaking elongation of not smaller than 50%, when measured in the form of the film having a width of 5 mm and a thickness of 8±1 μn. If either of those physical data is lower than the defined range, the combination of the prime coating film and the topcoating film could not produce the intended results.

The essential ingredient in the coating composition to form the prime coating film is not specifically defined. However, in view of the workability and the adhesiveness between the prime coating film and the chemically-treated film, it is desirable that the prime coating composition comprises, as the essential ingredient, a polyester resin, an epoxy resin, an urethane resin, or an epoxy-modified polyester resin such as a bisphenol A-added polyester resin. The essential ingredient may be comprised of two or more of those resins.

The resin to be used for epoxy modification of polyester resins includes, for example, bisphenol A or bisphenol F-type epoxy resins. In addition to above-mentioned resins employable are phenolic epoxy resins (e.g., novolak epoxy resins) to be obtained by reacting an epihalohydrin (e.g., epichlorohydrin) with a condensate of an aldehyde (e.g., formaldehyde) and a mono- or polyphenol, in the presence of a basic catalyst (e.g., potassium hydroxide).

In general, the physical data of the prime coating film vary, accordance with Tg of the resin used as the essential ingredient of the coating composition. From the molecular structure of the resin, the breaking strength of the prime coating film formed from an epoxy-based coating composition is large but the breaking elongation thereof is small, while, on the other hand, the breaking elongation of the prime coating film formed from a polyester-based coating composition is large but the breaking strength thereof is small. As opposed to those, the breaking strength and the breaking elongation of the prime coating film formed from a coating composition comprising, as the essential ingredient, a bisphenol A-added polyester resin are well-balanced and are both high, since the molecular structure of the prime coating resin is derived from both molecular structures of the epoxy resin and the polyester resin. In view of the workability of the prime coating film, therefore, the bisphenol A-added polyester resin is especially preferred as the essential ingredient in the prime coating composition.

Where the prime coating film is formed from a coating composition comprising, as the essential ingredient, a polyester resin (this includes modified polyester resins such as bisphenol A-added polyester resin, and the same shall apply hereinunder), and in order that the prime coating film may have the physical data not lower than the defined ranges, it is desirable that the polyester resin has a number-average molecular weight of from 1000 to 50000, more preferably from 3000 to 40000, even more preferably from 5000 to 30000. If a polyester resin having a number-average molecular weight of smaller than 1000 is used, the degree of elongation of the coating film formed from the composition containing the resin is low and the film could not have the above-mentioned physical property. The polyester resin having such a small molecular weight is not effective in improving the properties of the coating film. If a polyester resin having a number-average molecular weight of larger than 50000 is used, the composition containing it is too viscous and therefore needs an excess solvent for diluting it. If so, the proportion of the resin to be in the coating composition shall be reduced, resulting in that the composition cannot form a suitable coating film. If so, moreover, the miscibility of the resin having such a high number-average molecular weight with the other components to constitute the composition is greatly lowered.

Where a bisphenol A-added polyester resin is used as the essential ingredient constituting the coating composition, it is desirable that the bisphenol A content of the resin is from 1 to 70% by weight, more preferably from 3 to 60% by weight, even more preferably from 5 to 50% by weight, relative to the solid content of the resin. If the bisphenol A content of the resin is smaller than 1% by weight, and if the resin having such a small bisphenol A content is used in the coating composition, the strength of the coating film formed from the composition is poor and the resin is not effective in improving the properties of the film. On the other hand, if the bisphenol A content is more than 70% by weight and if the resin having such a large bisphenol A content is used in the coating composition, the elongability of the film formed from the composition is poor.

The polyalcohol to be used for producing the polyester resin includes, for example, ethylene glycol, diethylene glycol, propylene glycol, dipropylene glycol, polypropylene glycol, neopentylene glycol, 1,4-butane-diol, 1,5-pentane-diol, 1,6-hexane-diol, 1,4-cyclohexane-dimethanol, polytetramethylene ether glycol, polycaprolactone-polyol, glycerin, sorbitol, mannitol, trimethylolethane, trimethylolpropane, trimethylolbutane, hexane-triol, pentaerythritol, and dipentaerythritol. Two or more those polyalcohols may be mixed.

The poly-basic acid component to be used for producing the polyester resin includes, for example, phthalic acid, phthalic anhydride, tetrahydrophthalic acid, tetrahydrophthalic anhydride, hexahydrophthalic acid, hexahydrophthalic anhydride, carbic anhydride, trimellitic acid, trimellitic anhydride, pyromellitic acid, pyromellitic anhydride, isophthalic acid, terephthalic acid, maleic acid, maleic anhydride, fumaric acid, itaconic acid, adipic acid, azelaic acid, sebacic acid, succinic acid, succinic anhydride, and 1,4-cyclohexane-dicarboxylic acid. Two or more those poly-basic acid components may be mixed.

As the curing agent for the prime coating composition, usable is any of polyisocyanate compounds or amino resins. Two or more of these may be mixed.

The polyisocyanate compounds usable as the curing agent include, for example, aromatic diisocyanates such as xylylene diisocyanate, tolylene diisocyanate, 4,4'-diphenylmethane diisocyanate; aliphatic diisocyanates such as hexamethylene diisocyanate, trimethylhexamethylene diisocyanate; alicyclic diisocyanates such as isophorone diisocyanate; polymers of those diisocyanates, and adducts of those diisocyanates with polyalcohols. These may be blocked with a blocking agent (e.g., phenol, lactam, alcohol, mercaptan, imine, amine, imidazole or oxime blockers), and the blocked polyisocyanates may be used. As the dissociation catalyst for those blocked polyisocyanates, usable is any of tin octoate, dibutyl tin dilaurate, or lead 2-ethylhexoate.

The amino resin usable as the curing agent includes, for example, condensates of formaldehyde or paraformaldehyde as alkyl-etherified with a lower alcohol, with urea, dicyandiamide or aminotriazine. To be concrete methoxylated methylolurea, methoxylated methyldicyandiamide, methoxylated methylmelamine, methoxylated methylolbenzoguanamine, butoxylated methylolmelamine, and butoxylated methylolbenzoguanamine are used. As the curing catalyst, usable is any of acids, such as hydrochloric acid, monoalkyl phosphates, p-toluenesulfonic acid; or salts of these acids with tertiary or secondary amines.

Depending on its object and use, the prime coating composition may contain various additives such as rust preventive pigments. Addition of rust preventive pigments to the composition is effective in improving the corrosion resistance of all the coating films including the prime coating film.

As the rust preventive pigment to be in the prime coating film, usable is fine powder of a sparingly soluble chromate, such as strontium chromate, zinc chromate, or barium chromate. In view of its ability to ensure long-term corrosion resistance, strontium chromate is the best.

Where strontium chromate is added to the prime coating film, its content is preferably from 0.06 to 0.26 g/m$^2$ of the film of 1 μm thick. If the strontium chromate content of the film is smaller than 0.06 g/m$^2$ of the film of 1 μm thick, the pigment will be ineffective in improving the corrosion resistance of the film. However, if it is larger than 0.26 g/m$^2$ of the film of 1 μm thick, the workability of the steel sheet coated with the film is lowered.

The thickness of the prime coating film is preferably from 2 to 12 μm. If its thickness is thinner than 2 μm. the prime coating film having the specific physical properties noted above will be ineffective in improving the workability of the steel sheet coated therewith, and the film containing strontium chromate will be ineffective in improving the corrosion resistance of the steel sheet coated therewith. However, if the thickness of the prime coating film is thicker than 12 μm, both the workability and the film hardness of the steel sheet coated therewith will be lowered.

The topcoating film of the composition of the invention is formed over the prime coating film.

The topcoating composition of the invention may contain a suitable amount of wax in order to improve the scratch resistance of the film formed from the composition. The wax may be any of natural wax or synthetic wax.

The natural wax includes, for example, carnauba wax, paraffin wax, and microcrystalline wax. Commercially-available products are employable, including, for example, Slipaid SL-506 (produced by San Nopco Co., Ltd.), Slipaid SL-523 (produced by San Nopco Co., Ltd.), Lioflat W-7467 (produced by Toyo Ink Manufacturing Co., Ltd.), and Hidisper-6413 (produced by Gifu Shellac Co., Ltd.).

As the synthetic wax, for example, usable is polyethylene wax. Commercially-available products are employable, including, for example, Disparon 510-10X (produced by Kusunoki Chemical Co., Ltd.), and Paint Additive 371FP (produced by Matsushita Industry Co., Ltd.). As the synthetic wax, also usable is mixed wax. As the mixed wax, especially preferred is a mixture of polyethylene wax and polytetrafluoroethylene (fine resin grains). Commercially-available products of such mixed wax are employable, including, for example, Hidisper-42$^{52}$ (Produced by Gifu Shellac Co., Ltd.), and Shamrock S600 (Produced by Shamrock Co., Ltd.).

These waxes are used singly or as a mixture of two or more, and make the coating film lubricative.

The wax content of the coating composition may be from 0.3 to 30 parts by weight, preferably from 0.3 to 20 parts by weight, more preferably from 0.5 to 10 parts by weight, relative to 100 parts by weight of the composition (exclusive of the weight of wax). If the wax content is less than 0.3 parts by weight, it will be ineffective in improving the lubricity of the coating film. On the other hand, if the wax content is more than 30 parts by weight, much wax will precipitate in the coating composition while the composition is stored at low temperatures, and the aggregates of the resulting wax precipitate will form crawling faults and eye holes on the surface of the coating film. These surface defects give serious damage to precoated steel sheets.

As has been mentioned above, the amount of wax to be in the coating composition is critical from the viewpoint of making the coating film lubricative. On the other hand, from the viewpoint of preventing the coating film from being fogged, the melting point of wax in the coating composition is critical. Prevent to cloud films, it is desirable that wax having a melting point of not lower than 100° C. is used in the coating composition. If the wax in the coating composition has a melting point lower than 100° C., the surface of the coating film formed will be clouded to have bad film appearance. In addition, the coating film containing wax having a melting point lower than 100° C. will be easily scratched.

Apart from wax, the topcoating composition may contain various additives, depending on its object and use.

The thickness of the topcoating film is preferably from 10 to 35 μm. If its thickness is thinner than 10 μm, the overall properties of the film will be poor. On the other hand, if its thickness is thicker than 35 μm, the hardness of the film will be low.

In practical use of the coating compositions to form the intended prime coating film and topcoating film, they are dissolved in organic solvents. The organic solvent to be used includes, for example, methyl ethyl ketone, methyl isobutyl ketone, cyclohexanone, Solvesso 100 (produced by Exxon Chemical), Solvesso 150 (produced by Exxon Chemical), Solvesso 200 (produced by Exxon Chemical), toluene, xylene, methyl cellosolve, butyl cellosolve, cellosolve acetate, butyl cellosolve acetate, carbitol, ethyl carbitol, butyl carbitol, ethyl acetate, butyl acetate, petroleum ether, and petroleum naphtha.

To prepare the coating compositions, the constitutive components may be mixed while selectively using ordinary dispersing machines and kneaders, such as sand grinding mills, ball mills, blenders, etc.

The method of applying the coating compositions (for forming prime coating film and topcoating film) onto steel sheet bases to produce the precoated steel sheets of the invention is not specifically defined. However, preferably employed are a coating method using a roll coater, and a curtain flow coating system. After having been coated, the prime coating film and the topcoating film are baked by various heating means of, for example, hot air heating, infrared heating or induction heating, to thereby crosslink the resins to give cured films. The baking for curing the prime coating film may be so conducted that the sheet being coated is heated at a temperature falling between 180 and 260° C. or so for about from 30 seconds to 1 minute or so. The baking for curing the topcoating film may be so conducted that the sheet being coated is heated at a temperature falling between 180 and 260° C. or so for about from 30 seconds to 3 minutes or so.

If desired, the topcoating film thus formed may be further coated with an additional coating film (for example, clear coating film). For this, for example, a three-coat and three-bake system is applicable.

EXAMPLES

Example 1

Compounds (I-1) to (I-8) and polyols (1) to (4) used in this Example were prepared according to the methods mentioned below.

Compound (I-1): Polyester Compound 1.0 mol of naphthalene-2,6-dicarboxylic acid dimethyl ether (hereinafter referred to as 2,6-NDCM) and 2.1 mols of ethylene glycol were deposit into a reactor installed with a heater, a stirrer, a rectification column and a thermometer, and melted therein heat at 200° C. Next, a catalyst, manganese acetate was added thereto in an amount of 0.03 mol % relative to 2,6-NDCM. This was gradually heated up to 230° C., and 0.03 mol %, relative to 2,6-NDCM, of trimethyl phosphate was added thereto after a theoretical amount, 64 g (2.0 mols) of methanol was distilled out. Then, the reaction was terminated. Thus was obtained compound (I-1). This reduced viscosity was 0.05 dl/g. As a result of the observation with a polarizing microscope, the compound exhibited anisotropy at temperatures ranging between 130 and 190° C. or so during heating and at temperatures ranging between 140° C. and room temperature during quenching. To determine the temperature ranges, a thin sample of the compound was sandwiched between two sheets of slide glass, and set on a polarizing microscope having a temperature-controlling function, and the sample was observed in polarized light while heating or quenching. The temperature range within which the field of view of the sample was kept light was referred to as the anisotropy-exhibiting temperature range of the compound.

Compound (I-2): Polyester Compound 0.5 mols of 2,6-NDCM and 1.02 mols of 1,4-butanediol were deposit into a reactor installed with a heater, a stirrer, a rectification column and a thermometer, and melted therein heat at 200° C. Next, a catalyst, titanium tetra-n-butoxide was added thereto in an amount of 0.06 mol % relative to 2,6-NDCM. This was gradually heated up to 240° C., and the reaction was terminated after a theoretical amount, 32 g (1.0 mol) of methanol was distilled out. Thus was obtained compound (I-2). This reduced viscosity was 0.04 dl/g. As a result of the observation with a polarizing microscope in the same method as above, the compound exhibited anisotropy at temperatures ranging between 90 and 180° C. or so during heating and at temperatures ranging between 160° C. and room temperature during quenching.

Compound (I-3): Polyester Compound 0.5 mols of 2,6-NDCM and 1.02 mols of 1,4-cyclohexane-dimethanol (of which the trans-form content was 70% by weight) were deposit into a reactor installed with a heater, a stirrer, a rectification column and a thermometer, and melted therein heat at 200° C. Next, a catalyst, titanium tetra-n-butoxide was added thereto in an amount of 0.06 mol % relative to 2,6-NDCM.

This was gradually heated up to 270° C., and the reaction was terminated after a theoretical amount, 32 g (1.0 mol) of methanol was distilled out. Thus was obtained compound (I-3). This reduced viscosity was 0.05 dl/g. As a result of the observation with a polarizing microscope in the same method as above, the compound exhibited anisotropy at temperatures ranging between 140 and 280° C. or so during heating and at temperatures ranging between 240° C. and room temperature during quenching.

Compound (I-4): Polyester Compound 0.5 mols of 2,6-NDCM and 1.05 mols of neopentyl glycol were deposit into a reactor installed with a heater, a stirrer, a rectification column and a thermometer, and melted therein heat at 200° C. Next, a catalyst, calcium acetate was added thereto in an amount of 0.03 mol % relative to 2,6-NDCM. This was gradually heated up to 240° C., and 0.03 mol %, relative to 2,6-NDCM, of trimethyl phosphate was added thereto after a theoretical amount, 32 g (1.0 mol) of methanol was distilled out. Then, the reaction was terminated. Thus was obtained compound (I-4). This reduced viscosity was 0.04 dl/g. As a result of the observation with a polarizing microscope in the same method as above, the compound exhibited anisotropy at temperatures ranging between 100 and 180° C. or so during heating and at temperatures ranging between 190° C. and room temperature during quenching.

Compound (I-5): Polyester Compound with Ether Bonds 0.5 mols of 2,6-NDCM and 1.05 mols of diethylene glycol were deposit into a reactor installed with a heater, a stirrer, a rectification column and a thermometer, and melted therein heat at 200° C. Next, a catalyst, titanium tetra-n-butoxide was added thereto in an amount of 0.10 mol % relative to 2,6-NDCM. This was gradually heated up to 240° C., and the reaction was terminated after a theoretical amount, 32 g (1.0 mol) of methanol was distilled out. Thus was obtained compound (I-5). This reduced viscosity was 0.05 dl/g.

Compound (I-6): Polyester Compound with Ether Bonds 0.5 mols of 2,6-NDCM and 1.02 mols of polyethylene glycol having a number-average molecular weight of 200 (PEG #200) were deposit into a reactor installed with a heater, a stirrer, a rectification column and a thermometer, and melted therein heat at 200° C. Next, a catalyst, titanium tetra-n-butoxide was added thereto in an amount of 0.06 mol % relative to 2,6-NDCM. This was gradually heated up to 270° C., whereupon 95% by weight of a theoretical amount, 30 g of methanol was distilled out over a period of 3 hours from the addition of the catalyst. Thus was obtained compound (I-6). This reduced viscosity was 0.08 dl/g.

Compound (I-7): Polyester Compound with Ether Bonds 0.5 mols of 2,6-NDCM and 1.02 mols of polyethylene glycol having a number-average molecular weight of 600 (PEG #600) were deposit into a reactor installed with a heater, a stirrer, a rectification column and a thermometer, and melted therein heat at 200° C. Next, a catalyst, titanium tetra-n-butoxide was added thereto in an amount of 0.06 mol % relative to 2,6-NDCM. This was gradually heated up to 270° C., whereupon 92% by weight of a theoretical amount, 29 g of methanol was distilled out over a period of about 4 hours from the addition of the catalyst. Thus was obtained compound (I-7). This reduced viscosity was 0.07 dl/g.

Compound (I-8): Polyester Compound with Ether Bonds 0.5 mols of 2,6-NDCM and 1.02 mols of polyethylene glycol having a number-average molecular weight of 650 (PTG #650) were deposit into a reactor installed with a heater, a stirrer, a rectification column and a thermometer, and melted therein heat at 200° C. Next, a catalyst, titanium tetra-n-butoxide was added thereto in an amount of 0.06 mol % relative to 2,6-NDCM. This was gradually heated up to 270° C., whereupon 93% by weight of a theoretical amount, 30 g of methanol was distilled out over a period of about 4 hours from the addition of the catalyst. Thus was obtained compound (I-8). This reduced viscosity was 0.07 dl/g.

Polyol (1):

Used was a polyester resin having a number-average molecular weight of about 2000.

Polyol (2):

Used was a polyester resin having a number-average molecular weight of about 3000.

Polyol (3);

Used was a polyester resin having a number-average molecular weight of about 5000.

Polyol (4):

Used was an acrylic resin having a number-average molecular weight of about 3000.

The chemical structural formulae of the above-mentioned compounds (I-1) to (I-8) are shown below.

Compound (I-1):

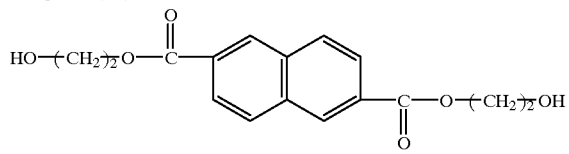

Compound (I-2):

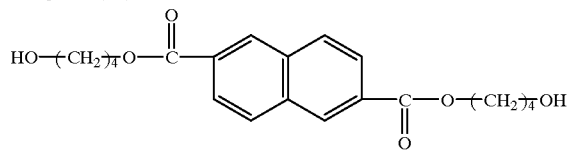

Compound (I-3):

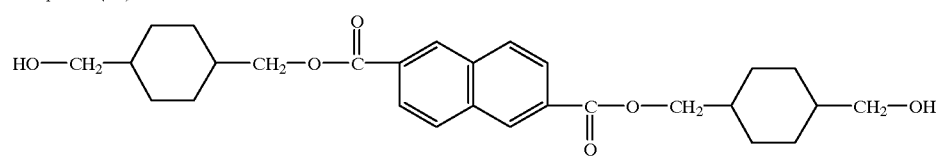

Compound (I-4):

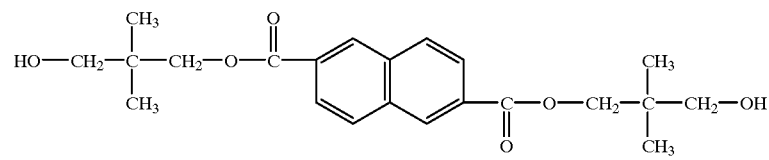

Compound (I-5):

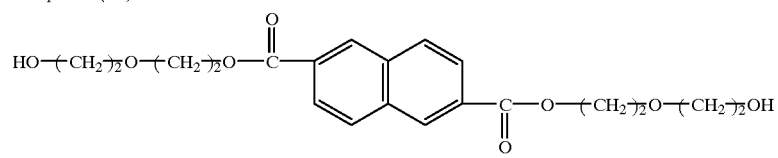

Compound (I-6):

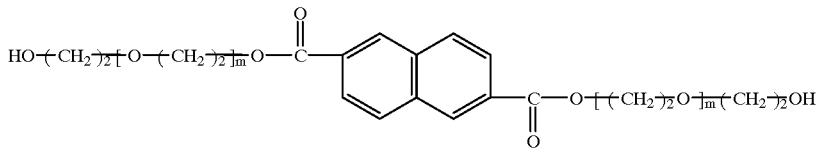

Compound (I-7):

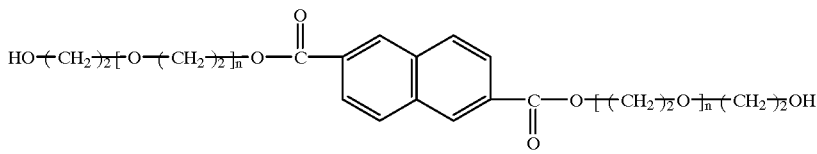

Compound (I-8):

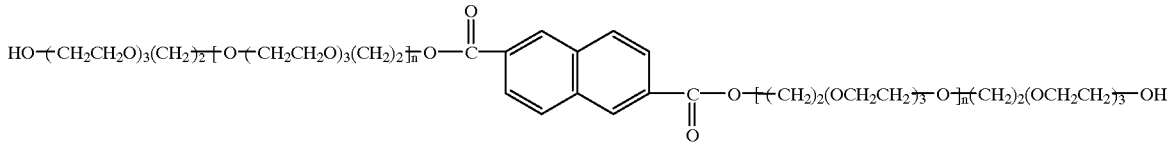

As the curing agent component, used was any of the following:

HDI Prepolymer (blocked polyisocyanate compound belonging to the group (b) defined herein):
This has an NCO content of about 7% by weight and a solid resin content of about 75% by weight.

HDI Isocyanurate (blocked polyisocyanate compound belonging to the group (b) defined herein):
This has an NCO content of about 11% by weight and a solid resin content of about 75% by weight.

Hydrogenated MDI Prepolymer (blocked polyisocyanate compound belonging to the group (b) defined herein):
This has an NCO content of about 9% by weight and a solid resin content of about 75% by weight.

TDI Prepolymer (blocked polyisocyanate compound belonging to the group (a) defined herein):
This has an NCO content of about 4% by weight and a solid resin content of about 50% by weight.

IPDI Isocyanurate (blocked polyisocyanate compound belonging to the group (a) defined herein):
This has an NCO content of about 8% by weight and a solid resin content of about 65% by weight.

MDI Adduct (blocked polyisocyanate compound belonging to the group (a) defined herein):
This has an NCO content of about 7% by weight and a solid resin content of about 70% by weight.

Using any of the compounds (I-1) to (I-8), any of the polyols (1) to (4) and any of the curing agents noted above, prepared were various coating compositions. Each coating composition was applied onto steel sheets to produce precoated steel sheets, specimens of the invention and comparative specimens mentioned below, and the properties of the coating film of each specimen were measured. The data are shown in Tables 1 to 15 along with the formulations of the coating compositions.

Specimen 1 of the invention:
40 parts of cyclohexanone was added to 3.0 parts of compound (I-1), and stirred for 12 hours. Prior to the addition, compound (I-1) was ground with a grinder into a powder of 250 μm or less. To the resulting dispersion of compound (I-1) in cyclohexanone, added were 56.1 parts of polyol (1), 20.5 parts of a curing agent of hydrogenated MDI prepolymer (this is a blocked polyisocyanate compound in the group (b) defined herein), 20.5 parts of a curing agent of IPDI isocyanurate (this is a blocked polyisocyanate compound in the group (a) defined herein), 100 parts of rutile-type titanium oxide, 10.0 parts of 10% solution of dibutyl tin dilaurate (hereinafter referred to as DBTDL) in cyclohexanone, and 4.8 parts of 50% solution of Acronal 4F (produced by BASF Co., Ltd.) in cyclohexanone. These were dispersed, using a sand mill containing glass beads of about 1 mm diameter therein, for about 30 minutes. Next, cyclohexanone was added to the resulting dispersion to make it have a nonvolatile content of 60%. Thus was prepared a coating composition. Using a bar coater, this was applied onto a hot-dip galvanized steel sheet (thickness: 0.5 mm, 0.4 mm) that had been treated by chromate treatment and primecoated with a polyester primer (film thickness: about 5 μm), at a dry film thickness of from 15 to 18 μm, and then baked in a hot-air drying furnace at 230±5° C. for 60 seconds. Thus was obtained a precoated steel sheet.

Specimens 2 to 4 of the invention:
Using the same compound, the same polyol and the same combination of curing agents as those for Specimen 1 but varying the amount of compound (I-1) added, different coating compositions were prepared as shown in Table 1. The amount of compound (I-1) was 5.0% by weight, 7.0% by weight and 12.0% by weight of the solid resin content, in Specimen 2, Specimen 3 and Specimen 4, respectively. These coating compositions were separately applied onto different steel sheets and then baked, in the same method as for Specimen 1, to obtain precoated steel sheets.

Specimens 5 to 10 of the invention:
Coating compositions were prepared in the same method as for Specimen 1, except that a mixture of any one of blocked polyisocyanate compounds in the group (a), TDI prepolymer, IPDI isocyanurate and MDI adduct, and any one of blocked polyisocyanate compounds in the group (b), HDI prepolymer, HDI isocyanurate and hydrogenated MDI prepolymer was used as the curing agent as in Table 1. These coating compositions were separately applied onto different steel sheets and then baked, in the same method as for Specimen 1, to obtain precoated steel sheets.

Specimens 11 to 18 of the invention:
Coating compositions were prepared in the same method as for Specimen 1, except that any of polyester compounds (I-2) to (I-8) was used and that a curing agent composed of any one of blocked polyisocyanate compounds in the group (a), TDI prepolymer, IPDI isocyanurate and MDI adduct, and any one of blocked polyisocyanate compounds in the group (b), HDI prepolymer, HDI isocyanurate and hydrogenated MDI prepolymer was used, as in Tables 3 and 4. These coating compositions were separately applied onto different steel sheets and then baked, in the same method as for Specimen 1, to obtain precoated steel sheets.

Comparative Specimen 1:

40 parts of cyclohexanone was added to 3.0 parts of compound (I-1), and stirred for 12 hours. Prior to the addition, compound (I-1) was ground with a grinder into a powder of 250 μm or less. To the resulting dispersion of compound (I-1) in cyclohexanone, added were 55.4 parts of polyol (1), 41.6 parts of a curing agent of hydrogenated MDI prepolymer, 100 parts of rutile-type titanium oxide, 10.0 parts of 10% solution of DBTDL in cyclohexanone, and 4.8 parts of 50% solution of Acronal 4F in cyclohexanone. These were dispersed, using a sand mill containing glass beads of about 1 mm diameter therein, for about 30 minutes. Next, cyclohexanone was added to the resulting dispersion to make it have a nonvolatile content of 60%. Thus was prepared a coating composition. Using a bar coater, this was applied onto a hot-dip galvanized steel sheet (thickness: 0.5 mm, 0.4 mm) that had been treated by chromate treatment and primecoated with a polyester primer (film thickness: about 5 μm), at a dry film thickness of from 15 to 18 μm, and then baked in a hot-air drying furnace at 230±50° C. for 60 seconds. Thus was obtained a precoated steel sheet.

Comparative Specimen 2:

Using almost the same amounts of the same components as in Comparative Specimen 1, but using IPDI isocyanurate alone as the curing agent, a coating composition was prepared in the same method as for Comparative Specimen 1, as in Table 6. This was applied onto a steel sheet and then baked, in the same method as for Comparative Specimen 1, to obtain a precoated steel sheet.

Comparative Specimens 3 and 4:

Using almost the same amounts of the same components as in Specimen 2 of the invention, but using hydrogenated MDI prepolymer or IPDI isocyanurate alone as the curing agent, coating compositions were prepared in the same method as for Comparative Specimen 1, as in Table 6. These coating compositions were separately applied onto different steel sheets and then baked, in the same method as for Comparative Specimen 1, to obtain precoated steel sheets.

Comparative Specimens 5 and 6:

Using almost the same amounts of the same components as in Specimen 4 of the invention, but using hydrogenated MDI prepolymer or IPDI isocyanurate alone as the curing agent, coating compositions were prepared in the same method as for Comparative Specimen 1, as in Table 6. These coating compositions were separately applied onto different steel sheets and then baked, in the same method as for Comparative Specimen 1, to obtain precoated steel sheets.

Comparative Specimens 7 to 10:

Coating compositions were prepared in the same method as for Comparative Specimen 1, except that polyol (1) and polyester compound (I-1) were used and that any one blocked polyisocyanate compound of HDI prepolymer, HDI isocyanurate, TDI prepolymer and MDI adduct was used singly as the curing agent, as in Table 6. These coating compositions were separately applied onto different steel sheets and then baked, in the same method as for Comparative Specimen 1, to obtain precoated steel sheets.

Comparative Specimens 11 and 12:

Using almost the same amounts of the same components as in Specimen 11 of the invention, but using hydrogenated MDI prepolymer or TDI alone as the curing agent, coating compositions were prepared in the same method as for Comparative Specimen 1, as in Table 8. These coating compositions were separately applied onto different steel sheets and then baked, in the same method as for Comparative Specimen 1, to obtain precoated steel sheets.

Comparative Specimens 13 and 14:

Using almost the same amounts of the same components as in Specimen 12 of the invention, but using HDI prepolymer or MDI adduct alone as the curing agent, coating compositions were prepared in the same method as for Comparative Specimen 1, as in Table 8. These coating compositions were separately applied onto different steel sheets and then baked, in the same method as for Comparative Specimen 1, to obtain precoated steel sheets.

Comparative Specimens 15 and 16:

Using almost the same amounts of the same components as in Specimen 15 of the invention, but using hydrogenated MDI prepolymer or IPDI isocyanurate alone as the curing agent, coating compositions were prepared in the same method as for Comparative Specimen 1, as in Table 9. These coating compositions were separately applied onto different steel sheets and then baked, in the same method as for Comparative Specimen 1, to obtain precoated steel sheets.

Comparative Specimens 17 and 18:

Using almost the same amounts of the same components as in Specimen 17 of the invention, but using HDI isocyanurate or IPDI isocyanurate alone as the curing agent, coating compositions were prepared in the same method as for Comparative Specimen 1, as in Table 9. These coating compositions were separately applied onto different steel sheets and then baked, in the same method as for Comparative Specimen 1, to obtain precoated steel sheets.

Comparative Specimens 19 and 20:

Using the same compound, the same polyol and the same combination of curing agents as for Specimen 1 of the invention, but varying the amount of compound (I-1) added, coating compositions were prepared in the same method as for Comparative Specimen 1, as in Table 11. The amount of compound (I-1) was 0.3% by weight and 18.0% by weight of the solid resin content, in Comparative Specimens 19 and 20, respectively. These coating compositions were separately applied onto different steel sheets and then baked, in the same method as for Comparative Specimen 1, to obtain precoated steel sheets.

Comparative Specimen 21:

Using the same compound, the same polyol and the same combination of curing agents as for Specimen 14 of the invention, but varying the amount of compound (I-4) added, a coating composition was prepared in the same method as for Comparative Specimen 1, as in Table 11. The amount of compound (I-4) was 0.5% by weight of the solid resin content. This was applied onto a steel sheet and then baked, in the same method as for Comparative Specimen 1, to obtain a precoated steel sheet.

Comparative Specimen 22:

Using the same compound, the same polyol and the same combination of curing agents as for Specimen 16 of the invention, but varying the amount of compound (I-6) added, a coating composition was prepared in the same method as for Comparative Specimen 1, as in Table 11. The amount of compound (I-6) was 18.0% by weight of the solid resin content. This was applied onto a steel sheet and then baked, in the same method as for Comparative Specimen 1, to obtain a precoated steel sheet.

Comparative Specimens 23 and 24:

Using the same compound and the same polyol as for Specimen 2 of the invention, but changing the combination of curing agents, coating compositions were prepared in the same method as for Comparative Specimen 1, as in Table 12. Regarding the combination of curing agents used, HDI isocyanurate and hydrogenated MDI prepolymer as combined were used in Comparative Specimen 23, while IPDI isocyanurate and MDI adduct were in Comparative Specimen 24. These coating compositions were separately applied onto different steel sheets and then baked, in the same method as for Comparative Specimen 1, to obtain precoated steel sheets.

Comparative Specimens 25 and 26:

Using the same compound and the same polyol as for Specimen 14 of the invention, but changing the combination of curing agents, coating compositions were prepared in the same method as for Comparative Specimen 1, as in Table 12. Regarding the combination of curing agents used, HDI prepolymer and hydrogenated MDI prepolymer as combined were used in Comparative Specimen 25, while TDI prepolymer and IPDI isocyanurate were in Comparative Specimen 26. These coating compositions were separately applied onto different steel sheets and then baked, in the same method as for Comparative Specimen 1, to obtain precoated steel sheets.

Comparative Specimens 27 and 28:

Using the same compound, the same polyol and the same combination of curing agents as for Specimen 2 of the invention, but varying the ratio of hydrogenated MDI prepolymer to IPDI isocyanurate in the combination of curing agents used, coating compositions were prepared in the same method as for Comparative Specimen 1, as in Table 14. The ratio of (A)/(B) in the combination of curing agents used was 20/80 in Comparative Specimen 27 and was 80/20 in Comparative Specimen 28. These coating compositions were separately applied onto different steel sheets and then baked, in the same method as for Comparative Specimen 1, to obtain precoated steel sheets.

Comparative Specimens 29 and 30:

Using the same compound, the same polyol and the same combination of curing agents as for Specimen 6 of the invention, but varying the molar ratio, [NCO]/[OH], of isocyanato groups in the combined curing agents, [NCO], to hydroxyl groups in compound (I-1) and polyol (1), [OH], coating compositions were prepared in the same method as for Comparative Specimen 1, as in Table 14. The molar ratio of [NCO]/[OH] was 0.7 in Comparative Specimen 29 and was 1.3 in Comparative Specimen 30. These coating compositions were separately applied onto different steel sheets and then baked, in the same method as for Comparative Specimen 1, to obtain precoated steel sheets.

The testing conditions and evaluation for the characteristics of the specimens are mentioned below.

(1) Film appearance

Each baked specimen was visually checked as to whether its surface condition is good or not good.

(2) Gloss

According to JIS K5400, Section 7.6, the mirror reflectivity (%) of each specimen was measured at 60°. Based on the data, the specimens were evaluated and ranked as follows:

⊚: gloss of 80 or more

○: gloss of from 70 to less than 80

Δ: gloss of from 60 to less than 70

×: gloss of less than 60

(3) Pencil Hardness

Using Mitsubishi's pencils "Uni", the pencil hardness of each specimen was measured according to JIS K5400, Section 8.4.2. The critical hardness of the pencil with which the specimen was not scratched is shown. H+ indicates the range between H and 2H, and F+ indicates the range between F and H.

(4) Workability (flexibility)

A precoated steel sheet specimen was previously bent in a room at 20° C., using a bending vice as stipulated in JIS G3312, Section 12.2.2 (this corresponds to the measurement of bending resistance). Next, a plural number, n, of the same test plates were inserted inside the thus-bent specimen, which was further bent using a press. The bent portion of the specimen was observed with a 30× magnifier. The minimum number, n, of the test plates as inserted inside the bent specimen without making the film on the bent specimen cracked was counted. The thus-counted minimum number with "T", such as 1T, 2T, 3T, is given in the following tables to show the workability of the specimen tested. This workability test was made for two steel sheets having a thickness of 0.5 mm and 0.4 mm, as follows:

Workability Test 1: Used was a hot-dip galvanized steel sheet having a thickness of 0.5 mm (ranging between 0.45 and 0.50 mm).

Workability Test 2: Used was a hot-dip galvanized steel sheet having a thickness of 0.4 mm (ranging between 0.35 and 0.40 mm).

(5) Impact Resistance

Using a DuPont's impact tester, the impact resistance of each specimen was determined in accordance with JIS K5400, Section 8.3.2. Precisely, a ball weighing 1.0 kg or 1.5 kg was dropped down onto the film of each specimen from a varying height, the largest height being 50 cm. Then, the surface of the film was observed with a 30× magnifier. The largest height from which the ball was dropped down without making the surface of the tested film cracked was obtained and multiplied by the weight of the ball. The data thus obtained indicate the impact resistance of each specimen.

(6) Solvent Resistance (in terms of the number of rubbings with MEK)

The surface of the film of each specimen was rubbed with gauze as impregnated with methyl ethyl ketone (MEK), under a load of 1.0 kg. One back-and-force rubbing operation is referred to as one cycle. The number of cycles applied to each specimen without making the primer exposed out was counted. The largest number of cycles was limited to 100.

(7) Stain Resistance (to oily ink)

In accordance with JIS K5400, Section 8.10, the surface of the film of each specimen was painted with red and black, quick drying ink, using a marking pen, in a room at 20° C. After 24 hours, each specimen was wiped with absorbent cotton as impregnated with a solution of petroleum benzine/ethanol (50/50) to remove the painted ink. ΔE (=geometric mean of [L, a, b values after the test]–[L, a, b values before the test]) of each specimen was measured, using a spectrometer in accordance with JIS Z8722, Section 4.2, on the basis of which the stain resistance of each specimen was evaluated and ranked as follows:

⊚: ΔE is from 0 to less than 5.

○: ΔE is from 5 to less than 15.

Δ: ΔE is from 15 to less than 25.

×: ΔE is 25 or more.

As in Tables 1 to 15, it is known that the precoated steel sheet specimens of the invention, of which the thickness of the steel sheet substrate was 0.5 mm or 0.4 mm, had high hardness, good workability and good stain resistance, and that their gloss and solvent resistance were good.

As opposed to those, many of comparative specimens 1 to 18, in which was used the blocked polyisocyanate compound alone of any one of groups (a) and (b) defined herein, had poor stain resistance, though having balanced hardness and workability in some degree due to the effect of the anisotropic polyester compound, when the steel sheet substrate had a thickness of 0.5 mm. Some of those comparative specimens, though having good stain resistance, had poor workability and low impact resistance, when the steel sheet substrate had a thickness of 0.4 mm.

Of comparative specimens 19 to 22, in which the amount of the polyester compound overstepped the defined range of the invention, those in which the amount of the polyester compound was smaller than the defined range were not good as the hardness and the stain resistance of the coating film were poor, while those in which the amount of the polyester compound was larger than the defined range were also not good as the coating film was not smooth, resulting in that its gloss was lowered and its stain resistance was physically lowered.

In comparative specimens 23 to 26, the curing agent used was comprised of two different blocked polyisocyanate compounds as selected from one and the same group (a) or (b). All these comparative specimens did not have well-balanced hardness, workability and stain resistance, and at least one of those properties of these comparative specimens was poor.

In comparative specimens 27 and 28, the curing agent used was comprised of two different blocked polyisocyanate compounds, one selected from the group (a) while the other from the group (b), but in these, the ratio of the blocked polyisocyanate compounds overstepped the preferred range. Both these comparative specimens did not have well-balanced hardness, workability and stain resistance, and at least one of those properties of these comparative specimens was poor.

Comparative specimens 29 and 30 overstepped the preferred range for the molar ratio, [NCO]/[OH], of the isocyanato groups in the curing agent, [NCO], to the hydroxyl groups in the polyester compound i) and the polyol ii), [OH]. Both these comparative specimens did not have well-balanced hardness, workability and stain resistance, and at least one of those properties of these comparative specimens was poor.

Example 2

A hot-dip galvanized steel sheet substrate having a thickness of 0.5 mm (the amount of the zinc plate of this substrate was 30 g/m$^2$/one surface) was degreased, and processed with a non-rinse type chromate solution (Surfcoat NRC300, produced by Nippon Paint Co., Ltd.). The thus-processed surface of this substrate was coated with any of the prime coating compositions shown in Tables 18 and 19 to form an prime coating film, and then with the topcoating composition shown in Table 20 to form an topcoating film. Thus were produced various precoated steel sheet specimens. The properties of those specimens are shown in Tables 21 and 22 along with the conditions for producing them.

The prime coating compositions, A-1 to A-4 and B-1 to B-4 shown in Tables 18 and 19, and the topcoating composition C-1 shown in Table 20 were prepared according to the methods mentioned below.
(1) Prime coating Compositions:
(1-1) Preparation of Polyester Resins, a-1 to a-4:

Dimethyl terephthalate, dimethyl isophthalate, adipic acid, ethylene glycol, neopentyl glycol, 1,6-hexane-diol and manganese acetate were deposit into a reactor installed with a heater, a stirrer, a rectification column, a pressure-reducing device and a thermometer, as in Table 16, and gradually heated in a nitrogen atmosphere up to a temperature falling between 160 and 220° C. over a period of about 4 hours to effect interesterification, while removing ethanol through distillation. Then, this was subjected to polycondensation under a reduced pressure of from 0.5 to 5.0 mmHg at 260° C. for about 2 hours. Thus were obtained polyester resins a-1 to a-4 as in Table 16. Each of the thus-obtained polyester resins was dissolved in a mixed solvent of cyclohexanone/Solvesso 150 (50/50, by weight) to prepare a resin solution having a nonvolatile content of 40%. The molecular weight of each polyester resin being produced was controlled by varying the polycondensation time. The number-average molecular weight of each resin was measured in terms of polystyrene, through gel permeation chromatography.
(1-2) Preparation of Bisphenol A-added Polyester Resins, b-1 to b-4:

Dimethyl terephthalate, dimethyl isophthalate, ethylene glycol, bisphenol A-ethylene oxide (2 mols) adduct, and manganese acetate were deposit into a reactor installed with a heater, a stirrer, a rectification column, a pressure-reducing device and a thermometer, as in Table 17, and gradually heated in a nitrogen atmosphere up to a temperature falling between 160 and 220° C. over a period of about 4 hours to effect interesterification, while removing ethanol through distillation. Then, this was subjected to polycondensation under a reduced pressure of from 0.5 to 5.0 mmHg at 260° C. for about 2 hours. Thus were obtained bisphenol A-added polyester resins b-1 to b-4 as in Table 17. Each of the thus-obtained, bisphenol A-added polyester resins was dissolved in a mixed solvent of cyclohexanone/Solvesso 150 (50/50, by weight) to prepare a resin solution having a nonvolatile content of 40%. The molecular weight of each bisphenol A-added polyester resin being produced was controlled by varying the polycondensation time. The number-average molecular weight of each resin was measured in terms of polystyrene, through gel permeation chromatography.
(1-3) Production of Prime coating Compositions, A-1 to A-4, and B-1 to B-4:

Using polyester resins, a-1 to a-4, and bisphenol A-added polyester resins, b-1 to b-4, prepared in (1-1) and (1-2), produced were coating compositions, A-1 to A-4, and B-1 to B-4, as in Tables 18 and 19. To those compositions, added was a pigment, strontium chromate, and milled, using a sand mill, until the grain size of the pigment grains added became 5 μm or smaller. In Tables 18 and 19, shown is the strontium chromate content of the dry film, per μm of the film.

To measure the breaking elongation and the breaking strength of the prime coating film to be formed from each prime coating composition, each prime coating composition was formed into a free film (test film piece) having a width of 5 mm and a thickness of 8±1 μm The test film pieces were tested by an Orientec's Tensilon tensile tester, at a tensile speed of 10 mm/min.
(2) Topcoating Composition:

To the polyester compound (I-1) used in Example 1, added were the polyester resin, the curing agent, the pigment, the curing catalyst and the additive, as in Table 20. Then, this was milled for about 30 minutes, using a sand mill containing glass beads of about 1 mm in diameter. Next, cyclohexanone was added to the resulting dispersion to make it have a nonvolatile content of 60%. Thus was prepared a coating composition, C-1.

The testing conditions and evaluation for the characteristics of the specimens are mentioned below.

(1) Film appearance

This is the same as in Example 1.

(2) Pencil Hardness

This is the same as in Example 1.

(3) Workability 3 (flexibility)

Using a V-shape bending mold such as that illustrated in FIG. 1, each precoated steel sheet specimen was previously bent in V-shape at a bending rate of 10 mm/min, in a room at 20° C. The thus-bent specimen was then subjected to a 180-degree contact bending (OT) test and to a 1T bending test. The film surface in the bent portion of the specimen was observed with a 30× magnifier, as to whether or not small pin holes or cracks were formed in the film. Each specimen was evaluated and ranked as follows:

⊚: Neither pin holes nor cracks were found.

○: From 1 to 5 small pin holes/cm were found.

Δ: From 6 to 20 small pin holes/cm were found.

Δ: More than 20 small pin holes/cm and cracks were found.

(4) Adhesiveness (cross-cuts peeling test, according to JIS K5400, Section 8.5 for adhesion test)

100 cross-cuts of 10 mm×10 mm were formed on the cured film of each specimen at intervals of 1 mm, using a cutter knife, and an adhesive tape was attached under pressure to the thus-cut film and then forcedly peeled off, whereupon the condition of the cross-cuts of the film was observed and the number of cross-cuts peeled off along with the adhesive tape was counted. Each specimen was evaluated and ranked as follows:

⊚: No peeling.

○: From 90 to less than 100 cross-cuts remained without being peeled.

Δ: From 80 to less than 90 cross-cuts remained without being peeled.

×: Less than 80 cross-cuts remained without being peeled.

From Tables 21 and 22, it is known that the precoated steel sheet specimens of the invention as produced by forming the prime coating film having the specifically-defined physical properties followed by forming the topcoating film of the invention on the prime coating film had good workability (this is evaluated in terms of the flexibility tested herein) and high film hardness.

Example 3

A hot-dip galvanized steel sheet substrate having a thickness of 0.5 mm (the amount of the zinc plate of this substrate was 30 g/m²/one surface) was degreased, and processed with a non-rinse type chromate solution(Surfcoat NRC300, produced by Nippon Paint Co., Ltd.). The thus-processed surface of this substrate was coated with any of the prime coating compositions shown in Table 23 to form an prime coating film, and then with the topcoating composition shown in Table 24 to form an topcoating film. Thus were produced various precoated steel sheet specimens. The properties of those specimens are shown in Tables 25 and 26 along with the conditions for producing them.

The prime coating compositions, P-1 to P-4 shown in Table 23, and the topcoating composition C-2 shown in Table 24 were prepared according to the methods mentioned below.

(1) Prime Coating Compositions:

The resin component was mixed with the pigments, as in Table 23, and milled, using a sand mill, until the grain size of the pigment grains added became 5 μm or smaller. Thus were prepared prime coating compositions, P-1 to P-4.

(2) Topcoating Composition:

To the polyester compound (I-1) used in Example 1, added were the polyester resin, the curing agent, the pigment, the curing catalyst and the additive, as in Table 24. Then, this was milled for about 30 minutes, using a sand mill containing glass beads of about 1 mm in diameter. Next, cyclohexanone was added to the resulting dispersion to make it have a nonvolatile content of 60%. Thus was prepared a coating composition, C-2.

The testing conditions and evaluation for the characteristics of the specimens are mentioned below.

(1) Film appearance

This is the same as in Example 1.

(2) Pencil Hardness

This is the same as in Example 1.

(3) Workability (flexibility)

A precoated steel sheet specimen was previously bent at 20° C. by a pench vice as stipulated in JIS G3312, Section 12.2.2 (bending test). The thus-bent specimen was then subjected to a 180-degree contact bending test. The film surface in the bent portion of the specimen was observed with a 30× magnifier, as to whether or not small pin holes or cracks were formed in the film. Each specimen was evaluated and ranked as follows:

⊚: Neither pin holes nor cracks were found.

○: From 1 to 5 small pin holes/cm were found.

Δ: From 6 to 20 small pin holes/cm were found.

×: More than 20 small pin holes/cm and cracks were found.

(4) Adhesiveness (cross-cut peeling test)

This is the same as in Example 2

(5) Corrosion Resistance in flat area (according to JIS K5400, Section 9.1 for salt spray resistance)

A tape seal was attached to both surfaces of each tabular, precoated steel sheet specimen. The specimen was cut from the non-coated surface toward the coated surface at its right side edge and from the coated surface toward the non-coated surface at its left side edge. This was subjected to a salt spray test (SST) for 240 hours. After this, the cut edge at the right side (at which the specimen was cut from the non-coated surface toward the coated surface) of the specimen was subjected to a tape-peeling test. The corrosion resistance of the specimen was evaluated and ranked as follows:

⊚: Less than 3 mm of the coating film peeled off from the cut edge.

○: From 3 mm to less than 5 mm of the coating film peeled off from the cut edge.

Δ: From 5 mm to less than 10 mm of the coating film peeled off from the cut edge.

×: The length of the coating film peeled off from the cut edge was 10 mm or more.

From Tables 25 and 26, it is known that the precoated steel sheet specimens of the invention, which had the topcoating film as formed on the prime coating film containing a suitable amount of strontium chromate, had especially excellent corrosion resistance.

Example 4

A hot-dip galvanized steel sheet substrate having a thickness of 0.5 mm (the amount of the zinc plate of this substrate was 30 g/m²/one surface) was degreased, and processed with a non-rinse type chromate solution (the chromate amount adhered was 30 mg/m² in terms of metal chromium). A polyester primer was applied onto the thus-processed surface of this substrate at a dry thickness of 5 μm. Then, this was baked at a temperature of up to 215° C. as the peak metal temperature of the steel sheet, for 60 seconds to form the prime coating film. Next, an topcoating composition as prepared by adding wax shown in Table 27 to the composition of Table 20 was applied over the prime coating film, and then baked at a temperature of up to 230° C. as the peak metal temperature of the steel sheet, for 60 seconds to form the topcoating film. Thus were produced various precoated steel sheet specimens. The properties of those specimens are shown in Table 28 along with the conditions for producing them.

The methods for testing and evaluating the characteristics of the precoated steel sheet specimens prepared herein are mentioned below.

(1) Film appearance

This is the same as in Example 1.

(2) Pencil Hardness

This is the same as in Example 1.

(3) Roll Abrasion Resistance

Each specimen having a size of 10 cm×30 cm was worked, using a roll-forming machine (rolls were made of chromium-plated steel). The working speed was 2 m/min; and the machine had 8 roll-forming stages. The surface of the coating film of the thus roll-formed specimen was observed, from which the specimen was evaluated and ranked as follows:

○: Good.

Δ: Scratched slightly.

×: Not good.

(4) Cylinder Drawing Workability

Using a cylinder drawing machine, each specimen having a size of 10 cm×10 cm was drawn under the drawing conditions of specimen size=90 φ, die=42.4 φ×5 R, plunger=40.4 φ×4 R, holding pressure=2.0 tons. The surface of the coating film of the thus-drawn specimen was observed, from which the specimen was evaluated and ranked as follows;

○: Good.

Δ: Some scratches formed.

×: Not good.

(5) Repetitive Abrasion Resistance

Using a repetitive abrasion tester, each specimen was repeatedly abraded until its surface was scratched. The number of repetitions before the surface of the specimen being tested was scratched was counted, from which the specimen was evaluated.

As in Table 28, it is known that the precoated steel sheet specimens of the invention, which had the topcoating film containing a suitable amount of wax and formed on the prime coating film, had especially excellent scratch resistance.

Example 5

Compounds (II-1) to (II-3) and polyols (1) to (4) used in this Example were prepared according to the methods mentioned below.

Compound (II-1): Polyester Compound 200 parts by weight of dimethyl 1,4-cyclohexane-dicarboxylate (of which the trans-isomer content was 20%; produced by Towa Chemical Industry Co., Ltd.), 130 parts by weight of ethylene glycol, and 0.53 parts by weight of titanium tetra-n-butoxide were deposit into a reactor installed with a heater, a stirrer, a rectification column and a thermometer, and gradually heated up to 240° C., whereupon 64 parts by weight of methanol was distilled out over a period of about 5 hours. Then, the reaction was terminated. Thus was obtained compound (II-1). This was a white waxy solid at room temperature, and its molecular weight as measured through field deionization mass spectrography (hereinafter referred to as FD-MS) was 260.

Compound (II-2): Polyester Compound 200 parts by weight of dimethyl 1,4-cyclohexane-dicarboxylate (of which the trans-isomer content was 99%; produced by Towa Chemical Industry Co., Ltd.), 130 parts by weight of ethylene glycol, and 0.53 parts by weight of titanium tetra-n-butoxide were deposit into a reactor installed with a heater, a stirrer, a rectification column and a thermometer, and gradually heated up to 240° C., whereupon 64 parts by weight of methanol was distilled out over a period of about 5 hours. Then, the reaction was terminated. Thus was obtained compound (II-2). This was a white waxy solid at room temperature, and its molecular weight as measured through FD-MS was 260.

Compound (II-3): Polyester Compound 200 parts by weight of dimethyl 1,4-cyclohexane-dicarboxylate (of which the trans-isomer content was 20%; produced by Towa Chemical Industry Co., Ltd.), 248 parts by weight of 1,6-hexanediol, and 0.53 parts by weight of titanium tetra-n-butoxide were deposit into a reactor installed with a heater, a stirrer, a rectification column and a thermometer, and gradually heated up to 240° C., whereupon 64 parts by weight of methanol was distilled out over a period of about 5 hours. Then, the reaction was terminated. Thus was obtained compound (II-3). This was a white waxy solid at room temperature, and its molecular weight as measured through FD-MS was 372.

Polyol (1):

Used was a polyester resin having a number-average molecular weight of about 2000.

Polyol (2):

Used was a polyester resin having a number-average molecular weight of about 3000.

Polyol (3):

Used was a polyester resin having a number-average molecular weight of about 5000.

Polyol (4):

Used was an acrylic resin having a number-average molecular weight of about 3000.

The chemical structural formulae of the above-mentioned compounds (II-1) to (II-3) are shown below.

Compound (II-1):

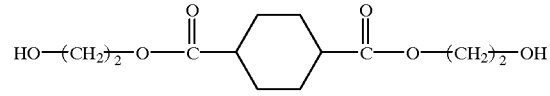

Compound (II-2):

Compound (II-3):

As the curing agents, used were the same as those in Example 1.

Using any of the compounds (II-1) to (II-3), any of the polyols (1) to (4) and any of the curing agents noted above, prepared were various coating compositions. Each coating composition was applied onto steel sheets to produce precoated steel sheets, specimens of the invention and comparative specimens mentioned below, and the properties of the coating film of each specimen were measured. The data are shown in Tables 29 to 40 along with the formulations of the coating compositions.

Specimen 1 of the invention:

40 parts of cyclohexanone was added to 3.0 parts of compound (II-1), and stirred for 12 hours. Prior to the addition, compound (II-1) was ground with a grinder into a powder of 250 µm or less. To the resulting dispersion of compound (II-1) in cyclohexanone, added were 55.3 parts of polyol (1), 20.9 parts of a curing agent of hydrogenated MDI prepolymer (this is a blocked polyisocyanate compound in the group (b) defined herein), 20.9 parts of a curing agent of IPDI isocyanurate (this is a blocked polyisocyanate compound in the group (a) defined herein), 100 parts of rutile-type titanium oxide, 10.0 parts of 10% solution of dibutyl tin dilaurate (hereinafter referred to as DBTDL) in cyclohexanone, and 4.8 parts of 50% solution of Acronal 4F (produced by BASF Co., Ltd.) in cyclohexanone. These were dispersed, using a sand mill containing glass beads of about 1 mm diameter therein, for about 30 minutes. Next, cyclohexanone was added to the resulting dispersion to make it have a nonvolatile content of 60%. Thus was prepared a coating composition. Using a bar coater, this was applied onto a hot-dip galvanized steel sheet (thickness: 0.5 mm, 0.4 mm) that had been treated by chromate treatment and primecoated with a polyester primer (film thickness: about 5 µm), at a dry film thickness of from 15 to 18 µm, and then baked in a hot-air drying furnace at 230±5° C. for 60 seconds. Thus was obtained a precoated steel sheet.

Specimens 2 to 4 of the invention:

Using the same compound, the same polyol and the same combination of curing agents as those for Specimen 1 but varying the amount of compound (II-1) added, different coating compositions were prepared as shown in Table 29. The amount of compound (II-1) was 5.0% by weight, 10.0% by weight and 18.0% by weight of the solid resin content, in Specimen 2, Specimen 3 and Specimen 4, respectively. These coating compositions were separately applied onto different steel sheets and then baked, in the same method as for Specimen 1, to obtain precoated steel sheets.

Specimens 5 to 10 of the invention:

Coating compositions were prepared in the same method as for Specimen 1, except that a mixture of any one of blocked polyisocyanate compounds in the group (a), TDI prepolymer, IPDI isocyanurate and MDI adduct, and any one of blocked polyisocyanate compounds in the group (b), HDI prepolymer, HDI isocyanurate and hydrogenated MDI prepolymer was used as the curing agent as in Table 29. These coating compositions were separately applied onto different steel sheets and then baked, in the same method as for Specimen 1, to obtain precoated steel sheets.

Specimens 11 to 17 of the invention:

Coating compositions were prepared in the same method as for Specimen 1, except that polyester compound (II-2) or (II-3) was used and that a curing agent composed of any one of blocked polyisocyanate compounds in the group (a), TDI prepolymer, IPDI isocyanurate and MDI adduct, and any one of blocked polyisocyanate compounds in the group (b), HDI prepolymer, HDI isocyanurate and hydrogenated MDI prepolymer was used, as in Table 31. These coating compositions were separately applied onto different steel sheets and then baked, in the same method as for Specimen 1, to obtain precoated steel sheets.

Comparative Specimen 1:

40 parts of cyclohexanone was added to 3.0 parts of compound (II-1), and stirred for 12 hours. Prior to the addition, compound (II-1) was ground with a grinder into a powder of 250 µm or less. To the resulting dispersion of compound (II-1) in cyclohexanone, added were 54.6 parts of polyol (1), 42.4 parts of a curing agent of hydrogenated MDI prepolymer, 100 parts of rutile-type titanium oxide, 10.0 parts of 10% solution of DBTDL in cyclohexanone, and 4.8 parts of 50% solution of Acronal 4F in cyclohexanone. These were dispersed, using a sand mill containing glass beads of about 1 mm diameter therein, for about 30 minutes. Next, cyclohexanone was added to the resulting dispersion to make it have a nonvolatile content of 60%. Thus was prepared a coating composition. Using a bar coater, this was applied onto a hot-dip galvanized steel sheet (thickness: 0.5 mm, 0.4 mm) that had been treated by chromate treatment and primecoated with a polyester primer (film thickness: about 5 µm), at a dry film thickness of from 15 to 18 µm, and then baked in a hot-air drying furnace at 230±5° C. for 60 seconds. Thus was obtained a precoated steel sheet.

Comparative Specimen 2:

Using almost the same amounts of the same components as in Comparative Specimen 1, but using IPDI isocyanurate alone as the curing agent, a coating composition was prepared in the same method as for Comparative Specimen 1, as in Table 33. This was applied onto a steel sheet and then baked, in the same method as for Comparative Specimen 1, to obtain a precoated steel sheet.

Comparative Specimens 3 and 4:

Using almost the same amounts of the same components as in Specimen 2 of the invention, but using hydrogenated MDI prepolymer or IPDI isocyanurate alone as the curing agent, coating compositions were prepared in the same method as for Comparative Specimen 1, as in Table 33. These coating compositions were separately applied onto different steel sheets and then baked, in the same method as for Comparative Specimen 1, to obtain precoated steel sheets.

Comparative Specimens 5 and 6:

Using almost the same amounts of the same components as in Specimen 3 of the invention, but using hydrogenated MDI prepolymer or IPDI isocyanurate alone as the curing agent, coating compositions were prepared in the same method as for Comparative Specimen 1, as in Table 33. These coating compositions were separately applied onto different steel sheets and then baked, in the same method as for Comparative Specimen 1, to obtain precoated steel sheets.

Comparative Specimens 7 to 10:

Coating compositions were prepared in the same method as for Comparative Specimen 1, except that polyol (1) and polyester compound (II-1) were used and that any one blocked polyisocyanate compound of HDI prepolymer, HDI isocyanurate, TDI prepolymer and MDI adduct was used singly as the curing agent, as in Table 33. These coating compositions were separately applied onto different steel sheets and then baked, in the same method as for Comparative Specimen 1, to obtain precoated steel sheets.

Comparative Specimens 11 and 12:

Using almost the same amounts of the same components as in Specimen 11 of the invention, but using hydrogenated MDI prepolymer or TDI alone as the curing agent, coating compositions were prepared in the same method as for Comparative Specimen 1, as in Table 35. These coating compositions were separately applied onto different steel sheets and then baked, in the same method as for Comparative Specimen 1, to obtain precoated steel sheets.

Comparative Specimens 13 and 14:

Using almost the same amounts of the same components as in Specimen 15 of the invention, but using HDI isocyanurate or MDI adduct alone as the curing agent, coating compositions were prepared in the same method as for Comparative Specimen 1, as in Table 35. These coating compositions were separately applied onto different steel sheets and then baked, in the same method as for Comparative Specimen 1, to obtain precoated steel sheets.

Comparative Specimens 15 and 16:

Using almost the same amounts of the same components as in Specimen 17 of the invention, but using HDI isocyanurate or IPDI isocyanurate alone as the curing agent, coating compositions were prepared in the same method as for Comparative Specimen 1, as in Table 35. These coating compositions were separately applied onto different steel sheets and then baked, in the same method as for Comparative Specimen 1, to obtain precoated steel sheets.

Comparative Specimens 17 and 18:

Using the same compound, the same polyol and the same combination of curing agents as for Specimen 1 of the invention, but varying the amount of compound (II-1) added, coating compositions were prepared in the same method as for Comparative Specimen 1, as in Table 37. The amount of compound (II-1) was 0.3% by weight and 20.0% by weight of the solid resin content, in Comparative Specimens 17 and 18, respectively. These coating compositions were separately applied onto different steel sheets and then baked, in the same method as for Comparative Specimen 1, to obtain precoated steel sheets.

Comparative Specimens 19 and 20:

Using the same compound and the same polyol as for Specimen 15 of the invention, but changing the combination of curing agents, coating compositions were prepared in the same method as for Comparative Specimen 1, as in Table 37. Regarding the combination of curing agents used, HDI isocyanurate and hydrogenated MDI prepolymer as combined were used in Comparative Specimen 19, while IPDI isocyanurate and MDI adduct were in Comparative Specimen 20. These coating compositions were separately applied onto different steel sheets and then baked, in the same method as for Comparative Specimen 1, to obtain precoated steel sheets.

Comparative Specimens 21 and 22:

Using the same compound, the same polyol and the same combination of curing agents as for Specimen 2 of the invention, but varying the ratio of hydrogenated MDI prepolymer to IPDI isocyanurate in the combination of curing agents used, coating compositions were prepared in the same method as for Comparative Specimen 1, as in Table 39. The ratio of (A)/(B) in the combination of curing agents used was 20/80 in Comparative Specimen 21 and was 80/20 in Comparative Specimen 22. These coating compositions were separately applied onto different steel sheets and then baked, in the same method as for Comparative Specimen 1, to obtain precoated steel sheets.

Comparative Specimens 23 and 24:

Using the same compound, the same polyol and the same combination of curing agents as for Specimen 6 of the invention, but varying the molar ratio, [NCO]/[OH], of isocyanato groups in the combined curing agents, [NCO], to hydroxyl groups in compound (II-1) and polyol (1), [OH], coating compositions were prepared in the same method as for Comparative Specimen 1, as in Table 39. The molar ratio of [NCO]/[OH] was 0.7 in Comparative Specimen 23 and was 1.3 in Comparative Specimen 24. These coating compositions were separately applied onto different steel sheets and then baked, in the same method as for Comparative Specimen 1, to obtain precoated steel sheets.

The conditions for testing the characteristics of the specimens prepared herein and the methods for evaluating the specimens are mentioned below.

(1) Film appearance
  This is the same as in Example 1.
(2) Gloss
  This is the same as in Example 1.
(3) Pencil Hardness
  This is the same as in Example 1.
(4) Workability (Flexibility)
  This is the same as in Example 1.
(5) Impact Resistance
  This is the same as in Example 1.
(6) Solvent Resistance (in terms of the number of rubbings with MEK)
  This is the same as in Example 1.
(7) Stain Resistance (to oily ink)
  This is the same as in Example 1.

As in Tables 29 to 40, it is known that the precoated steel sheet specimens of the invention, of which the thickness of the steel sheet substrate was 0.5 mm or 0.4 mm, had high hardness, good workability and good stain resistance, and that their gloss and solvent resistance were good.

As opposed to those, many of comparative specimens 1 to 16, in which was used the blocked polyisocyanate compound alone of any one of groups (a) and (b) defined herein, had poor stain resistance, though having balanced hardness and workability in some degree due to the effect of the anisotropic polyester compound, when the steel sheet substrate had a thickness of 0.5 mm. Some of those comparative specimens, though having good stain resistance, had poor workability and low impact resistance, when the steel sheet substrate had a thickness of 0.4 mm.

Of comparative specimens 17 and 18, in which the amount of the polyester compound overstepped the defined range of the invention, one in which the amount of the polyester compound was smaller than the defined range was not good as the hardness and the stain resistance of the coating film were poor, while the other in which the amount of the polyester compound was larger than the defined range was also not good as the coating film was not smooth, resulting in that its gloss was lowered and its stain resistance was physically lowered.

In comparative specimens 19 and 20, the curing agent used was comprised of two different blocked polyisocyanate compounds as selected from one and the same group (a) or (b). Both these comparative specimens did not have well-balanced hardness, workability and stain resistance, and at least one of those properties of these comparative specimens was poor.

In comparative specimens 21 and 22, the curing agent used was comprised of two different blocked polyisocyanate compounds, one selected from the group (a) while the other from the group (b), but in these, the ratio of the blocked polyisocyanate compounds overstepped the preferred range. Both these comparative specimens did not have well-balanced hardness, workability and stain resistance, and at least one of those properties of these comparative specimens was poor.

Comparative specimens 23 and 24 overstepped the preferred range for the molar ratio, [NCO]/[OH], of the isocyanato groups in the curing agent, [NCO], to the hydroxyl groups in the polyester compound i) and the polyol ii), [OH] . Both these comparative specimens did not have well-balanced hardness, workability and stain resistance, and at least one of those properties of these comparative specimens was poor.

Example 6

A hot-dip galvanized steel sheet substrate having a thickness of 0.5 mm (the amount of the zinc plate of this substrate was 30 g/m²/one surface) was degreased, and processed with a non-rinse type chromate solution (Surfcoat NRC300, produced by Nippon Paint Co., Ltd.). The thus-processed surface of this substrate was coated with any of the prime coating compositions shown in Tables 18 and 19 to form an prime coating film, and then with the topcoating composition shown in Table 41 to form an topcoating film. Thus were produced various precoated steel sheet specimens. The properties of those specimens are shown in Tables 42 and 43 along with the conditions for producing them.

The prime coating compositions, A-1 to A-4 and B-1 to B-4 shown in Tables 18 and 19 were prepared in the same method as in Example 2 noted above. The topcoating composition C-3 shown in Table 41 was prepared according to the method mentioned below.

Preparation of Topcoating Composition:

To the polyester compound (II-1) used in Example 5, added were the polyester resin, the curing agent, the pigment, the curing catalyst and the additive, as in Table 41. Then, this was milled for about 30 minutes, using a sand mill containing glass beads of about 1 mm in diameter. Next, cyclohexanone was added to the resulting dispersion to make it have a nonvolatile content of 60%. Thus was prepared a coating composition, C-3.

The conditions for testing the characteristics of the specimens prepared herein and the methods for evaluating the specimens are mentioned below.
(1) Film appearance
  This is the same as in Example 1.
(2) Pencil Hardness
  This is the same as in Example 1.
(3) Workability 3 (flexibility)
  This is the same as in Example 2.
(4) Adhesiveness (cross-cuts peeling test, according to JIS K5400, Section 8.5 for adhesion test)
  This is the same as in Example 2.

From Tables 42 and 43, it is known that the precoated steel sheet specimens of the invention as produced by forming the prime coating film having the specifically-defined physical properties followed by forming the topcoating film of the invention on the prime coating film had good workability (this is evaluated in terms of the flexibility tested herein) and high film hardness.

Example 7

A hot-dip galvanized steel sheet substrate having a thickness of 0.5 mm (the amount of the zinc plate of this substrate was 30 g/m²/one surface) was degreased, and processed with a non-rinse type chromate solution (Surfcoat NRC300, produced by Nippon Paint Co., Ltd.). The thus-processed surface of this substrate was coated with any of the prime coating compositions shown in Table 23 to form an prime coating film, and then with the topcoating composition shown in Table 44 to form an topcoating film. Thus were produced various precoated steel sheet specimens. The properties of those specimens are shown in Tables 45 and 46 along with the conditions for producing them.

The prime coating compositions, P-1 to P-4 shown in Table 23 were prepared in the same method as in Example 3 noted above. The topcoating composition C-4 shown in Table 44 was prepared according to the method mentioned below.

Preparation of Topcoating Composition:

To the polyester compound (II-1) used in Example 5, added were the polyester resin, the curing agent, the pigment, the curing catalyst and the additive, as in Table 44. Then, this was milled for about 30 minutes, using a sand mill containing glass beads of about 1 mm in diameter. Next, cyclohexanone was added to the resulting dispersion to make it have a nonvolatile content of 60%. Thus was prepared a coating composition, C-4.

The methods for testing and evaluating the characteristics of the precoated steel sheet specimens prepared herein are mentioned below.
(1) Film appearance
  This is the same as in Example 1.
(2) Pencil Hardness
  This is the same as in Example 1.
(3) Workability (flexibility)
  This is the same as in Example 3.
(4) Adhesiveness (cross-cut peeling test)
  This is the same as in Example 2
(5) Corrosion Resistance in flat area (according to JIS K5400, Section 9.1 for salt spray resistance)
  This is the same as in Example 3.

From Tables 45 and 46, it is known that the precoated steel sheet specimens of the invention, which had the topcoating film as formed on the prime coating film containing a suitable amount of strontium chromate, had especially excellent corrosion resistance.

Example 8

A hot-dip galvanized steel sheet substrate having a thickness of 0.5 mm (the amount of the zinc plate of this substrate was 30 g/m²/one surface) was degreased, and processed with a non-rinse type chromate solution (the chromate amount adhered was 30 mg/m² in terms of metal chromium). A polyester primer was applied onto the thus-processed surface of this substrate at a dry thickness of 5 μm. Then, this was baked at a temperature of up to 215° C. as the peak metal temperature of the steel sheet, for 60 seconds to form the prime coating film. Next, an topcoating composition as prepared by adding wax shown in Table 27 to the composition of Table 41 was applied over the prime coating film, and then baked at a temperature of up to 230° C. as the peak metal temperature of the steel sheet, for 60 seconds to form the topcoating film. Thus were produced various precoated steel sheet specimens. The properties of those specimens are shown in Table 47 along with the conditions for producing them.

The methods for testing and evaluating the characteristics of the precoated steel sheet specimens prepared herein are mentioned below.
(1) Film appearance
  This is the same as in Example 1.
(2) Pencil Hardness
  This is the same as in Example 1.
(3) Roll Abrasion Resistance
  This is the same as in Example 4.
(4) Cylinder Drawing Workability
  This is the same as in Example 4.
(5) Repetitive Abrasion Resistance
  This is the same as in Example 4.

As in Table 47, it is known that the precoated steel sheet specimens of the invention, which had the topcoating film containing a suitable amount of wax and formed on the prime coating film, had especially excellent scratch resistance.

Example 9

Compounds (III-1) and (III-2) and polyols (1) to (4) used in this Example were prepared according to the methods mentioned below.

Compound (III-1)

8.9 parts by weight of sodium hydride, 27.2 parts by weight of 6-chloro-1-hexanol and 32.8 parts by weight of benzyl bromide were dropwise added to 200 ml of dry THF, while stirring them. A large excess amount of water was added to the reaction mixture, which was then extracted with methylene chloride. The resulting extract was washed with water, dried with anhydrous magnesium sulfate, and evaporated using an evaporator. The resulting residue was distilled under reduced pressure to obtain compound (1-a) (colorless liquid). Next, 27.6 parts by weight of p-hydroxybenzoic acid, 30 parts by weight of sodium hydroxide and 0.5 parts by weight of potassium iodide were deposit into a reactor installed with an oil bath, a stirrer, a reflux condenser and a thermometer, and these were dissolved in 100 ml of ethanol and 30 ml of water added thereto. 50 ml of an ethanolic solution comprising 25 parts by weight of the above-mentioned compound (1-a) was dropwise added to the solution in the reactor, and then heated under reflux. After the reaction, this was evaporated, using an evaporator, to remove ethanol. Water was added to the resulting residue, which was then extracted with methylene chloride. The resulting extract was dried with anhydrous magnesium sulfate and evaporated to obtain compound (1-b) (white crystals). 26.3 parts by weight of compound (1-b) and 0.1 ml of pyridine were dissolved in 75 ml of thionyl chloride, and then heated under reflux. After the reaction, methylene chloride was removed from the reaction system by distillation under reduced pressure, and compound (1-c) was thus obtained. 8.67 parts by weight of compound (1-c) was dissolved in chloroform, and the resulting solution was dropwise added to a dry pyridine solution comprising 1.65 parts by weight of hydroquinone, and reacted in a nitrogen atmosphere for 60 hours. Next, water was added to the reaction mixture, which was then extracted with chloroform. The resulting extract was washed with an alkaline solution and water in that order, then dried with anhydrous magnesium sulfate, and evaporated to obtain a jelly-like compound, (1-d). 12.5 parts by weight of compound (1-d), 1.9 parts by weight of 10% palladium/charcoal and 150 ml of ethanol were put into an egg-plant type flask, which was connected with a reflux condenser equipped with a three-way stop-cock, and the reaction system was substituted with a hydrogen gas atmosphere. Thus, these were reacted for 24 hours at room temperature and under normal pressure. After the reaction, the filtrate was removed using an evaporator, and a white crystalline compound, (III-1) was obtained.

This compound (III-1) had a molecular weight of 550.65, as identified through field deionization mass spectrography (hereinafter referred to FD-MS). As a result of the observation of the compound with a polarizing microscope equipped with a hot stage, the compound exhibited anisotropy at temperatures falling between 144 and 210° C.

Compound (III-2)

55.8 parts by weight of dihydroxy-biphenyl, 180 parts by weight of an aqueous solution of 50% sodium hydroxide, 150 parts by weight of ethanol, and a minor amount of potassium iodide were deposit into a reactor, and heated at 60° C. To this was added 90.1 parts by weight of 6-chloro-1-hexanol, and reacted at 75° C. for 20 hours, and thereafter the solvent was removed using an evaporator. The resulting residue was washed with water, and recrystallized from 2-propanol to obtain compound (III-2).

This compound (III-2) was identified to have a molecular weight of 386.53 through FD-MS. As a result of the observation of the compound with a polarizing microscope equipped with a hot stage, the compound exhibited anisotropy at temperatures falling between 171 and 182° C.

Polyol (1):
Used was a polyester resin having a number-average molecular weight of about 2000.

Polyol (2):
Used was a polyester resin having a number-average molecular weight of about 3000.

Polyol (3):
Used was a polyester resin having a number-average molecular weight of about 5000.

Polyol (4):
Used was an acrylic resin having a number-average molecular weight of about 3000.

The chemical structural formulae of the above-mentioned compounds (III-1) and (III-2) are shown below.

Compound (III-2):

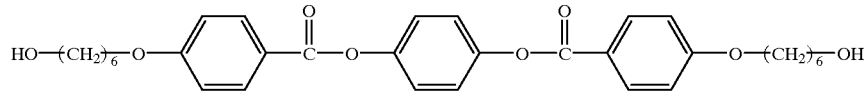

Compound (III-1):

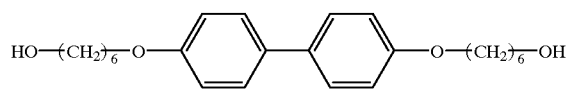

As the curing agents, used were the same as those in Example 1.

Using any of the compounds (III-1) and (III-2), any of the polyols (1) to (4) and any of the curing agents noted above, prepared were various coating compositions. Each coating composition was applied onto steel sheets to produce pre-coated steel sheets, specimens of the invention and comparative specimens mentioned below, and the properties of the coating film of each specimen were measured. The data are shown in Tables 48 to 59 along with the formulations of the coating compositions.

Specimen 1 of the invention:
40 parts of cyclohexanone was added to 3.0 parts of compound (III-1), and stirred for 12 hours. Prior to the addition, compound (III-1) was ground with a grinder into a powder of 250 μm or less. To the resulting dispersion of compound (III-1) in cyclohexanone, added were 58.1 parts of polyol (1), 19.4 parts of a curing agent of hydrogenated MDI prepolymer (this is a blocked polyisocyanate compound in the group (b) defined herein), 19.4 parts of a curing agent of IPDI isocyanurate (this is a blocked polyisocyanate compound in the group (a) defined herein), 100 parts of rutile-type titanium oxide, 10.0 parts of 10% solution of dibutyl tin dilaurate (hereinafter referred to as DBTDL) in cyclohexanone, and 4.8 parts of 50% solution of Acronal 4F (produced by BASF Co., Ltd.) in cyclohexanone. These were dispersed, using a sand mill containing glass beads of about 1 mm diameter therein, for about 30 minutes. Next, cyclohexanone was added to the resulting dispersion to make it have a nonvolatile content of 60%. Thus was prepared a coating composition. Using a bar coater, this was applied onto a hot-dip galvanized steel sheet (thickness: 0.5 mm, 0.4 mm) that had been treated by chromate treatment and primecoated with a polyester primer (film thickness: about 5 μm), at a dry film thickness of from 15 to 18 μm, and then baked in a hot-air drying furnace at 230±5° C. for 60 seconds. Thus was obtained a precoated steel sheet. Specimens 2 to 4 of the invention:

Using the same compound, the same polyol and the same combination of curing agents as those for Specimen 1 but varying the amount of compound (III-1) added, different coating compositions were prepared as shown in Table 48. The amount of compound (III-1) was 5.0% by weight, 7.0% by weight and 12.0% by weight of the solid resin content, in Specimen 2, Specimen 3 and Specimen 4, respectively. These coating compositions were separately applied onto different steel sheets and then baked, in the same method as for Specimen 1, to obtain precoated steel sheets.

Specimens 5 to 10 of the invention:

Coating compositions were prepared in the same method as for Specimen 1, except that a mixture of any one of blocked polyisocyanate compounds in the group (a), TDI prepolymer, IPDI isocyanurate and MDI adduct, and any one of blocked polyisocyanate compounds in the group (b), HDI prepolymer, HDI isocyanurate and hydrogenated MDI prepolymer was used as the curing agent as in Table 48. These coating compositions were separately applied onto different steel sheets and then baked, in the same method as for Specimen 1, to obtain precoated steel sheets.

Specimens 11 to 19 of the invention:

Coating compositions were prepared in the same method as for Specimen 1, except that polyester compound (III-2) was used and that a curing agent composed of any one of blocked polyisocyanate compounds in the group (a), TDI prepolymer, IPDI isocyanurate and MDI adduct, and any one of blocked polyisocyanate compounds in the group (b), HDI prepolymer, HDI isocyanurate and hydrogenated MDI prepolymer was used, as in Table 50. These coating compositions were separately applied onto different steel sheets and then baked, in the same method as for Specimen 1, to obtain precoated steel sheets.

Comparative Specimen 1:

40 parts of cyclohexanone was added to 3.0 parts of compound (III-1), and stirred for 12 hours. Prior to the addition, compound (III-1) was ground with a grinder into a powder of 250 μm or less. To the resulting dispersion of compound (III-1) in cyclohexanone, added were 57.6 parts of polyol (1), 39.4 parts of a curing agent of hydrogenated MDI prepolymer, 100 parts of rutile-type titanium oxide, 10.0 parts of 10% solution of DBTDL in cyclohexanone, and 4.8 parts of 50% solution of Acronal 4F in cyclohexanone. These were dispersed, using a sand mill containing glass beads of about 1 mm diameter therein, for about 30 minutes. Next, cyclohexanone was added to the resulting dispersion to make it have a nonvolatile content of 60%. Thus was prepared a coating composition. Using a bar coater, this was applied onto a hot-dip galvanized steel sheet (thickness: 0.5 mm, 0.4 mm) that had been treated by chromate treatment and primecoated with a polyester primer (film thickness: about 5 μm), at a dry film thickness of from 15 to 18 μm, and then baked in a hot-air drying furnace at 230±5° C. for 60 seconds. Thus was obtained a precoated steel sheet.

Comparative Specimen 2:

Using almost the same amounts of the same components as in Comparative Specimen 1, but using IPDI isocyanurate alone as the curing agent, a coating composition was prepared in the same method as for Comparative Specimen 1, as in Table 52. This was applied onto a steel sheet and then baked, in the same method as for Comparative Specimen 1, to obtain a precoated steel sheet.

Comparative Specimens 3 and 4:

Using almost the same amounts of the same components as in Specimen 2 of the invention, but using hydrogenated MDI prepolymer or IPDI isocyanurate alone as the curing agent, coating compositions were prepared in the same method as for Comparative Specimen 1, as in Table 52. These coating compositions were separately applied onto different steel sheets and then baked, in the same method as for Comparative Specimen 1, to obtain precoated steel sheets.

Comparative Specimens 5 and 6:

Using almost the same amounts of the same components as in Specimen 3 of the invention, but using hydrogenated MDI prepolymer or IPDI isocyanurate alone as the curing agent, coating compositions were prepared in the same method as for Comparative Specimen 1, as in Table 52. These coating compositions were separately applied onto different steel sheets and then baked, in the same method as for Comparative Specimen 1, to obtain precoated steel sheets.

Comparative Specimens 7 to 10:

Coating compositions were prepared in the same method as for Comparative Specimen 1, except that polyol (1) and polyester compound (III-1) were used and that any one blocked polyisocyanate compound of HDI prepolymer, HDI isocyanurate, TDI prepolymer and MDI adduct was used singly as the curing agent, as in Table 52. These coating compositions were separately applied onto different steel sheets and then baked, in the same method as for Comparative Specimen 1, to obtain precoated steel sheets.

Comparative Specimens 11 and 12:

Using almost the same amounts of the same components as in Specimen 11 of the invention, but using hydrogenated MDI prepolymer or TDI alone as the curing agent, coating compositions were prepared in the same method as for Comparative Specimen 1, as in Table 54. These coating compositions were separately applied onto different steel sheets and then baked, in the same method as for Comparative Specimen 1, to obtain precoated steel sheets.

Comparative Specimens 13 and 14:

Using almost the same amounts of the same components as in Specimen 13 of the invention, but using hydrogenated MDI prepolymer or IPDI isocyanurate alone as the curing agent, coating compositions were prepared in the same method as for Comparative Specimen 1, as in Table 54. These coating compositions were separately applied onto different steel sheets and then baked, in the same method as for Comparative Specimen 1, to obtain precoated steel sheets.

Comparative Specimens 15 and 16:

Using almost the same amounts of the same components as in Specimen 16 of the invention, but using HDI isocyanurate or MDI adduct alone as the curing agent, coating compositions were prepared in the same method as for Comparative Specimen 1, as in Table 54. These coating compositions were separately applied onto different steel sheets and then baked, in the same method as for Comparative Specimen 1, to obtain precoated steel sheets.

Comparative Specimens 17 and 18:

Using almost the same amounts of the same components as in specimen 18 of the invention, but using HDI isocyanurate or IPDI isocyanurate alone as the curing agent, coating compositions were prepared in the same method as for Comparative Specimen 1, as in Table 54. These coating compositions were separately applied onto different steel sheets and then baked, in the same method as for Comparative Specimen 1, to obtain precoated steel sheets.

Comparative Specimens 19 and 20:

Using the same compound, the same polyol and the same combination of curing agents as for Specimen 1 of the invention, but varying the amount of compound (III-1) added, coating compositions were prepared in the same method as for Comparative Specimen 1, as in Table 56. The amount of compound (III-1) was 0.3% by weight and 18.0% by weight of the solid resin content, in Comparative Specimens 19 and 20, respectively. These coating compositions were separately applied onto different steel sheets and then baked, in the same method as for Comparative Specimen 1, to obtain precoated steel sheets.

Comparative Specimen 21:

Using the same compound, the same polyol and the same combination of curing agents as for Specimen 12 of the invention, but varying the amount of compound (III-2) added, a coating composition was prepared in the same method as for Comparative Specimen 1, as in Table 56. The amount of compound (III-2) was 18.0 1 by weight of the solid resin content. This coating composition was applied onto a steel sheet and then baked, in the same method as for Comparative Specimen 1, to obtain a precoated steel sheet.

Comparative Specimens 22 and 23:

Using the same compound and the same polyol as for Specimen 2 of the invention, but changing the combination of curing agents, coating compositions were prepared in the same method as for Comparative Specimen 1, as in Table 56. Regarding the combination of curing agents used, HDI isocyanurate and hydrogenated MDI prepolymer as combined were used in Comparative Specimen 22, while IPDI isocyanurate and MDI adduct were in Comparative Specimen 23. These coating compositions were separately applied onto different steel sheets and then baked, in the same method as for Comparative Specimen 1, to obtain precoated steel sheets.

Comparative Specimens 24 and 25:

Using the same compound and the same polyol as for Specimen 12 of the invention, but changing the combination of curing agents, coating compositions were prepared in the same method as for Comparative Specimen 1, as in Table 56. Regarding the combination of curing agents used, HDI prepolymer and hydrogenated MDI prepolymer as combined were used in Comparative Specimen 24, while TDI prepolymer and IPDI isocyanurate were in Comparative Specimen 25. These coating compositions were separately applied onto different steel sheets and then baked, in the same method as for Comparative Specimen 1, to obtain precoated steel sheets.

Comparative Specimens 26 and 27:

Using the same compound, the same polyol and the same combination of curing agents as for Specimen 2 of the invention, but varying the ratio of hydrogenated MDI prepolymer to IPDI isocyanurate in the combination of curing agents used, coating compositions were prepared in the same method as for Comparative Specimen 1, as in Table 58. The ratio of (A)/(B) in the combination of curing agents used was 20/80 in Comparative Specimen 26 and was 80/20 in Comparative Specimen 27. These coating compositions were separately applied onto different steel sheets and then baked, in the same method as for Comparative Specimen 1, to obtain precoated steel sheets.

Comparative Specimens 28 and 29:

Using the same compound, the same polyol and the same combination of curing agents as for Specimen 6 of the invention, but varying the molar ratio, [NCO]/[OH], of isocyanato groups in the combined curing agents, [NCO], to hydroxyl groups in compound (III-1) and polyol (1), [OH], coating compositions were prepared in the same method as for Comparative Specimen 1, as in Table 58. The molar ratio of [NCO]/[OH] was 0.7 in Comparative Specimen 28 and was 1.3 in Comparative Specimen 29. These coating compositions were separately applied onto different steel sheets and then baked, in the same method as for Comparative Specimen 1, to obtain precoated steel sheets.

The conditions for testing the characteristics of the specimens prepared herein and the methods for evaluating the specimens are mentioned below.

(1) Film appearance

This is the same as in Example 1.

(2) Gloss

This is the same as in Example 1.

(3) Pencil Hardness

This is the same as in Example 1.

(4) Workability (Flexibility)

This is the same as in Example 1.

(5) Impact Resistance

This is the same as in Example 1.

(6) Solvent Resistance (in terms of the number of rubbings with MEK)

This is the same as in Example 1.

(7) Stain Resistance (to oily ink)

This is the same as in Example 1.

As in Tables 48 to 59, it is known that the precoated steel sheet specimens of the invention, of which the thickness of the steel sheet substrate was 0.5 mm or 0.4 mm, had high hardness, good workability and good stain resistance, and that their gloss and solvent resistance were good.

As opposed to those, many of comparative specimens 1 to 18, in which was used the blocked polyisocyanate compound alone of any one of groups (a) and (b) defined herein, had poor stain resistance, though having balanced hardness and workability in some degree due to the effect of the anisotropic compound (III-1) or (III-2), when the steel sheet substrate had a thickness of 0.5 mm. Some of those comparative specimens, though having good stain resistance, had poor workability and low impact resistance, when the steel sheet substrate had a thickness of 0.4 mm.

Of comparative specimens 19 to 21, in which the amount of the compound (III-1) or (III-2) overstepped the defined range of the invention, those in which the amount of the compound (III-1) or (III-2) was smaller than the defined range were not good as the hardness and the stain resistance of the coating film were poor, while the others in which the amount of the compound (III-1) or (III-2) was larger than the defined range were also not good as the coating film was not smooth, resulting in that its gloss was lowered and its stain resistance was physically lowered.

In comparative specimens 22 to 25, the curing agent used was comprised of two different blocked polyisocyanate compounds as selected from one and the same group (a) or (b). All these comparative specimens did not have well-balanced hardness, workability and stain resistance, and at least one of those properties of these comparative specimens was poor.

In comparative specimens 26 and 27, the curing agent used was comprised of two different blocked polyisocyanate compounds, one selected from the group (a) while the other from the group (b), but in these, the ratio of the blocked polyisocyanate compounds overstepped the preferred range. Both these comparative specimens did not have well-balanced hardness, workability and stain resistance, and at least one of those properties of these comparative specimens was poor.

Comparative specimens 28 and 29 overstepped the preferred range for the molar ratio, [NCO]/[OH], of the isocyanato groups in the curing agent, [NCO], to the hydroxyl groups in the compound i) and the polyol ii), [OH]. Both these comparative specimens did not have well-balanced hardness, workability and stain resistance, and at least one of those properties of these comparative specimens was poor.

Example 10

A hot-dip galvanized steel sheet substrate having a thickness of 0.5 mm (the amount of the zinc plate of this substrate was 30 g/m$^2$/one surface) was degreased, and processed with a non-rinse type chromate solution (Surfcoat NRC300, produced by Nippon Paint Co., Ltd.). The thus-processed surface of this substrate was coated with any of the prime coating compositions shown in Tables 18 and 19 to form an prime coating film, and then with the topcoating composition shown in Table 60 to form an topcoating film. Thus were produced various precoated steel sheet specimens. The properties of those specimens are shown in Tables 61 and 62 along with the conditions for producing them.

The prime coating compositions, A-1 to A-4 and B-1 to B-4 shown in Tables 18 and 19 were prepared in the same method as in Example 2 noted above. The topcoating composition C-5 shown in Table 60 was prepared according to the method mentioned below.

Preparation of Topcoating Composition:

To the polyester compound (III-1) used in Example 9, added were the polyester resin, the curing agent, the pigment, the curing catalyst and the additive, as in Table 60. Then, this was milled for about 30 minutes, using a sand mill containing glass beads of about 1 mm in diameter. Next, cyclohexanone was added to the resulting dispersion to make it have a nonvolatile content of 60%. Thus was prepared a coating composition, C-5.

The conditions for testing the characteristics of the specimens prepared herein and the methods for evaluating the specimens are mentioned below.
(1) Film appearance
This is the same as in Example 1.
(2) Pencil Hardness
This is the same as in Example 1.
(3) Workability 3 (flexibility)
This is the same as in Example 2.
(4) Adhesiveness (cross-cuts peeling test, according to JIS K5400, Section 8.5 for adhesion test)
This is the same as in Example 2.

From Tables 61 and 62, it is known that the precoated steel sheet specimens of the invention as produced by forming the prime coating film having the specifically-defined physical properties followed by forming the topcoating film of the invention on the prime coating film had good workability (this is evaluated in terms of the flexibility tested herein) and high film hardness.

Example 11

A hot-dip galvanized steel sheet substrate having a thickness of 0.5 mm (the amount of the zinc plate of this substrate was 30 g/m$^2$/one surface) was degreased, and processed with a non-rinse type chromate solution (Surfcoat NRC300, produced by Nippon Paint Co., Ltd.). The thus-processed surface of this substrate was coated with any of the prime coating compositions shown in Table 23 to form an prime coating film, and then with the topcoating composition shown in Table 63 to form an topcoating film. Thus were produced various precoated steel sheet specimens. The properties of those specimens are shown in Tables 64 and 65 along with the conditions for producing them.

The prime coating compositions, P-1 to P-4 shown in Table 23 were prepared in the same method as in Example 3 noted above. The topcoating composition C-6 shown in Table 63 was prepared according to the method mentioned below.

Preparation of Topcoating Composition:

To the polyester compound (III-1) used in Example 9, added were the polyester resin, the curing agent, the pigment, the curing catalyst and the additive, as in Table 63. Then, this was milled for about 30 minutes, using a sand mill containing glass beads of about 1 mm in diameter. Next, cyclohexanone was added to the resulting dispersion to make it have a nonvolatile content of 60%. Thus was prepared a coating composition, C-6.

The methods for testing and evaluating the characteristics of the precoated steel sheet specimens prepared herein are mentioned below.
(1) Film appearance
This is the same as in Example 1.
(2) Pencil Hardness
This is the same as in Example 1.
(3) Workability (flexibility)
This is the same as in Example 3.
(4) Adhesiveness (cross-cut peeling test)
This is the same as in Example 2
(5) Corrosion Resistance in Flat Area (according to JIS K5400, Section 9.1 for salt spray resistance)
This is the same as in Example 3.

From Tables 64 and 65, it is known that the precoated steel sheet specimens of the invention, which had the topcoating film as formed on the prime coating film containing a suitable amount of strontium chromate, had especially excellent corrosion resistance.

Example 12

A hot-dip galvanized steel sheet substrate having a thickness of 0.5 mm (the amount of the zinc plate of this substrate was 30 g/m$^2$/one surface) was degreased, and processed with a non-rinse type chromate solution (the chromate amount adhered was 30 mg/m$^2$ in terms of metal chromium). A polyester primer was applied onto the thus-processed surface of this substrate at a dry thickness of 5 µm. Then, this was baked at a temperature of up to 215° C. as the peak metal temperature of the steel sheet, for 60 seconds to form the prime coating film. Next, an topcoating composition as prepared by adding wax shown in Table 27 to the composition of Table 60 was applied over the prime coating film, and then baked at a temperature of up to 230° C. as the peak metal temperature of the steel sheet, for 60 seconds to form the topcoating film. Thus were produced various precoated steel sheet specimens. The properties of those specimens are shown in Table 66 along with the conditions for producing them.

The methods for testing and evaluating the characteristics of the precoated steel sheet specimens prepared herein are mentioned below.

(1) Film appearance

This is the same as in Example 1.

(2) Pencil Hardness

This is the same as in Example 1.

(3) Roll Abrasion Resistance

This is the same as in Example 4.

(4) Cylinder Drawing Workability

This is the same as in Example 4.

(5) Repetitive Abrasion Resistance

This is the same as in Example 4.

As in Table 66, it is known that the precoated steel sheet specimens of the invention, which had the topcoating film containing a suitable amount of wax and formed on the prime coating film, had especially excellent scratch resistance.

Industrial Applicability

The coating composition of the invention is used as a thermosetting coating composition for precoated steel sheets which are required to have high hardness, good workability and stain resistance. Precoated steel sheets having a coating film formed from the composition are suitable for use in household electric appliances and as construction materials, and also can be used in producing vehicles.

TABLE 1

| Sample No. of the Invention | | | 1 | 2 | 3 | 4 | 5 | 6 | 7 | 8 | 9 | 10 |
|---|---|---|---|---|---|---|---|---|---|---|---|---|
| Compound (I-1) | | | 3.0 | 5.0 | 7.0 | 12.0 | 5.0 | 5.0 | 5.0 | 5.0 | 5.0 | 5.0 |
| Polyol | Polyol (1) | | 56.1 | 51.7 | 47.3 | 36.3 | 42.2 | 52.2 | 49.5 | 51.6 | 43.6 | 50.5 |
| | Polyol (2) | | — | — | — | — | — | — | — | — | — | — |
| | Polyol (3) | | — | — | — | — | — | — | — | — | — | — |
| | Polyol (4) | | — | — | — | — | — | — | — | — | — | — |
| Curing Agent *1 | HDI Prepolymer | | — | — | — | — | 26.4 | — | — | — | 36.0 | 13.4 |
| | HDI Isocyanurate | | — | — | — | — | — | 21.4 | 22.8 | — | — | — |
| | Hydrogenated MDI Prepolymer | | 20.5 | 21.7 | 22.8 | 25.8 | — | — | — | 26.1 | — | — |
| | TDI Prepolymer | | — | — | — | — | 26.4 | — | 22.8 | — | 15.4 | — |
| | IPDI Isocyanurate | | 20.5 | 21.7 | 22.8 | 25.8 | — | — | — | 17.4 | — | 31.2 |
| | MDI Adduct | | — | — | — | — | — | 21.4 | — | — | — | — |
| Pigment | Rutile-type Titanium Oxide | | 100.0 | 100.0 | 100.0 | 100.0 | 100.0 | 100.0 | 100.0 | 100.0 | 100.0 | 100.0 |
| Catalyst | DBTDL | *2 | 10.0 | 10.0 | 10.0 | 10.0 | 10.0 | 10.0 | 10.0 | 10.0 | 10.0 | 10.0 |
| Additive | Acronal 4F | *3 | 4.8 | 4.8 | 4.8 | 4.8 | 4.8 | 4.8 | 4.8 | 4.8 | 4.8 | 4.8 |
| Ratio of Curing Agents, (A)/(B) | | *4 | 50/50 | 50/50 | 50/50 | 50/50 | 50/50 | 50/50 | 50/50 | 40/60 | 30/70 | 70/30 |

*Except for "Ratio of Curing Agents", all numerical values are "by weight". (The amounts of Compound (I-1), Polyol and Curing Agent are all by weight of the solid content.)
*1 HDI: Hexamethylene diisocyanate
Hydrogenated MDI: Hydrogenated 4,4'-diphenylmethane diisocyanate
TDI: Tolylene diisocyanate
MDI: 4,4'-Diphenylmethane diisocyanate
IPDI: Isophorone diisocyanate
*2 10% Solution of dibutyl tin dilaurate in cyclohexanone
*3 50% Solution of Acronal 4F in cyclohexanone
*4 Ratio by weight of blocked polyisocyanate compound in group (a) defined herein to that in group (b) defined herein

TABLE 2

| Sample No. of the Invention | | | 1 | 2 | 3 | 4 | 5 | 6 | 7 | 8 | 9 | 10 |
|---|---|---|---|---|---|---|---|---|---|---|---|---|
| Properties of Coating Film | Appearance | | Good | Good | Good | Good | Good | Good | Good | Good | Good | Good |
| | Gloss | | ⊙ | ⊙ | ⊙ | ⊙ | ⊙ | ⊙ | ⊙ | ⊙ | ⊙ | ⊙ |
| | Pencil Hardness | | H+ | 2H | 2H | 2H | H+ | H+ | H+ | 2H | H | 2H |
| | Workability | Workability Test 1 | 0T | 0T | 0T | 1T | 0T | 0T | 0T | 0T | 0T | 0T |
| | | Workability Test 2 | 0T | 0T | 0T | 1T | 0T | 0T | 0T | 0T | 0T | 0T |
| | Impact Resistance (kg · cm) | | >75 | >75 | >75 | >75 | >75 | >75 | >75 | >75 | >75 | >75 |
| | MEK Rubbing Test (number of rubbings) | | >100 | >100 | >100 | >100 | >100 | >100 | >100 | >100 | >100 | >100 |
| | Stain Resistance to oily ink (ΔE) | Red | ○ | ○ | ⊙ | ⊙ | ○ | ○ | ○ | ○ | ○ | ⊙ |
| | | Black | ⊙ | ⊙ | ⊙ | ⊙ | ⊙ | ⊙ | ⊙ | ⊙ | ⊙ | ⊙ |

TABLE 3

| Sample No. of the Invention | | | 11 | 12 | 13 | 14 |
|---|---|---|---|---|---|---|
| Compound (I-2) | | | 3.0 | — | — | — |
| Compound (I-3) | | | — | 1.0 | 5.0 | — |
| Compound (I-4) | | | — | — | — | 5.0 |
| Compound (I-5) | | | — | — | — | — |
| Compound (I-6) | | | — | — | — | — |
| Compound (I-7) | | | — | — | — | — |
| Compound (I-8) | | | — | — | — | — |
| Polyol | Polyol (1) | | — | — | — | — |
|  | Polyol (2) | | 51.5 | — | — | — |
|  | Polyol (3) | | — | — | 63.6 | — |
|  | Polyol (4) | | — | 46.7 | — | 41.0 |
| Curing Agent *1 | HDI Prepolymer | | — | 31.4 | — | 27.0 |
|  | HDI Isocyanurate | | — | — | 18.8 | — |
|  | Hydrogenated MDI Prepolymer | | 22.8 | — | — | — |
|  | TDI Prepolymer | | 22.8 | — | — | — |
|  | IPDI Isocyanurate | | — | 20.9 | — | 27.0 |
|  | MDI Adduct | | — | — | 12.6 | — |
| Pigment | Rutile-type Titanium Oxide | | 100.0 | 100.0 | 100.0 | 100.0 |
| Catalyst | DBTDL | *2 | 10.0 | 10.0 | 10.0 | 10.0 |
| Additive | Acronal 4F | *3 | 4.8 | 4.8 | 4.8 | 4.8 |
| Ratio of Curing Agents, (A)/(B) | | *4 | 50/50 | 40/60 | 40/60 | 50/50 |

*Except for "Ratio of Curing Agents", all numerical values are "by weight". (The amounts of Compound (I-2) to (I-8), Polyol and Curing Agent are all by weight of the solid content.)
*1 HDI: Hexamethylene diisocyanate
Hydrogenated MDI: Hydrogenated 4,4'-diphenylmethane diisocyanate
TDI: Tolylene diisocyanate
MDI: 4,4'-Diphenylmethane diisocyanate
IPDI: Isophorone diisocyanate
*2 10% Solution of dibutyl tin dilaurate in cyclohexanone
*3 50% Solution of Acronal 4F in cyclohexanone
*4 Ratio by weight of blocked polyisocyanate compound in group (a) defined herein to that in group (b) defined herein

TABLE 4

| Sample No. of the Invention | | | 15 | 16 | 17 | 18 |
|---|---|---|---|---|---|---|
| Compound (I-2) | | | — | — | — | — |
| Compound (I-3) | | | — | — | — | — |
| Compound (I-4) | | | — | — | — | — |
| Compound (I-5) | | | 5.0 | — | — | — |
| Compound (I-6) | | | — | 7.0 | — | — |
| Compound (I-7) | | | — | — | 12.0 | — |
| Compound (I-8) | | | — | — | — | 15.0 |
| Polyol | Polyol (1) | | 53.4 | — | — | — |
|  | Polyol (2) | | — | 46.3 | — | — |
|  | Polyol (3) | | — | — | — | 52.3 |
|  | Polyol (4) | | — | — | 69.9 | — |
| Curing Agent *1 | HDI Prepolymer | | — | 18.7 | — | — |
|  | HDI Isocyanurate | | — | — | 27.1 | — |
|  | Hydrogenated MDI Prepolymer | | 20.8 | — | — | 13.1 |
|  | TDI Prepolymer | | — | — | — | — |
|  | IPDI Isocyanurate | | 20.8 | — | 18.1 | 19.6 |
|  | MDI Adduct | | — | 28.0 | — | — |
| Pigment | Rutile-type Titanium Oxide | | 100.0 | 100.0 | 100.0 | 100.0 |
| Catalyst | DBTDL | *2 | 10.0 | 10.0 | 10.0 | 10.0 |
| Additive | Acronal 4F | *3 | 4.8 | 4.8 | 4.8 | 4.8 |
| Ratio of Curing Agents, (A)/(B) | | *4 | 50/50 | 60/40 | 40/60 | 60/40 |

*Except for "Ratio of Curing Agents", all numerical values are "by weight". (The amounts of Compound (I-2) to (I-8), Polyol and Curing Agent are all by weight of the solid content).
*1 HDI: Hexamethylene diisocyanate
Hydrogenated MDI: Hydrogenated 4,4'-diphenylmethane diisocyanate
TDI: Tolylene diisocyanate
MDI: 4,4'-Diphenylmethane diisocyanate
*2 10% Solution of dibutyl tin dilaurate in cyclohexanone
*3 50% Solution of Acronal 4F in cyclohexanone
*4 Ratio by weight of blocked polyisocyanate compound in group (a) defined herein to that in group (b) defined herein

TABLE 5

| Sample No. of the Invention | | 11 | 12 | 13 | 14 | 15 | 16 | 17 | 18 |
|---|---|---|---|---|---|---|---|---|---|
| Properties of Coating Film | Appearance | Good | Good | Good | Good | Good | Good | Good | Good |
| | Gloss | ⊚ | ⊚ | ⊚ | ⊚ | ⊚ | ⊚ | ⊚ | ⊚ |
| | Pencil Hardness | H | H | H+ | H | 2H | H | 2H | H |
| | Workability  Workability Test 1 | 0T | 0T | 0T | 0T | 0T | 0T | 1T | 0T |
| | Workability Test 2 | 0T | 0T | 0T | 0T | 0T | 0T | 1T | 0T |
| | Impact Resistance (kg · cm) | >75 | >75 | >75 | >75 | >75 | >75 | >75 | >75 |
| | MEK Rubbing Test (number of rubbings) | >100 | >100 | >100 | >100 | >100 | >100 | >100 | >100 |
| | Stain Resistance  Red | ○ | ○ | ○ | ○ | ○ | ⊚ | ⊚ | ⊚ |
| | to oily ink (ΔE)  Black | ⊚ | ⊚ | ⊚ | ⊚ | ⊚ | ⊚ | ⊚ | ⊚ |

TABLE 6

| Comparative Sample No. | | | 1 | 2 | 3 | 4 | 5 | 6 | 7 | 8 | 9 | 10 |
|---|---|---|---|---|---|---|---|---|---|---|---|---|
| Compound (I-1) | | | 3.0 | 3.0 | 3.5 | 5.0 | 12.0 | 12.0 | 5.0 | 5.0 | 5.0 | 5.0 |
| Polyol | Polyol (1) | | 55.4 | 56.7 | 51.0 | 52.3 | 35.5 | 37.1 | 45.5 | 56.9 | 38.4 | 53.2 |
| | Polyol (2) | | — | — | — | — | — | — | — | — | — | — |
| | Polyol (3) | | — | — | — | — | — | — | — | — | — | — |
| | Polyol (4) | | — | — | 30 | — | — | — | — | — | — | — |
| Curing Agent *1 | HDI Prepolymer | | — | — | — | — | — | — | 49.5 | — | — | — |
| | HDI Isocyanurate | | — | — | — | — | — | — | — | 38.1 | — | — |
| | Hydrogenated MDI Prepolymer | | 41.6 | — | 44.0 | — | 52.5 | — | — | — | — | — |
| | TDI Prepolymer | | — | — | 35 | — | — | — | — | — | 56.6 | — |
| | IPDI Isocyanurate | | — | 40.3 | — | 42.7 | — | 50.9 | — | — | — | — |
| | MDI Adduct | | — | — | — | — | — | — | — | — | — | 41.8 |
| Pigment | Rutile-type Titanium Oxide | | 100.0 | 100.0 | 100.0 | 100.0 | 100.0 | 100.0 | 100.0 | 100.0 | 100.0 | 100.0 |
| Catalyst | DBTDL | *2 | 10.0 | 10.0 | 10.0 | 10.0 | 10.0 | 10.0 | 10.0 | 10.0 | 10.0 | 10.0 |
| Additive | Acronal 4F | *3 | 4.8 | 4.8 | 4.8 | 4.8 | 4.8 | 4.8 | 4.8 | 4.8 | 4.8 | 4.8 |

*Except for "Ratio of Curing Agents", all numerical values are "by weight". (The amounts of Compound (I-1), Polyol and Curing Agent are all by weight of the solid content.)

*1 HDI: Hexamethylene diisocyanate
Hydrogenated MDI: Hydrogenated 4,4'-diphenylmethane diisocyanate
TDI: Tolylene diisocyanate
MDI: 4,4'-Diphenylmethane diisocyanate
IPDI: Isophorone diisocyanate
*2 10% Solution of dibutyl tin dilaurate in cyclohexanone
*3 50% Solution of Acronal 4F in cyclohexanone

TABLE 7

| Comparative Sample No. | | | 1 | 2 | 3 | 4 | 5 | 6 | 7 | 8 | 9 | 10 |
|---|---|---|---|---|---|---|---|---|---|---|---|---|
| Properties of Coating Film | Appearance | | Good | Good | Good | Good | Good | Good | Good | Good | Good | Good |
| | Gloss | | ⊚ | ⊚ | ⊚ | ⊚ | ⊚ | ⊚ | ⊚ | ⊚ | ⊚ | ⊚ |
| | Pencil Hardness | | F | H | F | 2H | H | 2H | F | F | 2H | 2H |
| | Workability | Workability Test 1 | 0T | 1T | 1T | 2T | 2T | 3T | 0T | 0T | 4T | 5T |
| | | Workability Test 2 | 0T | 3T | 1T | 4T | 3T | 5T | 0T | 0T | 6T | 7T |
| | Impact Resistance (kg · cm) | | >75 | 50 | 50 | 45 | 45 | 40 | >75 | >75 | 40 | 40 |
| | MEK Rubbing Test (number of rubbing) | | 75 | >100 | 80 | >100 | >100 | >100 | 70 | 70 | >100 | >100 |
| | Stain Resistance  Red | | X | ○ | X | ○ | Δ | ⊚ | X | X | ⊚ | ⊚ |
| | to oily ink (ΔE)  Black | | ○ | ⊚ | ○ | ⊚ | ○ | ⊚ | Δ | Δ | ⊚ | ⊚ |

TABLE 8

| Comparative Sample No. | | | 11 | 12 | 13 | 14 |
|---|---|---|---|---|---|---|
| Compound (I-2) | | | 3.0 | 3.0 | — | — |
| Compound (I-3) | | | — | — | 1.0 | 1.0 |
| Compound (I-4) | | | — | — | — | — |
| Compound (I-5) | | | — | — | — | — |
| Compound (I-6) | | | — | — | — | — |
| Compound (I-7) | | | — | — | — | — |
| Compound (I-8) | | | — | — | — | — |
| Polyol | Polyol (1) | | — | — | — | — |
| | Polyol (2) | | 56.6 | 44.9 | — | — |
| | Polyol (3) | | — | — | — | — |
| | Polyol (4) | | — | — | 55.6 | 56.3 |
| Curing Agent *1 | HDI Prepolymer | | — | — | 43.4 | — |
| | HDI Isocyanurate | | — | — | — | — |
| | Hydrogenated MDI Prepolymer | | 40.4 | — | — | — |
| | TDI Prepolymer | | — | 52.1 | — | — |
| | IPDI Isocyanurate | | — | — | — | — |
| | MDI Adduct | | — | — | — | 42.7 |
| Pigment | Rutile-type Titanium Oxide | | 100.0 | 100.0 | 100.0 | 100.0 |
| Catalyst | DBTDL | *2 | 10.0 | 10.0 | 10.0 | 10.0 |
| Additive | Acronal 4F | *3 | 4.8 | 4.8 | 4.8 | 4.8 |

*Except for "Ratio of Curing Agents", all numerical values are "by weight". (The amounts of Compound (I-2) to (I-8), Polyol and Curing Agent are all by weight of the solid content.)
*1 HDI: Hexamethylene diisocyanate
Hydrogenated MDI: Hydrogenated 4,4'-diphenylmethane diisocyanate
TDI: Tolylene diisocyanate
MDI: 4,4'-Diphenylmethane diisocyanate
IPDI: Isophorone diisocyanate
*2 10% Solution of dibutyl tin dilaurate in cyclohexanone
*3 50% Solution of Acronal 4F in cyclohexanone

TABLE 9

| Comparative Sample No. | | | 15 | 16 | 17 | 18 |
|---|---|---|---|---|---|---|
| Compound (I-2) | | | — | — | — | — |
| Compound (I-3) | | | — | — | — | — |
| Compound (I-4) | | | — | — | — | — |
| Compound (I-5) | | | 5.0 | 5.0 | — | — |
| Compound (I-6) | | | — | — | — | — |
| Compound (I-7) | | | — | — | 12.0 | 12.0 |
| Compound (I-8) | | | — | — | — | — |
| Polyol | Polyol (1) | | 52.8 | 54.1 | — | — |
| | Polyol (2) | | — | — | — | — |
| | Polyol (3) | | — | — | — | — |
| | Polyol (4) | | — | — | 44.4 | 40.2 |
| Curing Agent *1 | HDI Prepolymer | | — | — | — | — |
| | HDI Isocyanurate | | — | — | 43.6 | — |
| | Hydrogenated MDI Prepolymer | | 42.2 | — | — | — |
| | TDI Prepolymer | | — | — | — | — |
| | IPDI Isocyanurate | | — | 40.9 | — | 47.8 |
| | MDI Adduct | | — | — | — | — |
| Pigment | Rutile-type Titanium Oxide | | 100.0 | 100.0 | 100.0 | 100.0 |
| Catalyst | DBTDL | *2 | 10.0 | 10.0 | 10.0 | 10.0 |
| Additive | Acronal 4F | *3 | 4.8 | 4.8 | 4.8 | 4.8 |

*Except for "Ratio of Curing Agents", all numerical values are "by weight". (The amounts of Compound (I-2) to (I-8), Polyol and Curing Agent are all by weight of the solid content.)
*1 HDI: Hexamethylene diisocyanate
Hydrogenated MDI: Hydrogenated 4,4'-diphenylmethane diisocyanate
TDI: Tolylene diisocyanate
MDI: 4,4'-Diphenylmethane diisocyanate
IPDI: Isophorone diisocyanate
*2 10% Solution of dibutyl tin dilaurate in cyclohexanone
*3 50% Solution of Acronal 4F in cyclohexanone

TABLE 10

| Comparative Sample No. | | | 11 | 12 | 13 | 14 | 15 | 16 | 17 | 18 |
|---|---|---|---|---|---|---|---|---|---|---|
| Properties of Coating Film | Appearance | | Good | Good | Good | Good | Good | Good | Good | Good |
| | Gloss | | ◉ | ◉ | ◯ | ◉ | ◉ | ◉ | ◉ | ◉ |
| | Pencil Hardness | | F | H | F | H | F | 2H | H | 2H |
| | Workability | Workability Test 1 | 1T | 2T | 1T | 2T | 1T | 3T | 2T | 4T |
| | | Workability Test 2 | 2T | 5T | 1T | 5T | 1T | 5T | 4T | 7T |
| | Impact Resistance (kg · cm) | | 50 | 50 | >75 | 40 | >75 | 40 | 50 | 40 |
| | MEK Rubbing Test (number of rubbings) | | 80 | >100 | 80 | >100 | 80 | >100 | >100 | >100 |
| | Stain Resistance | Red | X | ◯ | X | ◯ | Δ | ◯ | Δ | ◯ |
| | to oily ink (ΔE) | Black | ◯ | ◉ | Δ | ◉ | ◯ | ◉ | ◯ | ◉ |

TABLE 11

| Comparative Sample No. | | | 19 | 20 | 21 | 22 |
|---|---|---|---|---|---|---|
| Compound (I-1) | | | 0.3 | 18.0 | — | — |
| Compound (I-4) | | | — | — | 0.5 | — |
| Compound (I-6) | | | — | — | — | 18.0 |
| Polyol | Polyol (1) | | 62.0 | 23.2 | — | — |
| | Polyol (2) | | — | — | — | 27.6 |
| | Polyol (3) | | — | — | — | — |
| | Polyol (4) | | — | — | 47.9 | — |
| Curing Agent *1 | HDI Prepolymer | | — | — | 25.8 | 21.8 |
| | HDI Isocyanurate | | — | — | — | — |
| | Hydrogenated MDI Prepolymer | | 18.9 | 29.4 | — | — |
| | TDI Prepolymer | | — | — | — | — |
| | IPDI Isocyanurate | | 18.9 | 29.4 | 25.8 | — |
| | MDI Adduct | | — | — | — | 32.6 |
| Pigment | Rutile-type Titanium Oxide | | 100.0 | 100.0 | 100.0 | 100.0 |
| Catalyst | DBTDL | *2 | 10.0 | 10.0 | 10.0 | 10.0 |
| Additive | Acronal 4F | *3 | 4.8 | 4.8 | 4.8 | 4.8 |
| Ratio of Curing Agents, (A)/(B) | | *4 | 50/50 | 50/50 | 50/50 | 60/40 |

\* Except for "Ratio of Curing Agents", all numerical values are "by weight". (The amounts of Compounds (I-1), (I-4), (I-6), Polyol and Curing Agent are all by weight of the solid content.)
*1 HDI: Hexamethylene diisocyanate
Hydrogenated MDI: Hydrogenated 4,4'-diphenylmethane diisocyanate
TDI: Tolylene diisocyanate
MDI: 4,4'-Diphenylmethane diisocyanate
IPDI: Isophorone diisocyanate
*2 10% Solution of dibutyl tin dilaurate in cyclohexanone
*3 50% Solution of Acronal 4F in cyclohexanone
*4 Ratio by weight of blocked polyisocyanate compound in group (a) defined herein to that in group (b) defined herein

TABLE 12

| Comparative Sample No. | | | 23 | 24 | 25 | 26 |
|---|---|---|---|---|---|---|
| Compound (I-1) | | | 5.0 | 5.0 | — | — |
| Compound (I-4) | | | — | — | 5.0 | 5.0 |
| Compound (I-6) | | | — | — | — | — |
| Polyol | Polyol (1) | | 54.2 | 49.5 | — | — |
| | Polyol (2) | | — | — | — | — |
| | Polyol (3) | | — | — | — | — |
| | Polyol (4) | | — | — | 40.3 | 38.3 |
| Curing Agent *1 | HDI Prepolymer | | — | — | 27.4 | — |
| | HDI Isocyanurate | | 20.4 | — | — | — |
| | Hydrogenated MDI Prepolymer | | 20.4 | — | 27.4 | — |
| | TDI Prepolymer | | — | — | — | 28.3 |
| | IPDI Isocyanurate | | — | 22.7 | — | 28.3 |
| | MDI Adduct | | — | 22.7 | — | — |
| Pigment | Rutile-type Titanium Oxide | | 100.0 | 100.0 | 100.0 | 100.0 |
| Catalyst | DBTDL | *2 | 10.0 | 10.0 | 10.0 | 10.0 |
| Additive | Acronal 4F | *3 | 4.8 | 4.8 | 4.8 | 4.8 |
| Ratio of Curing Agents, (A)/(B) | | *4 | 50/50 | 50/50 | 50/50 | 50/50 |

\* Except for "Ratio of Curing Agents", all numerical values are "by weight". (The amounts of Compounds (I-1), (I-4), (I-6), Polyol and Curing Agent are all by weight of the solid content.)
*1 HDI: Hexamethylene diisocyanate
Hydrogenated MDI: Hydrogenated 4,4'-diphenylmethane diisocyanate
TDI: Tolylene diisocyanate

TABLE 12-continued

| Comparative Sample No. | 23 | 24 | 25 | 26 |
|---|---|---|---|---|

MDI: 4,4'-Diphenylmethane diisocyanate
IPDI: Isophorone diisocyanate
*2 10% Solution of dibutyl tin dilaurate in cyclohexanone
*3 50% Solution of Acronal 4F in cyclohexanone
*4 Ratio by weight of blocked polyisocyanate compound in group (a) defined herein to that in group (b) defined herein

TABLE 13

| Comparative Sample No. | | | 19 | 20 | 21 | 22 | 23 | 24 | 25 | 26 |
|---|---|---|---|---|---|---|---|---|---|---|
| Properties of Coating Film | Appearance | | Good | Not Good | Good | Not Good | Good | Good | Good | Good |
| | Gloss | | ◎ | Δ | ◎ | Δ | ◎ | ○ | ◎ | ○ |
| | Pencil Hardness | | F | 2H | F | 2H | HB | 2H | F | 2H |
| | Workability | Workability Test 1 | 0T | 3T | 0T | 4T | 0T | 3T | 0T | 4T |
| | | Workability Test 2 | 1T | 6T | 1T | 7T | 1T | 7T | 2T | 7T |
| | Impact Resistance (kg · cm) | | >75 | 45 | 50 | 35 | >75 | 35 | 60 | 35 |
| | MEK Rubbing Test (number of rubbings) | | 90 | >100 | 90 | >100 | 70 | >100 | 80 | >100 |
| | Stain Resistance | Red | Δ | Δ | Δ | Δ | X | ◎ | X | ◎ |
| | to oily ink (ΔE) | Black | ○ | ○ | ○ | ○ | ○ | ◎ | ○ | ◎ |

TABLE 14

| Comparative Sample No. | | | 27 | 28 | 29 | 30 |
|---|---|---|---|---|---|---|
| Compound (I-1) | | | 5.0 | 5.0 | 5.0 | 5.0 |
| Polyol | Polyol (1) | | 51.3 | 52.1 | 63.6 | 47.6 |
| | Polyol (2) | | — | — | — | — |
| | Polyol (3) | | — | — | — | — |
| | Polyol (4) | | — | — | — | — |
| Curing Agent *1 | HDI Prepolymer | | — | — | — | — |
| | HDI Isocyanurate | | — | — | 15.7 | 23.7 |
| | Hydrogenated MDI Prepolymer | | 35.0 | 8.6 | — | — |
| | TDI Prepolymer | | — | — | — | — |
| | IPDI Isocyanurate | | 8.6 | 34.3 | — | — |
| | MDI Adduct | | — | — | 15.7 | 23.7 |
| Pigment | Rutile-type Titanium Oxide | | 100.0 | 100.0 | 100.0 | 100.0 |
| Catalyst | DBTDL | *2 | 10.0 | 10.0 | 10.0 | 10.0 |
| Additive | Acronal 4F | *3 | 4.8 | 4.8 | 4.8 | 4.8 |
| Ratio of Curing Agents, (A)/(B) | | *4 | 20/80 | 80/20 | 50/50 | 50/50 |

* Except for "Ratio of Curing Agents", all numerical values are "by weight". (The amounts of Compounds (I-1), Polyol and Curing Agent are all by weight of the solid content.)
*1 HDI: Hexamethylene diisocyanate
Hydrogenated MDI: Hydrogenated 4,4'-diphenylmethane diisocyanate
TDI: Tolylene diisocyanate
MDI: 4,4'-Diphenylmethane diisocyanate
IPDI: Isophorone diisocyanate
*2 10% Solution of dibutyl tin dilaurate in cyclohexanone
*3 50% Solution of Acronal 4F in cyclohexanone
*4 Ratio by weight of blocked polyisocyanate compound in group (b) defined herein to that in group (b) defined herein

TABLE 15

| Comparative Sample No. | | | 27 | 28 | 29 | 30 |
|---|---|---|---|---|---|---|
| Properties of Coating Film | Appearance | | Good | Good | Good | Good |
| | Gloss | | ⊚ | ⊚ | ⊚ | ⊚ |
| | Pencil Hardness | | F | 2H | F | H+ |
| | Workability | Workability Test 1 | 1T | 3T | 0T | 2T |
| | | Workability Test 2 | 2T | 4T | 1T | 3T |
| | Impact Resistance (kg · cm) | | >75 | 40 | >75 | 40 |
| | MEK Rubbing Test (number of rubbings) | | 75 | >100 | 70 | >100 |
| | Stain Resistance | Red | Δ | ○ | X | ○ |
| | to oily ink (ΔE) | Black | ○ | ⊚ | ○ | ⊚ |

TABLE 16

| Resin Code | | a-1 | a-2 | a-3 | a-4 |
|---|---|---|---|---|---|
| Composition of Polyester | Dimethyl Terephthalate | 25 | 25 | 20 | 20 |
| Resin for Prime Coating Film | Dimethyl isophthalate | 25 | 25 | 20 | 20 |
| (% by mol) | Adipic Acid | — | — | — | — |
| | Ethylene Glycol | 25 | — | 30 | — |
| | Neopentyl Glycol | 25 | 25 | 30 | 30 |
| | 1,6-Hexanediol | — | 25 | — | 30 |
| Number-average Molecular Weight (Mn) | | 18000 | 20000 | 20000 | 22000 |

TABLE 17

| Resin Code | | b-1 | b-2 | b-3 | b-4 |
|---|---|---|---|---|---|
| Composition of Bisphenol | Dimethyl Terephthalate | 25 | 25 | 25 | 20 |
| A-added Polyester Resin | Dimethyl isophthalate | 25 | 25 | 25 | 20 |
| for Prime Coating Film | Ethylene Glycol | 45 | 40 | 25 | 15 |
| (% by mol) | Bisphenol A *1 | 5 | 10 | 25 | 45 |
| Number-average Molecular Weight (Mn) | | 22000 | 20000 | 18000 | 18000 |

*1 Bisphenol A-Ethylene Oxide (2 mols) Adduct

TABLE 18

| [Prime Coating Composition] | | | | | | |
|---|---|---|---|---|---|---|
| Composition Code | | | A-1 | A-2 | A-3 | A-4 |
| Polyester Resin *1 | a-1 | | 200 | — | — | — |
| (wt. pts.) | a-2 | | — | 200 | — | — |
| | a-3 | | — | — | 200 | — |
| | a-4 | | — | — | — | 200 |
| Melamine Resin (wt. pts.) | | *2 | 12 | — | 12 | 12 |
| Isocyanate Resin (wt. pts.) | | *3 | — | 20 | — | — |
| Cyclohexanone (wt. pts.) | | | 20 | 20 | 20 | 20 |
| Paratoluenesulfonic Acid (wt. pts.) | | | 0.1 | — | 0.1 | 0.1 |
| DBTDL (wt. pts.) | | *4 | — | 0.5 | — | — |
| Amount of Strontium Chromate per μm of dry film thickness (g/m²) | | | 0.22 | 0.14 | 0.06 | 0.14 |
| Physical Data | Breaking Strength (kg/cm²) | *5 | 72 | 102 | 85 | 105 |
| | Breaking Elongation (%) | *5 | 173 | 140 | 220 | 355 |

*1 Resin code in Table 16
*2 Methyletherified methylolmelamine
*3 Hexamethylene diisocyanate oxime block
*4 Dibutyl tin dilaurate
*5 Physical data of the film having width of 5 mm and a thickness of 8 +/- 1 μm

TABLE 19

[Prime Coating Composition]

| Composition Code | | | B-1 | B-2 | B-3 | B-4 |
|---|---|---|---|---|---|---|
| Bisphenol A-added Polyester Resin *1 | b-1 | | 200 | — | — | — |
| (wt. pts.) | b-2 | | — | 200 | — | — |
| | b-3 | | — | — | 200 | — |
| | b-4 | | — | — | — | 200 |
| Melamine Resin (wt. pts.) | | *2 | 12 | 12 | — | 12 |
| Isocyanate Resin (wt. pts.) | | *3 | — | — | 20 | — |
| Cyclohexanone (wt. pts.) | | | 20 | 20 | 20 | 20 |
| Paratoluenesulfonic Acid (wt. pts.) | | | 0.1 | 0.1 | — | 0.1 |
| DBTDL (wt. pts.) | | *4 | — | — | 0.5 | — |
| Amount of Strontium Chromate per μm of dry film thickness (g/m²) | | | 0.06 | 0.14 | 0.25 | 0.22 |
| Physical Data   Breaking Strength (kg/cm²) | | *5 | 153 | 178 | 240 | 310 |
| Breaking Elongation (%) | | *5 | 270 | 183 | 105 | 72 |

*1 Resin code in Table 17
*2 Methyletherified methylolmelamine
*3 Hexamethylene diisocyanate oxime block
*4 Dibutyl tin dilaurate
*5 Physical data of the film having width of 5 mm and a thickness of 8 +/− 1 μm

TABLE 20

[Topcoating Composition]

| Composition Code | | | C-1 |
|---|---|---|---|
| Compound (I-1) (wt. pts.) | | | 5.0 |
| polyol | Polyester Polyol (wt. pts.) | *1 | 51.7 |
| Curing Agent | Hydrogenated MDI Prepolymer | *2 | 21.7 |
| | IPDI Isocyanurate | *3 | 21.7 |
| Pigment | Rutile-type Titanium Oxide (wt. pts.) | *4 | 100.0 |
| Catalyst | DBTDL (wt. pts.) | *5 | 10.0 |
| Additive | Acronal 4F (wt. pts.) | *6 | 4.8 |

*1 This has a number-average molecular weight of about 3000, and a solid content of 70%
*2 Hydrogenated 4,4′-diphenylmethane diisocyanate prepolymer block
*3 Isophorone diisocyanate-isocyanurate block
*4 Taipake R-820 (produced by Ishihara Sangyo KK)
*5 10% Solution of dibutyl tin dilaurate in cyclohexanone
*6 50% Solution of Acronal 4F (produced by BASF) incyclohexanone

TABLE 21

| Sample No. of the Invention | | 1 | 2 | 3 | 4 | 5 | 6 |
|---|---|---|---|---|---|---|---|
| Prime Coating Film | Composition Code *1 | A-1 | A-2 | A-2 | A-2 | A-3 | A-4 |
| | Thickness (μm) | 5 | 2 | 5 | 12 | 5 | 5 |
| Topcoating Film | Composition Code *2 | C-1 | C-1 | C-1 | C-1 | C-1 | C-1 |
| | Thickness (μm) | 15 | 15 | 15 | 15 | 15 | 15 |
| Baking Temperature (° C.) | for prime coating film | 210 | 210 | 210 | 210 | 210 | 210 |
| *3 | for topcoating film | 230 | 230 | 230 | 230 | 230 | 230 |
| Appearance | | Good | Good | Good | Good | Good | Good |
| Pencil Hardness | | 2H | 2H | 2H | H | 2H | 2H |
| Workability Test 3 | 0T | ○ | ◎ | ◎ | ○ | ○ | ○ |
| | 1T | ◎ | ◎ | ◎ | ◎ | ◎ | ◎ |
| Adhesiveness | | ◎ | ◎ | ◎ | ◎ | ◎ | ◎ |

*1 Composition code in Tables 18 and 19
*2 Composition code in Table 20
*3 peak metal temperature sheet

TABLE 22

| Sample No. of the Invention | | 7 | 8 | 9 | 10 | 11 | 12 |
|---|---|---|---|---|---|---|---|
| Prime Coating Film | Composition Code *1 | B-1 | B-2 | B-2 | B-2 | B-3 | B-4 |
| | Thickness (μm) | 5 | 2 | 5 | 12 | 5 | 5 |
| Topcoating Film | Composition Code *2 | C-1 | C-1 | C-1 | C-1 | C-1 | C-1 |
| | Thickness (μm) | 15 | 15 | 15 | 15 | 15 | 15 |
| Baking Temperature (° C.) *3 | for prime coating film | 210 | 210 | 210 | 210 | 210 | 210 |
| | for topcoating film | 230 | 230 | 230 | 230 | 230 | 230 |
| Appearance | | Good | Good | Good | Good | Good | Good |
| Pencil Hardness | | 2H | 2H | 2H | H | 2H | 2H |
| Workability Test 3 | 0T | ◉ | ◉ | ◉ | ○ | ◉ | ○ |
| | 1T | ◉ | ◉ | ◉ | ◉ | ◉ | ◉ |
| Adhesiveness | | ◉ | ◉ | ◉ | ◉ | ◉ | ◉ |

*1 Composition code in Tables 18 and 19
*2 Composition code in Table 20
*3 peak metal temperature sheet

TABLE 23

[Prime coating Composition]

| Resin Code | | | P-1 | P-2 | P-3 | P-4 |
|---|---|---|---|---|---|---|
| Resin Component | Polyester Resin (wt. pts.) | *1 | 150 | 150 | — | — |
| | Epoxy Resin (wt. pts.) | *2 | — | — | 150 | 150 |
| Pigment (1) (wt. pts.) | | *3 | 35 | 20 | 35 | 20 |
| Pigment (2) (wt. pts.) | | *4 | 10 | 25 | 10 | 25 |
| Amount of Strontium Chromate per μm of dry film thickness (g/m$^2$) | | | 0.06 | 0.24 | 0.06 | 0.24 |

*1 High-molecular polyester resin (Almatex HMP27, produced by Mitsui Toatsu Chemicals, having a nonvolatile content of 50% by weight)
*2 Urethane-modified epoxy resin (Epoxy 834, produced by Mitsui Toatsu Chemicals, having a nonvolatile content of 40% by weight)
*3 Rutile-type titanium oxide (Taipake R-820, produced by Ishihara Sangyo KK)
*4 Strontium chromate (produced by Kikuchi Color Co., Ltd.)

TABLE 24

[Topcoating Composition]

| Composition Code | | | C-2 |
|---|---|---|---|
| Compound (I-1) (wt. pts.) | | | 5.0 |
| Polyol | Polyester Polyol (wt. pts.) | *1 | 51.7 |
| Curing Agent | Hydrogenated MDI Prepolymer | *2 | 21.7 |
| | IPDI Isocyanurate | *3 | 21.7 |
| Pigment | Rutile-type Titanium Oxide (wt. pts.) | *4 | 100.0 |
| Catalyst | DBTDL (wt. pts.) | *5 | 10.0 |
| Additive | Acronal 4F (wt. pts.) | *6 | 4.8 |

*1 This has a number-average molecular weight of about 3000, and a solid content of 70%
*2 Hydrogenated 4,4'-diphenylmethane diisocyanate prepolymer block
*3 Isophorone diisocyanate-isocyanurate block
*4 Taipake R-820 (produced by Ishihara Sangyo KK)
*5 10% Solution of dibutyl tin dilaurate in cyclohexanone
*6 50% Solution of Acronal 4F (product by BASF) in cyclohexanone

TABLE 25

| Sample No. of the Invention | | | 1 | 2 | 3 | 4 | 5 |
|---|---|---|---|---|---|---|---|
| Prime Coating Film | Composition Code | *1 | P-1 | P-1 | P-1 | P-2 | P-2 |
| | Thickness ($\mu$m) | | 2 | 5 | 12 | 2 | 5 |
| Topcoating Film | Composition Code | *2 | C-2 | C-2 | C-2 | C-2 | C-2 |
| | Thickness ($\mu$m) | | 15 | 15 | 15 | 15 | 15 |
| Strontium Chromate Content of Prime coating film per $\mu$m of thickness (g/m$^2$) | | | 0.06 | 0.06 | 0.06 | 0.24 | 0.24 |
| Baking Temperature (° C.) | | *3 | 230 | 230 | 230 | 230 | 230 |
| Appearance | | | Good | Good | Good | Good | Good |
| Pencil Hardness | | | 2H | 2H | H | 2H | 2H |
| Workability (0T) | | | ⊚ | ⊚ | ⊚ | ⊚ | ⊚ |
| Adhesiveness | | | ⊚ | ⊚ | ⊚ | ⊚ | ⊚ |
| Corrosion Resistance in Flat Area | | | ○ | ○ | ⊚ | ○ | ⊚ |

*1 Composition code in Table 23
*2 Composition code in Table 24
*3 Peak metal temperature of sheet

TABLE 26

| Sample No. of the Invention | | | 6 | 7 | 8 | 9 | 10 |
|---|---|---|---|---|---|---|---|
| Prime Coating Film | Composition Code | *1 | P-2 | P-3 | P-3 | P-4 | P-4 |
| | Thickness ($\mu$m) | | 12 | 5 | 12 | 5 | 12 |
| Topcoating Film | Composition Code | *2 | C-2 | C-2 | C-2 | C-2 | C-2 |
| | Thickness ($\mu$m) | | 15 | 15 | 15 | 15 | 15 |
| Strontium Chromate Content of Prime coating film per $\mu$m of thickness (g/m$^2$) | | | 0.24 | 0.06 | 0.06 | 0.24 | 0.24 |
| Baking Temperature (° C.) | | *3 | 230 | 230 | 230 | 230 | 230 |
| Appearance | | | Good | Good | Good | Good | Good |
| Pencil Hardness | | | H | 2H | H | 2H | H |
| Workability (0T) | | | ⊚ | ⊚ | ○ | ⊚ | ○ |
| Adhesiveness | | | ⊚ | ⊚ | ⊚ | ⊚ | ⊚ |
| Corrosion Resistance in Flat Area | | | ⊚ | ○ | ⊚ | ⊚ | ⊚ |

*1 Composition code in Table 23
*2 Composition code in Table 24
*3 Peak metal temperature of sheet

TABLE 27

[Wax]

| Wax Code | Wax Composition (melting Point) |
|---|---|
| a | Polyethylene Wax + Polytetrafluoroethylene (120° C.) |
| b | Carnauba Wax (100° C.) |
| c | Polyethylene Wax (130° C.) |
| d | High-molecular Wax (110° C.) |

TABLE 28

| Sample No. of the Invention | | | 1 | 2 | 3 | 4 | 5 | 6 | 7 | 8 |
|---|---|---|---|---|---|---|---|---|---|---|
| Topcoating Film | Composition Code | *1 | C-1 | C-1 | C-1 | C-1 | C-1 | C-1 | C-1 | C-1 |
| | Wax   Wac Code | *2 | a | b | c | d | a | a | b | b |
| | Amount Added | *3 | 2.0 | 2.0 | 2.0 | 2.0 | 1.0 | 5.0 | 1.0 | 5.0 |
| | Film Thickness (μm) | | 15 | 15 | 15 | 15 | 15 | 15 | 15 | 15 |
| | Baking Temperature (° C.) | *4 | 230 | 230 | 230 | 230 | 230 | 230 | 230 | 230 |
| Appearance | | | Good | Good | Good | Good | Good | Good | Good | Good |
| Pencil Hardness | | | 2H | 2H | 2H | 2H | 2H | 2H | 2H | 2H |
| Roll Abrasion Resistance | | | ⊚ | ⊚ | ⊚ | ○ | ○ | ⊚ | ○ | ⊚ |
| Cylinder Drawing Workability | | | ⊚ | ⊚ | ⊚ | ○ | ○ | ⊚ | ○ | ⊚ |
| Repetitive Abrasion Resistance | | | >100 | >100 | >100 | >100 | >100 | >100 | >100 | >100 |

*1 Composition code in Table 20
*2 Wax code in Table 27
*3 Amount (wt. pts.) in terms of the solid content, relative to 100 parts by weight of composition in Table 20
*4 Peak metal temperature of sheet

TABLE 29

| Sample No. of the Invention | | | 1 | 2 | 3 | 4 | 5 | 6 | 7 | 8 | 9 | 10 |
|---|---|---|---|---|---|---|---|---|---|---|---|---|
| Compound (II-1) | | | 3.0 | 5.0 | 10.0 | 18.0 | 5.0 | 5.0 | 5.0 | 5.0 | 5.0 | 5.0 |
| Polyol | Polyol (1) | | 55.3 | 50.4 | 38.1 | 18.4 | 40.6 | 50.9 | 48.1 | 50.2 | 42.0 | 49.1 |
| | Polyol (2) | | — | — | — | — | — | — | — | — | — | — |
| | Polyol (3) | | — | — | — | — | — | — | — | — | — | — |
| | Polyol (4) | | — | — | — | — | — | — | — | — | — | — |
| Curing Agent *1 | HDI Prepolymer | | — | — | — | — | 27.2 | — | — | — | 37.1 | 13.8 |
| | HDI Isocyanurate | | — | — | — | — | — | 22.0 | 23.5 | — | — | — |
| | Hydrogenated MDI Prepolymer | | 20.9 | 22.3 | 26.0 | 31.8 | — | — | — | 26.9 | — | — |
| | TDI Prepolymer | | — | — | — | — | 27.2 | — | 23.5 | — | 15.9 | — |
| | IPDI Isocyanurate | | 20.9 | 22.3 | 26.0 | 31.8 | — | — | — | 17.9 | — | 32.1 |
| | MDI Adduct | | — | — | — | — | — | 22.0 | — | — | — | — |
| Pigment | Rutile-type Titanium Oxide | | 100.0 | 100.0 | 100.0 | 100.0 | 100.0 | 100.0 | 100.0 | 100.0 | 100.0 | 100.0 |
| Catalyst | DBTDL | *2 | 10.0 | 10.0 | 10.0 | 10.0 | 10.0 | 10.0 | 10.0 | 10.0 | 10.0 | 10.0 |
| Additive | Acronal 4F | *3 | 4.8 | 4.8 | 4.8 | 4.8 | 4.8 | 4.8 | 4.8 | 4.8 | 4.8 | 4.8 |
| Ratio of Curing Agents, (A)/(B) | | *4 | 50/50 | 50/50 | 50/50 | 50/50 | 50/50 | 50/50 | 50/50 | 40/60 | 30/70 | 70/30 |

*Except for "Ratio of Curing Agents", all numerical values are "by weight". (The amounts of Compound (II-1), Polyol and Curing Agent are all by weight of the solid content.)
*1 HDI: Hexamethylene diisocyanate
Hydrogenated MDI: Hydrogenated 4,4'-diphenylmethane diisocyanate
TDI: Tolylene diisocyanate
IPDI: Isophorone diisocyanate
MDI: 4,4'-Diphenylmethane diisocyanate
*2 10% Solution of dibutyl tin dilaurate in cyclohexanone
*3 50% Solution of Acronal 4F in cyclohexanone
*4 Ratio by weight of blocked polyisocyanate compound in group (a) defined herein to that in group (b) defined herein

TABLE 30

| Sample No. of the Invention | | | 1 | 2 | 3 | 4 | 5 | 6 | 7 | 8 | 9 | 10 |
|---|---|---|---|---|---|---|---|---|---|---|---|---|
| Properties of Coating Film | Appearance | | Good | Good | Good | Good | Good | Good | Good | Good | Good | Good |
| | Gloss | | ⊚ | ⊚ | ⊚ | ⊚ | ⊚ | ⊚ | ⊚ | ⊚ | ⊚ | ⊚ |
| | Pencil Hardness | | H | 2H | 2H | 2H | H+ | 2H | H+ | 2H | H | 2H |
| | Workability | Workability Test 1 | 0T | 0T | 0T | 1T | 0T | 0T | 0T | 0T | 0T | 0T |
| | | Workability Test 2 | 0T | 0T | 0T | 1T | 0T | 0T | 0T | 0T | 0T | 0T |
| | Impact Resistance (kg · cm) | | >75 | >75 | >75 | >75 | >75 | >75 | >75 | >75 | >75 | >75 |
| | MEK Rubbing Test (number of rubbings) | | >100 | >100 | >100 | >100 | >100 | >100 | >100 | >100 | >100 | >100 |
| | Stain Resistance | Red | ○ | ○ | ⊚ | ⊚ | ○ | ○ | ○ | ○ | ○ | ⊚ |
| | to oily ink (ΔE) | Black | ⊚ | ⊚ | ⊚ | ⊚ | ⊚ | ⊚ | ⊚ | ⊚ | ⊚ | ⊚ |

TABLE 31

| Sample No. of the Invention | | | 11 | 12 | 13 | 14 | 15 | 16 | 17 |
|---|---|---|---|---|---|---|---|---|---|
| Compound (II-2) | | | 3.0 | 5.0 | 10.0 | — | — | — | — |
| Compound (II-3) | | | — | — | — | 1.0 | 5.0 | 10.0 | 18.0 |
| Polyol | Polyol (1) | | — | — | 33.1 | — | — | — | — |
|  | Polyol (2) | | 49.7 | — | — | — | — | 37.8 | — |
|  | Polyol (3) | | — | — | — | — | 62.2 | — | 27.4 |
|  | Polyol (4) | | — | 38.4 | — | 46.5 | — | — | — |
| Curing Agent *1 | HDI Prepolymer | | — | 28.3 | — | 31.5 | — | 20.9 | — |
|  | HDI Isocyanurate | | — | — | — | 19.7 | — | — | 32.6 |
|  | Hydrogenated MDI Prepolymer | | — | — | 26.0 | — | — | — | — |
|  | TDI Prepolymer | | 23.6 | — | — | — | — | — | — |
|  | IPDI Isocyanurate | | — | 28.3 | 26.0 | 21.0 | — | — | 22.0 |
|  | MDI Adduct | | — | — | — | — | 13.1 | 31.3 | — |
| Pigment | Rutile-type Titanium Oxide | | 100.0 | 100.0 | 100.0 | 100.0 | 100.0 | 100.0 | 100.0 |
| Catalyst | DBTDL | *2 | 10.0 | 10.0 | 10.0 | 10.0 | 10.0 | 10.0 | 10.0 |
| Additive | Acronal 4F | *3 | 4.8 | 4.8 | 4.8 | 4.8 | 4.8 | 4.8 | 4.8 |
| Ratio of Curing Agents, (A)/(B) | | *4 | 50/50 | 50/50 | 50/50 | 40/60 | 40/60 | 60/40 | 40/60 |

*Except for "Ratio of Curing Agents", all numerical values are "by weight". (The amounts of Compound (II-2), (II-3), Polyol and Curing Agent are all by weight of the solid content.)
*1 HDI: Hexamethylene diisocyanate
Hydrogenated MDI: Hydrogenated 4,4'-diphenylmethane diisocyanate
TDI: Tolylene diisocyanate
IPDI: Isophorone diisocyanate
MDI: 4,4'-Diphenylmethane diisocyanate
*2 10% Solution of dibutyl tin dilaurate in cyclohexanone
*3 50% Solution of Acronal 4F in cyclohexanone
*4 Ratio by weight of blocked polyisocyanate compound in group (a) defined herein to that in group (b) defined herein

TABLE 32

| Sample No. of the Invention | | | 11 | 12 | 13 | 14 | 15 | 16 | 17 |
|---|---|---|---|---|---|---|---|---|---|
| Properties of Coating Film | Appearance | | Good | Good | Good | Good | Good | Good | Good |
|  | Gloss | | ⊚ | ⊚ | ⊚ | ⊚ | ⊚ | ⊚ | ⊚ |
|  | Pencil Hardness | | H | H | 2H | H | 2H | H+ | 2H |
|  | Workability | Workability Test 1 | 0T | 0T | 0T | 0T | 0T | 0T | 1T |
|  |  | Workability Test 2 | 0T | 0T | 0T | 0T | 0T | 0T | 1T |
|  | Impact Resistance (kg · cm) | | >75 | >75 | >75 | >75 | >75 | >75 | >75 |
|  | MEK Rubbing Test (number of rubbings) | | >100 | >100 | >100 | >100 | >100 | >100 | >100 |
|  | Stain Resistance | Red | ○ | ○ | ⊚ | ○ | ○ | ○ | ⊚ |
|  | to oily ink (ΔE) | Black | ⊚ | ⊚ | ⊚ | ⊚ | ⊚ | ⊚ | ⊚ |

TABLE 33

| Comparative Sample No. | | | 1 | 2 | 3 | 4 | 5 | 6 | 7 | 8 | 9 | 10 |
|---|---|---|---|---|---|---|---|---|---|---|---|---|
| Compound (II-1) | | | 3.0 | 3.0 | 5.0 | 5.0 | 10.0 | 10.0 | 5.0 | 5.0 | 5.0 | 5.0 |
| Polyol | Polyol (1) | | 54.6 | 55.9 | 49.7 | 51.0 | 37.3 | 38.8 | 44.0 | 55.7 | 36.7 | 44.8 |
|  | Polyol (2) | | — | — | — | — | — | — | — | — | — | — |
|  | Polyol (3) | | — | — | — | — | — | — | — | — | — | — |
|  | Polyol (4) | | — | — | — | — | — | — | — | — | — | — |
| Curing Agent *1 | HDI Prepolymer | | — | — | — | — | — | — | 51.0 | — | — | — |
|  | HDI Isocyanurate | | — | — | — | — | — | — | — | 39.3 | — | — |
|  | Hydrogenated MDI Prepolymer | | 42.4 | — | 45.3 | — | 52.7 | — | — | — | — | — |
|  | TDI Prepolymer | | — | — | — | — | — | — | — | — | 58.3 | — |
|  | IPDI Isocyanurate | | — | 41.1 | — | 44.0 | — | 51.2 | — | — | — | — |
|  | MDI Adduct | | — | — | — | — | — | — | — | — | — | 50.2 |
| Pigment | Rutile-type Titanium Oxide | | 100.0 | 100.0 | 100.0 | 100.0 | 100.0 | 100.0 | 100.0 | 100.0 | 100.0 | 100.0 |
| Catalyst | DBTDL | *2 | 10.0 | 10.0 | 10.0 | 10.0 | 10.0 | 10.0 | 10.0 | 10.0 | 10.0 | 10.0 |
| Additive | Acronal 4F | *3 | 4.8 | 4.8 | 4.8 | 4.8 | 4.8 | 4.8 | 4.8 | 4.8 | 4.8 | 4.8 |

*Except for "Ratio of Curing Agents", all numerical values are "by weight". (The amounts of Compound (II-1), Polyol and Curing Agent are all by weight of the solid content.)
*1 HDI: Hexamethylene diisocyanate
Hydrogenated MDI: Hydrogenated 4,4'-diphenylmethane diisocyanate
TDI: Tolylene diisocyanate
IPDI: Isophorone diisocyanate
MDI: 4,4'-Diphenylmethane diisocyanate
*2 10% Solution of dibutyl tin dilaurate in cyclohexanone
*3 50% Solution of Acronal 4F in cyclohexanone

TABLE 34

| Comparative Sample No. | | | 1 | 2 | 3 | 4 | 5 | 6 | 7 | 8 | 9 | 10 |
|---|---|---|---|---|---|---|---|---|---|---|---|---|
| properties of Coating Film | Appearance | | Good | Good | Good | Good | Good | Good | Good | Good | Good | Good |
| | Gloss | | ◉ | ◉ | ◉ | ◉ | ◉ | ◉ | ◉ | ◉ | ◉ | ○ |
| | Pencil Hardness | | F | H | F | H | F+ | H+ | F | F | H+ | 2H |
| | Workability | Workability Test 1 | 0T | 1T | 0T | 2T | 0T | 2T | 0T | 0T | 3T | 3T |
| | | Workability Test 2 | 0T | 3T | 1T | 4T | 2T | 4T | 0T | 0T | 5T | 6T |
| | Impact Resistance (kg · cm) | | >75 | 50 | 55 | 50 | 60 | 45 | >75 | >75 | 45 | 40 |
| | MEK Rubbing Test (number of rubbings) | | 70 | 85 | >100 | >100 | >100 | >100 | 80 | 80 | >100 | >100 |
| | Stain Resistance | Red | X | ○ | Δ | ○ | Δ | ○ | X | X | ○ | ◉ |
| | to oily ink (ΔE) | Black | ○ | ◉ | ○ | ◉ | ○ | ◉ | Δ | ○ | ◉ | ◉ |

TABLE 35

| Comparative Sample No. | | | 11 | 12 | 13 | 14 | 15 | 16 |
|---|---|---|---|---|---|---|---|---|
| Compound (II-2) | | | 3.0 | 3.0 | — | — | — | — |
| Compound (II-3) | | | — | — | 5.0 | 5.0 | 18.0 | 18.0 |
| Polyol | Polyol (1) | | — | — | — | — | — | — |
| | Polyol (2) | | 55.0 | 42.9 | — | — | — | — |
| | Polyol (3) | | — | — | 65.4 | 55.8 | — | — |
| | Polyol (4) | | — | — | — | — | 28.9 | 23.8 |
| Curing Agent *1 | HDI Prepolymer | | — | — | — | — | — | — |
| | HDI Isocyanurate | | — | — | 29.6 | — | 53.1 | — |
| | Hydrogenated MDI Prepolymer | | 42.0 | — | — | — | — | — |
| | TDI Prepolymer | | — | 54.1 | — | — | — | — |
| | IPDI Isocyanurate | | — | — | — | — | — | 58.2 |
| | MDI Adduct | | — | — | — | 39.2 | — | — |
| Pigment | Rutile-type Titanium Oxide | | 100.0 | 100.0 | 100.0 | 100.0 | 100.0 | 100.0 |
| Catalyst | DBTDL | *2 | 10.0 | 10.0 | 10.0 | 10.0 | 10.0 | 10.0 |
| Additive | Acronal 4F | *3 | 4.8 | 4.8 | 4.8 | 4.8 | 4.8 | 4.8 |

*Except for "Ratio of Curing Agents", all numerical values are "by weight". (The amounts of Compound (II-2), (II-3), Polyol and Curing Agent are all by weight of the solid content.)

*1 HDI: Hexamethylene diisocyanate

Hydrogenated MDI: Hydrogenated 4,4'-diphenylmethane diisocyanate

TDI: Tolylene diisocyanate

IPDI: Isophorone diisocyanate

MDI: 4,4'-Diphenylmethane diisocyanate

*2 10% Solution of dibutyl tin dilaurate in cyclohexanone

*3 50% Solution of Acronal 4F in cyclohexanone

TABLE 36

| Comparative Sample No. | | | 11 | 12 | 13 | 14 | 15 | 16 |
|---|---|---|---|---|---|---|---|---|
| Properties of Coating Film | Appearance | | Good | Good | Good | Good | Good | Good |
| | Gloss | | ◉ | ◉ | ◉ | ◉ | ◉ | ◉ |
| | Pencil Hardness | | F | F+ | F | H | H | 2H |
| | Workability | Workability Test 1 | 0T | 2T | 1T | 2T | 2T | 3T |
| | | Workability Test 2 | 0T | 4T | 3T | 4T | 5T | 6T |
| | Impact Resistance (kg · cm) | | >75 | 40 | >75 | 40 | 40 | 40 |
| | MEK Rubbing Test (number of rubbings) | | 75 | >100 | 85 | >100 | >100 | >100 |
| | Stain Resistance | Red | X | ○ | X | ○ | Δ | ◉ |
| | to oily ink (ΔE) | Black | ○ | ◉ | ○ | ◉ | ○ | ◉ |

TABLE 37

| Comparative Sample No. | | | 17 | 18 | 19 | 20 |
|---|---|---|---|---|---|---|
| Compound (II-1) | | | 0.3 | 20.0 | — | — |
| Compound (II-3) | | | — | — | 5.0 | 5.0 |
| Polyol | Polyol (1) | | 61.9 | 13.5 | — | — |
| | Polyol (2) | | — | — | — | — |
| | Polyol (3) | | — | — | 63.0 | 58.7 |
| | Polyol (4) | | — | — | — | — |
| Curing Agent *1 | HDI Prepolymer | | — | — | — | — |
| | HDI Isocyanurate | | — | — | 16.0 | — |
| | Hydrogenated MDI Prepolymer | | 18.9 | 33.3 | 16.0 | — |
| | TDI Prepolymer | | — | — | — | — |
| | IPDI Isocyanurate | | 18.9 | 33.3 | — | 18.1 |
| | MDI Adduct | | — | — | — | 18.1 |
| Pigment | Rutile-type Titanium Oxide | | 100.0 | 100.0 | 100.0 | 100.0 |
| Catalyst | DBTDL | *2 | 10.0 | 10.0 | 10.0 | 10.0 |
| Additive | Acronal 4F | *3 | 4.8 | 4.8 | 4.8 | 4.8 |
| Ratio of Curing Agents, (A)/(B) | | *4 | 50/50 | 50/50 | 50/50 | 50/50 |

*Except for "Ratio of Curing Agents", all numerical values are "by weight". (The amounts of Compound (II-2), (II-3), Polyol and Curing Agent are all by weight of the solid content.)
*1 HDI: Hexamethylene diisocyanate
Hydrogenated MDI: Hydrogenated 4,4'-diphenylmethane diisocyanate
TDI: Tolylene diisocyanate
IPDI: Isophorone diisocyanate
MDI: 4,4'-Diphenylmethane diisocyanate
*2 10% Solution of dibutyl tin dilaurate in cyclohexanone
*3 50% Solution of Acronal 4F in cyclohexanone
*4 Ratio by weight of blocked polyisocyanate compound in group (a) defined herein to that in group (b) defined herein

TABLE 38

| Comparative Sample No. | | | 17 | 18 | 19 | 20 |
|---|---|---|---|---|---|---|
| Properties of Coating Film | Appearance | | Good | Not Good | Good | Not Good |
| | Gloss | | ◉ | Δ | ◉ | ○ |
| | Pencil Hardness | | F | 2H | HB | 2H |
| | Workability | Workability Test 1 | 0T | 3T | 0T | 2T |
| | | Workability Test 2 | 1T | 5T | 1T | 6T |
| | Impact Resistance (kg · cm) | | >75 | 50 | >75 | 40 |
| | MEK Rubbing Test (number of rubbings) | | 80 | >100 | 70 | >100 |
| | Stain Resistance | Red | Δ | Δ | X | ◉ |
| | to oily ink (ΔE) | Black | ○ | ○ | Δ | ◉ |

TABLE 39

| Comparative Sample No. | | | 21 | 22 | 23 | 24 |
|---|---|---|---|---|---|---|
| Compound (II-1) | | | 5.0 | 5.0 | 5.0 | 5.0 |
| Polyol | Polyol (1) | | 50.0 | 50.8 | 62.6 | 46.2 |
| | Polyol (2) | | — | — | — | — |
| | Polyol (3) | | — | — | — | — |
| | Polyol (4) | | — | — | — | — |
| Curing Agent *1 | HDI Prepolymer | | — | — | — | — |
| | HDI Isocyanurate | | — | — | 16.2 | 24.4 |
| | Hydrogenated MDI Prepolymer | | 36.0 | 8.8 | — | — |
| | TDI Prepolymer | | — | — | — | — |
| | IPDI Isocyanurate | | 9.0 | 35.4 | — | — |
| | MDI Adduct | | — | — | 16.2 | 24.4 |
| Pigment | Rutile-type Titanium Oxide | | 100.0 | 100.0 | 100.0 | 100.0 |
| Catalyst | DBTDL | *2 | 10.0 | 10.0 | 10.0 | 10.0 |
| Additive | Acronal 4F | *3 | 4.8 | 4.8 | 4.8 | 4.8 |
| Ratio of Curing Agents, (A)/(B) | | *4 | 20/80 | 80/20 | 50/50 | 50/50 |

*Except for "Ratio of Curing Agents", all numerical values are "by weight". (The amounts of Compound (II-1), Polyol and Curing Agent are all by weight of the solid content.)
*1 HDI: Hexamethylene diisocyanate
Hydrogenated MDI: Hydrogenated 4,4'-diphenylmethane diisocyanate
TDI: Tolylene diisocyanate

TABLE 39-continued

| Comparative Sample No. | 21 | 22 | 23 | 24 |
|---|---|---|---|---|

IPDI: Isophorone diisocyanate
MDI: 4,4'-Diphenylmethane diisocyanate
*2 10% Solution of dibutyl tin dilaurate in cyclohexanone
*3 50% Solution of Acronal 4F in cyclohexanone
*4 Ratio by weight of blocked polyisocyanate compound in group (a) defined herein to that in group (b) defined herein
10

TABLE 40

| Comparative Sample No. | | | 21 | 22 | 23 | 24 |
|---|---|---|---|---|---|---|
| Properties of Coating Film | Appearance | | Good | Good | Good | Good |
| | Gloss | | ⊙ | ⊙ | ⊙ | ⊙ |
| | Pencil Hardness | | F+ | 2H | H | H+ |
| | Workability | Workability Test 1 | 1T | 3T | 1T | 2T |
| | | Workability Test 2 | 2T | 4T | 3T | 3T |
| | Impact Resistance (kg · cm) | | >75 | 40 | >75 | 45 |
| | MEK Rubbing Test (number of rubbings) | | >100 | >100 | >100 | >100 |
| | Stain Resistance | Red | Δ | ◯ | Δ | ◯ |
| | to oily ink (ΔE) | Black | ◯ | ⊙ | ◯ | ⊙ |

TABLE 41

| [Topcoating Composition] | | | | |
|---|---|---|---|---|
| Composition Code | | | | C-3 |
| Compound (II-1) (wt. pts.) | | | | 5.0 |
| Polyol | Polyester Polyol (wt. pts.) | *1 | | 50.4 |
| Curing Agent | Hydrogenated MDI Prepolymer | *2 | | 22.3 |
| | IPDI Isocyanurate | *3 | | 22.3 |
| Pigment | Rutile-type Titanium Oxide (wt. pts.) | *4 | | 100.0 |
| Catalyst | DBTDL (wt. pts.) | *5 | | 10.0 |
| Additive | Acronal 4F (wt. pts.) | *6 | | 4.8 |

*1 This has a number-average molecular weight of about 3000, and a solid content of 70%
*2 Hydrogenated 4,4'-diphenylmethane diisocyanate prepolymer block
*3 Isophorone diisocyanate-isocyanurate block
*4 Taipake R-820 (produced by Ishihara Sangyo KK)
*5 10% Solution of dibutyl tin dilaurate in cyclohexanone
*6 50% Solution of Acronal 4F (produced by BASF) in cyclohexanone

TABLE 42

| Sample No. of the Invention | | 1 | 2 | 3 | 4 | 5 | 6 |
|---|---|---|---|---|---|---|---|
| Prime Coating Film | Composition Code *1 | A-1 | A-2 | A-2 | A-2 | A-3 | A-4 |
| | Thickness (μm) | 5 | 2 | 5 | 12 | 5 | 5 |
| Topcoating Film | Composition Code *2 | C-3 | C-3 | C-3 | C-3 | C-3 | C-3 |
| | Thickness (μm) | 15 | 15 | 15 | 15 | 15 | 15 |
| Baking Temperature (° C.) | for prime coating film | 210 | 210 | 210 | 210 | 210 | 210 |
| *3 | for topcoating film | 230 | 230 | 230 | 230 | 230 | 230 |
| Appearance | | Good | Good | Good | Good | Good | Good |
| Pencil Hardness | | 2H | 2H | 2H | H | 2H | 2H |
| Workability Test 3 | 0T | ◯ | ⊙ | ⊙ | ◯ | ◯ | ⊙ |
| | 1T | ⊙ | ⊙ | ⊙ | ⊙ | ⊙ | ⊙ |
| Adhesiveness | | ⊙ | ⊙ | ⊙ | ⊙ | ⊙ | ⊙ |

*1 Composition code in Tables 18 and 19
*2 Composition code in Table 41
*3 Peak metal temperature of sheet

TABLE 43

| Sample No. of the Invention | | 7 | 8 | 9 | 10 | 11 | 12 |
|---|---|---|---|---|---|---|---|
| Prime Coating Film | Composition Code *1 | B-1 | B-2 | B-2 | B-2 | B-3 | B-4 |
| | Thickness (μm) | 5 | 2 | 5 | 12 | 5 | 5 |
| Topcoating Film | Composition Code *2 | C-3 | C-3 | C-3 | C-3 | C-3 | C-3 |
| | Thickness (μm) | 15 | 15 | 15 | 15 | 15 | 15 |
| Baking Temperature (° C.) *3 | for prime coating film | 210 | 210 | 210 | 210 | 210 | 210 |
| | for topcoating film | 230 | 230 | 230 | 230 | 230 | 230 |
| Appearance | | Good | Good | Good | Good | Good | Good |
| Pencil Hardness | | 2H | 2H | 2H | H | 2H | 2H |
| Workability Test 3 | 0T | ◉ | ◉ | ◉ | ○ | ◉ | ○ |
| | 1T | ◉ | ◉ | ◉ | ◉ | ◉ | ◉ |
| Adhesiveness | | ◉ | ◉ | ◉ | ◉ | ◉ | ◉ |

*1 Composition code in Tables 18 and 19
*2 Composition code in Table 41
*3 Peak metal temperature of sheet

TABLE 44

[Topcoating Composition]

| Composition Code | | | C-4 |
|---|---|---|---|
| Compound (II-1) (wt. pts.) | | | 5.0 |
| Polyol | Polyester Polyol (wt. pts.) | *1 | 51.7 |
| Curing Agent | Hydrogenated MDI Prepolymer | *2 | 21.7 |
| | IPDI Isocyanurate | *3 | 21.7 |
| Pigment | Rutile-type Titanium Oxide (wt. pts.) | *4 | 100.0 |
| Catalyst | DBTDL (wt. pts.) | *5 | 10.0 |
| Additive | Acronal 4F (wt. pts.) | *6 | 4.8 |

*1 This has a number-average molecular weight of about 3000, and a solid content of 70%
*2 Hydrogenated 4,4'-diphenylmethane diisocyanate prepolymer block
*3 Isophorone diisocyanate-isocyanurate block
*4 Taipake R-820 (produced by Ishihara Sangyo KK)
*5 10% Solution of dibutyl tin dilaurate in cyclohexanone
*6 50% Solution of Acronal 4F (produced by BASF) in cyclohexanone

TABLE 45

| Sample No. of the Invention | | | 1 | 2 | 3 | 4 | 5 |
|---|---|---|---|---|---|---|---|
| Prime Coating Film | Composition Code | *1 | P-1 | P-1 | P-1 | P-2 | P-2 |
| | Thickness (μm) | | 2 | 5 | 12 | 2 | 5 |
| Topcoating Film | Composition Code | *2 | C-4 | C-4 | C-4 | C-4 | C-4 |
| Thickness (μm) | | | 15 | 15 | 15 | 15 | 15 |
| Strontium Chromate Content of Prime Coating Film per μm of thickness (g/m²) | | | 0.06 | 0.06 | 0.06 | 0.24 | 0.24 |
| Baking Temperature (° C.) | | *3 | 230 | 230 | 230 | 230 | 230 |
| Appearance | | | Good | Good | Good | Good | Good |
| Pencil Hardness | | | 2H | 2H | H | 2H | 2H |
| Workability (0T) | | | ◉ | ◉ | ◉ | ◉ | ◉ |
| Adhesiveness | | | ◉ | ◉ | ◉ | ◉ | ◉ |
| Corrosion Resistance in Flat Area | | | ○ | ○ | ◉ | ○ | ◉ |

*1 Composition code in Table 23
*2 Composition code in Table 44
*3 Peak metal temperature of sheet

TABLE 46

| Sample No. of the Invention | | | 6 | 7 | 8 | 9 | 10 |
|---|---|---|---|---|---|---|---|
| Prime Coating Film | Composition Code | *1 | P-2 | P-3 | P-3 | P-4 | P-4 |
| | Thickness (μm) | | 12 | 5 | 12 | 5 | 12 |
| Topcoating Film | Composition Code | *2 | C-4 | C-4 | C-4 | C-4 | C-4 |
| | Thickness (μm) | | 15 | 15 | 15 | 15 | 15 |
| Strontium Chromate Content of Prime Coating Film per μm of thickness (g/m²) | | | 0.24 | 0.06 | 0.06 | 0.24 | 0.24 |
| Baking Temperature (° C.) | | | 230 | 230 | 230 | 230 | 230 |
| Appearance | | | Good | Good | Good | Good | Good |
| Pencil Hardness | | *3 | H | 2H | H | 2H | H |
| Workability (0T) | | | ⊚ | ⊚ | ○ | ⊚ | ○ |
| Adhesiveness | | | ⊚ | ⊚ | ⊚ | ⊚ | ⊚ |
| Corrosion Resistance in Flat Area | | | ⊚ | ○ | ⊚ | ⊚ | ⊚ |

*1 Composition code in Table 23
*2 Composition code in Table 44
*3 Peak metal temperature of sheet

TABLE 47

| Sample No. of the Invention | | | | 1 | 2 | 3 | 4 | 5 | 6 | 7 | 8 |
|---|---|---|---|---|---|---|---|---|---|---|---|
| Top Coating Film | Composition Code | | *1 | C-3 | C-3 | C-3 | C-3 | C-3 | C-3 | C-3 | C-3 |
| | Wax | Wax Code | *2 | a | b | c | d | a | a | b | b |
| | | Amount Added | *3 | 2.0 | 2.0 | 2.0 | 2.0 | 1.0 | 5.0 | 1.0 | 5.0 |
| | Film Thickness (μm) | | | 15 | 15 | 15 | 15 | 15 | 15 | 15 | 15 |
| | Baking Temperature (° C.) | | *4 | 230 | 230 | 230 | 230 | 230 | 230 | 230 | 230 |
| Appearance | | | | Good | Good | Good | Good | Good | Good | Good | Good |
| Pencil Hardness | | | | 2H | 2H | 2H | 2H | 2H | 2H | 2H | 2H |
| Roll Abrasion Resistance | | | | ⊚ | ⊚ | ⊚ | ○ | ○ | ⊚ | ○ | ⊚ |
| Cylinder Drawing Workability | | | | ⊚ | ⊚ | ⊚ | ○ | ○ | ⊚ | ○ | ⊚ |
| Repetitive Abrasion Resistance | | | | >100 | >100 | >100 | >100 | >100 | >100 | >100 | >100 |

*1 Composition code in Table 41
*2 Wax code in Table 27
*3 Amount (wt. pts.) in terms of the solid content, relative to 100 parts by weight of composition in Table 41
*4 Peak metal temperature of sheet

TABLE 48

| Sample No. of the Invention | | | 1 | 2 | 3 | 4 | 5 | 6 | 7 | 8 | 9 | 10 |
|---|---|---|---|---|---|---|---|---|---|---|---|---|
| Compound (III-1) | | | 3.0 | 5.0 | 7.0 | 12.0 | 5.0 | 5.0 | 5.0 | 5.0 | 5.0 | 5.0 |
| Polyol | Polyol (1) | | 58.2 | 55.2 | 54.5 | 44.7 | 46.5 | 55.7 | 53.1 | 55.1 | 47.7 | 54.1 |
| | Polyol (2) | | — | — | — | — | — | — | — | — | — | — |
| | Polyol (3) | | — | — | — | — | — | — | — | — | — | — |
| | Polyol (4) | | — | — | — | — | — | — | — | — | — | — |
| Curing Agent *1 | HDI Prepolymer | | — | — | — | — | 24.3 | — | — | — | 33.1 | 12.3 |
| | HDI Isocyanurate | | — | — | — | — | — | 19.7 | 20.9 | — | — | — |
| | Hydrogenated MDI Prepolymer | | 19.4 | 19.9 | 19.3 | 21.6 | — | — | — | 24.0 | — | — |
| | TDI Prepolymer | | — | — | — | — | 24.3 | — | 20.9 | — | 14.2 | — |
| | IPDI Isocyanurate | | 19.4 | 19.9 | 19.3 | 21.6 | — | — | — | 16.0 | — | 28.6 |
| | MDI Adduct | | — | — | — | — | — | 19.7 | — | — | — | — |
| Pigment | Rutile-type Titanium Oxide | | 100.0 | 100.0 | 100.0 | 100.0 | 100.0 | 100.0 | 100.0 | 100.0 | 100.0 | 100.0 |
| Catalyst | DBTDL | *2 | 10.0 | 10.0 | 10.0 | 10.0 | 10.0 | 10.0 | 10.0 | 10.0 | 10.0 | 10.0 |
| Additive | Acronal 4F | *3 | 4.8 | 4.8 | 4.8 | 4.8 | 4.8 | 4.8 | 4.8 | 4.8 | 4.8 | 4.8 |
| Ratio of Curing Agents, (A)/(B) | | *4 | 50/50 | 50/50 | 50/50 | 50/50 | 50/50 | 50/50 | 50/50 | 40/60 | 30/70 | 70/30 |

* Except for "Ratio of Curing Agents", all numerical values are "by weight". (The amounts of Compound (III-1), Polyol and Curing Agent are all by weight of the solid content).
*1 HDI: Hexamethylene diisocyanate
Hydrogenated MDI: Hydrogenated 4,4'-diphenylmethane diisocyanate
TDI: Tolylene diisocyanate
MDI: 4,4'-Diphenylmethane diisocyanate
*2 10% Solution of dibutyl tin dilaurate in cyclohexanone
*3 50% Solution of Acronal 4F in cyclohexanone
*4 Ratio by weight of blocked polyisocyanate compound in group (a) defined herein to that in group (b) defined herein

TABLE 49

| Sample No. of the Invention | | | 1 | 2 | 3 | 4 | 5 | 6 | 7 | 8 | 9 | 10 |
|---|---|---|---|---|---|---|---|---|---|---|---|---|
| Properties of Coating Film | Appearance | | Good | Good | Good | Good | Good | Good | Good | Good | Good | Good |
| | Gloss | | ◉ | ◉ | ◉ | ◉ | ◉ | ◉ | ◉ | ◉ | ◉ | ◉ |
| | Pencil Hardness | | H+ | 2H | 2H | 2H | H+ | H+ | H+ | 2H | H | 2H |
| | Workability | Workability Test 1 | 0T | 0T | 0T | 1T | 0T | 0T | 0T | 0T | 0T | 0T |
| | | Workability Test 2 | 0T | 0T | 0T | 1T | 0T | 0T | 0T | 0T | 0T | 0T |
| | Impact Resistance (kg · cm) | | >75 | >75 | >75 | >75 | >75 | >75 | >75 | >75 | >75 | >75 |
| | MEK Rubbing Test (number of rubbings) | | >100 | >100 | >100 | >100 | >100 | >100 | >100 | >100 | >100 | >100 |
| | Stain Resistance | Red | ○ | ○ | ◉ | ◉ | ○ | ○ | ○ | ○ | ○ | ◉ |
| | to oily ink (ΔE) | Black | ◉ | ◉ | ◉ | ◉ | ◉ | ◉ | ◉ | ◉ | ◉ | ◉ |

TABLE 50

| Sample No. of the Invention | | | 11 | 12 | 13 | 14 | 15 | 16 | 17 | 18 | 19 |
|---|---|---|---|---|---|---|---|---|---|---|---|
| Compound (III-2) | | | 3.0 | 5.0 | 7.0 | 12.0 | 1.0 | 5.0 | 7.0 | 12.0 | 15.0 |
| Polyol | Polyol (1) | | — | — | 49.6 | — | — | — | — | — | — |
| | Polyol (2) | | 51.8 | — | — | 34.2 | — | — | 44.3 | — | — |
| | Polyol (3) | | — | — | — | — | — | 62.2 | — | — | 39.9 |
| | Polyol (4) | | — | 41.0 | — | — | 47.9 | — | — | 67.4 | — |
| Curing Agent *1 | HDI Prepolymer | | — | 27.0 | — | 26.9 | 30.1 | — | 19.5 | — | — |
| | HDI Isocyanurate | | — | — | — | — | — | 19.6 | — | 30.9 | — |
| | Hydrogenated MDI Prepolymer | | 22.6 | — | 21.7 | — | — | — | — | — | 18.0 |
| | TDI Prepolymer | | 22.6 | — | — | — | — | — | — | — | — |
| | IPDI Isocyanurate | | — | 27.0 | 21.7 | — | 21.0 | — | — | 20.6 | 27.1 |
| | MDI Adduct | | — | — | — | 26.9 | — | 13.0 | 29.2 | — | — |
| Pigment | Rutile-type Titanium Oxide | | 100.0 | 100.0 | 100.0 | 100.0 | 100.0 | 100.0 | 100.0 | 100.0 | 100.0 |
| Catalyst | DBTDL | *2 | 10.0 | 10.0 | 10.0 | 10.0 | 10.0 | 10.0 | 10.0 | 10.0 | 10.0 |
| Additive | Acronal 4F | *3 | 4.8 | 4.8 | 4.8 | 4.8 | 4.8 | 4.8 | 4.8 | 4.8 | 4.8 |
| Ratio of Curing Agents, (A)/(B) | | *4 | 50/50 | 50/50 | 50/50 | 50/50 | 40/60 | 40/60 | 60/40 | 40/60 | 60/40 |

*Except for "Ratio of Curing Agents", all numerical values are "by weight". (The amounts of Compound (III-2), Polyol and Curing Agent are all by weight of the solid content.)
*1 HDI: Hexamethylene diisocyanate
Hydrogenated MDI: Hydrogenated 4,4'-diphenylmethane diisocyanate
TDI: Tolylene diisocyanate
IPDI: Isophorone diisocyanate
MDI: 4,4'-Diphenylmethane diisocyanate
*2 10% Solution of dibutyl tin dilaurate in cyclohexanone
*3 50% Solution of Acronal 4F in cyclohexanone
*4 Ratio by weight of blocked polyisocyanate compound in group (a) defined herein to that in group (b) defined herein

TABLE 51

| Sample No. of the Invention | | | 11 | 12 | 13 | 14 | 15 | 16 | 17 | 18 | 19 |
|---|---|---|---|---|---|---|---|---|---|---|---|
| Properties of Coating Film | Appearance | | Good | Good | Good | Good | Good | Good | Good | Good | Good |
| | Gloss | | ◉ | ◉ | ◉ | ◉ | ◉ | ◉ | ◉ | ◉ | ◉ |
| | Pencil Hardness | | H | 2H | 2H | H | H | H | H+ | 2H | 2H |
| | Workability | Workability Test 1 | 0T | 0T | 0T | 0T | 0T | 0T | 0T | 1T | 0T |
| | | Workability Test 2 | 0T | 0T | 0T | T | 0T | 0T | 0T | 1T | 0T |
| | Impact Resistance (kg · cm) | | >75 | >75 | >75 | >75 | >75 | >75 | >75 | >75 | >75 |
| | MEK Rubbing Test (number of rubbings) | | >100 | >100 | >100 | >100 | >100 | >100 | >100 | >100 | >100 |
| | Stain Resistance | Red | ○ | ○ | ○ | ◉ | ○ | ○ | ◉ | ◉ | ◉ |
| | to oily ink (ΔE) | Black | ◉ | ◉ | ◉ | ◉ | ◉ | ◉ | ◉ | ◉ | ◉ |

TABLE 52

| Comparative Sample No. | | | 1 | 2 | 3 | 4 | 5 | 6 | 7 | 8 | 9 | 10 |
|---|---|---|---|---|---|---|---|---|---|---|---|---|
| Compound (III-1) | | | 3.0 | 3.0 | 5.0 | 5.0 | 12.0 | 12.0 | 5.0 | 5.0 | 5.0 | 5.0 |
| Polyol | Polyol (1) | | 57.6 | 58.8 | 54.6 | 55.8 | 44.1 | 45.4 | 49.5 | 60.0 | 43.0 | 54.1 |
| | Polyol (2) | | — | — | — | — | — | — | — | — | — | — |
| | Polyol (3) | | — | — | — | — | — | — | — | — | — | — |
| | Polyol (4) | | — | — | — | — | — | — | — | — | — | — |
| Curing Agent *1 | HDI Prepolymer | | — | — | — | — | — | — | 45.5 | — | — | — |
| | HDI Isocyanurate | | — | — | — | — | — | — | — | 35.0 | — | — |
| | Hydrogenated MDI Prepolymer | | 39.4 | — | 40.4 | — | 43.9 | — | — | — | — | — |
| | TDI Prepolymer | | — | — | — | — | — | — | — | — | 52.0 | — |
| | IPDI Isocyanurate | | — | 38.2 | — | 39.2 | — | 42.6 | — | — | — | — |
| | MDI Adduct | | — | — | — | — | — | — | — | — | — | 40.9 |
| Pigment | Rutile-type Titanium Oxide | | 100.0 | 100.0 | 100.0 | 100.0 | 100.0 | 100.0 | 100.0 | 100.0 | 100.0 | 100.0 |
| Catalyst | DBTDL | *2 | 10.0 | 10.0 | 10.0 | 10.0 | 10.0 | 10.0 | 10.0 | 10.0 | 10.0 | 10.0 |
| Additive | Acronal 4F | *3 | 4.8 | 4.8 | 4.8 | 4.8 | 4.8 | 4.8 | 4.8 | 4.8 | 4.8 | 4.8 |

*Except for "Ratio of Curing Agents", all numerical values are "by weight". (The amounts of Compound (III-1), Polyol and Curing Agent are all by weight of the solid content.)
*1 HDI: Hexamethylene diisocyanate
Hydrogenated MDI: Hydrogenated 4,4'-diphenylmethane diisocyanate
TDI: Tolylene diisocyanate
IPDI: Isophorone diisocyanate
MDI: 4,4'-Diphenylmethane diisocyanate
*2 10% Solution of dibutyl tin dilaurate in cyclohexanone
*3 50% Solution of Acronal 4F in cyclohexanone

TABLE 53

| Comparative Sample No. | | | 1 | 2 | 3 | 4 | 5 | 6 | 7 | 8 | 9 | 10 |
|---|---|---|---|---|---|---|---|---|---|---|---|---|
| Properties of Coating Film | Appearance | | Good | Good | Good | Good | Good | Good | Good | Good | Good | Good |
| | Gloss | | ◎ | ◎ | ◎ | ◎ | ◎ | ◎ | ◎ | ◎ | ◎ | ◎ |
| | Pencil Hardness | | F | H+ | F | 2H | H | 2H | F | F | H+ | H+ |
| | Workability | Workability Test 1 | 0T | 1T | 0T | 2T | 2T | 2T | 0T | 0T | 3T | 4T |
| | | Workability Test 2 | 0T | 3T | 1T | 4T | 5T | 6T | 0T | 0T | 6T | 7T |
| | Impact Resistance (kg · cm) | | >75 | 50 | 50 | 45 | 40 | 40 | >75 | >75 | 40 | 40 |
| | MEK Rubbing Test (number of rubbings) | | 70 | >100 | 75 | >100 | 80 | >100 | 65 | 70 | >100 | >100 |
| | Stain Resistance | Red | X | ○ | X | ○ | Δ | ◎ | X | X | ○ | ◎ |
| | to oily ink (ΔE) | Black | ○ | ◎ | ○ | ◎ | ○ | ◎ | Δ | Δ | ◎ | ◎ |

TABLE 54

| Comparative Sample No. | | | 11 | 12 | 13 | 14 | 15 | 16 | 17 | 18 |
|---|---|---|---|---|---|---|---|---|---|---|
| Compound (III-2) | | | 3.0 | 3.0 | 7.0 | 7.0 | 5.0 | 5.0 | 12.0 | 12.0 |
| Polyol | Polyol (1) | | — | — | 49.0 | 50.3 | — | — | — | — |
| | Polyol (2) | | 56.9 | 45.2 | — | — | — | — | — | — |
| | Polyol (3) | | — | — | — | — | 65.6 | 56.1 | — | — |
| | Polyol (4) | | — | — | — | — | — | — | 38.3 | 33.5 |
| Curing Agent *1 | HDI Prepolymer | | — | — | — | — | — | — | — | — |
| | HDI Isocyanurate | | — | — | — | — | 29.4 | — | 49.7 | — |
| | Hydrogenated MDI Prepolymer | | 40.1 | — | 44.0 | — | — | — | — | — |
| | TDI Prepolymer | | — | 51.8 | — | — | — | — | — | — |
| | IPDI Isocyanurate | | — | — | — | 42.7 | — | — | — | 54.5 |
| | MDI Adduct | | — | — | — | — | — | 38.9 | — | — |
| Pigment | Rutile-type Titanium Oxide | | 100.0 | 100.0 | 100.0 | 100.0 | 100.0 | 100.0 | 100.0 | 100.0 |
| Catalyst | DBTDL | *2 | 10.0 | 10.0 | 10.0 | 10.0 | 10.0 | 10.0 | 10.0 | 10.0 |
| Additive | Acronal 4F | *3 | 4.8 | 4.8 | 4.8 | 4.8 | 4.8 | 4.8 | 4.8 | 4.8 |

*Except for "Ratio of Curing Agents", all numerical values are "by weight". (The amounts of Compound (II-2), (II-3), Polyol and Curing Agent are all by weight of the solid content.)
*1 HDI: Hexamethylene diisocyanate
Hydrogenated MDI: Hydrogenated 4,4'-diphenylmethane diisocyanate
TDI: Tolylene diisocyanate
IPDI: Isophorone diisocyanate
MDI: 4,4'-Diphenylmethane diisocyanate
*2 10% Solution of dibutyl tin dilaurate in cyclohexanone
*3 50% Solution of Acronal 4F in cyclohexanone

TABLE 55

| Comparative Sample No. | | | 11 | 12 | 13 | 14 | 15 | 16 | 17 | 18 |
|---|---|---|---|---|---|---|---|---|---|---|
| Properties of Coating Film | Appearance | | Good | Good | Good | Good | Good | Good | Good | Good |
| | Gloss | | ⊚ | ⊚ | ⊚ | ⊚ | ⊚ | ⊚ | ⊚ | ⊚ |
| | Pencil Hardness | | F | H | F | 2H | HB | H | H | 2H |
| | Workability | Workability Test 1 | 0T | 2T | 0T | 2T | 0T | 2T | 2T | 4T |
| | | Workability Test 2 | 2T | 5T | 2T | 5T | 1T | 7T | 4T | 6T |
| | Impact Resistance (kg · cm) | | 70 | 40 | >75 | 40 | >75 | 40 | 70 | 40 |
| | MEK Rubbing Test (number of rubbings) | | 90 | >100 | 75 | >100 | 70 | >100 | >100 | >100 |
| | Stain Resistance | Red | X | ○ | X | ○ | X | ○ | Δ | ○ |
| | to oily ink (ΔE) | Black | ○ | ⊚ | ○ | ⊚ | ○ | ⊚ | ○ | ⊚ |

TABLE 56

| Sample No. of the Invention | | | 19 | 20 | 21 | 22 | 23 | 24 | 25 |
|---|---|---|---|---|---|---|---|---|---|
| Compound (III-1) | | | 0.3 | 18.0 | — | 5.0 | 5.0 | — | — |
| Compound (III-2) | | | — | — | 18.0 | — | — | 5.0 | 5.0 |
| Polyol | Polyol (1) | | 62.2 | 35.8 | — | 57.5 | 53.2 | — | — |
| | Polyol (2) | | — | — | — | — | — | — | — |
| | Polyol (3) | | — | — | — | — | — | — | — |
| | Polyol (4) | | — | — | 25.7 | — | — | 40.3 | 38.3 |
| Curing Agent *1 | HDI Prepolymer | | — | — | 30.5 | — | — | 27.4 | — |
| | HDI Isocyanurate | | — | — | — | 18.8 | — | — | — |
| | Hydrogenated MDI Prepolymer | | 18.7 | 23.1 | — | 18.8 | — | 27.4 | — |
| | TDI Prepolymer | | — | — | — | — | — | — | 28.3 |
| | IPDI Isocyanurate | | 18.7 | 23.1 | 25.8 | — | 20.9 | — | 28.3 |
| | MDI Adduct | | — | — | — | — | 20.9 | — | — |
| Pigment | Rutile-type Titanium Oxide | | 100.0 | 100.0 | 100.0 | 100.0 | 100.0 | 100.0 | 100.0 |
| Catalyst | DBTDL | *2 | 10.0 | 10.0 | 10.0 | 10.0 | 10.0 | 10.0 | 10.0 |
| Additive | Acronal 4F | *3 | 4.8 | 4.8 | 4.8 | 4.8 | 4.8 | 4.8 | 4.8 |
| Ratio of Curing Agents, (A)/(B) | | *4 | 50/50 | 50/50 | 50/50 | 50/50 | 50/50 | 50/50 | 50/50 |

*Except for "Ratio of Curing Agents", all numerical values are "by weight". (The amounts of Compound (III-1), (III-2), Polyol and Curing Agent are all by weight of the solid content.)
*1 HDI: Hexamethylene diisocyanate
Hydrogenated MDI: Hydrogenated 4,4'-diphenylmethane diisocyanate
TDI: Tolylene diisocyanate
IPDI: Isophorone diisocyanate
MDI: 4,4'-Diphenylmethane diisocyanate
*2 10% Solution of dibutyl tin dilaurate in cyclohexanone
*3 50% Solution of Acronal 4F in cyclohexanone
*4 Ratio by weight of blocked polyisocyanate compound in group (a) defined herein to that in group (b) defined herein

TABLE 57

| Comparative Sample No. | | | 19 | 20 | 21 | 22 | 23 | 24 | 25 |
|---|---|---|---|---|---|---|---|---|---|
| Properties of Coating Film | Appearance | | Good | Not Good | Not Good | Good | Good | Good | Good |
| | Gloss | | ⊚ | Δ | Δ | ⊚ | ○ | ⊚ | ○ |
| | Pencil Hardness | | H | 2H | 2H | HB | 2H | F | 2H |
| | Workability | Workability Test 1 | 1T | 3T | 4T | 0T | 3T | 0T | 4T |
| | | Workability Test 2 | 3T | 7T | 7T | 2T | 7T | 3T | 7T |
| | Impact Resistance (kg · cm) | | >75 | 45 | 40 | >75 | 40 | >75 | 35 |
| | MEK Rubbing Test (number of rubbings) | | 80 | >100 | >100 | 70 | >100 | 70 | >100 |
| | Stain Resistance | Red | Δ | Δ | Δ | X | ⊚ | X | ⊚ |
| | to oily ink (ΔE) | Black | ○ | ○ | ○ | ○ | ⊚ | ○ | ⊚ |

TABLE 58

| Comparative Sample No. | | | 26 | 27 | 28 | 29 |
|---|---|---|---|---|---|---|
| Compound (III-1) | | | 5.0 | 5.0 | 5.0 | 5.0 |
| Polyol | Polyol (1) | | 54.8 | 55.5 | 66.1 | 51.5 |
| | Polyol (2) | | — | — | — | — |
| | Polyol (3) | | — | — | — | — |
| | Polyol (4) | | — | — | — | — |
| Curing Agent *1 | HDI Prepolymer | | — | — | — | — |
| | HDI Isocyanurate | | — | — | 14.4 | 21.8 |
| | Hydrogenated MDI Prepolymer | | 32.1 | 7.9 | — | — |
| | TDI Prepolymer | | — | — | — | — |
| | IPDI Isocyanurate | | 8.0 | 31.6 | — | — |
| | MDI Adduct | | — | — | 14.4 | 21.8 |
| Pigment | Rutile-type Titanium Oxide | | 100.0 | 100.0 | 100.0 | 100.0 |
| Catalyst | DBTDL | *2 | 10.0 | 10.0 | 10.0 | 10.0 |
| Additive | Acronal 4F | *3 | 4.8 | 4.8 | 4.8 | 4.8 |
| Ratio of Curing Agents, (A)/(B) | | *4 | 20/80 | 80/20 | 50/50 | 50/50 |

*Except for "Ratio of Curing Agents", all numerical values are "by weight". (The amounts of Compound (III-1), Polyol and Curing Agent are all by weight of the solid content.)
*1 HDI: Hexamethylene diisocyanate
Hydrogenated MDI: Hydrogenated 4,4'-diphenylmethane diisocyanate
TDI: Tolylene diisocyanate
IPDI: Isophorone diisocyanate
MDI: 4,4'-Diphenylmethane diisocyanate
*2 10% Solution of dibutyl tin dilaurate in cyclohexanone
*3 50% Solution of Acronal 4F in cyclohexanone
*4 Ratio by weight of blocked polyisocyanate compound in group (a) defined herein to that in group (b) defined herein

TABLE 59

| Comparative Sample No. | | | 26 | 27 | 28 | 29 |
|---|---|---|---|---|---|---|
| Properties of Coating Film | Appearance Gloss | | Good | Good | Good | Good |
| | Pencil Hardness | | F | 2H | F | H+ |
| | Workability | Workability Test 1 | 0T | 2T | 0T | 1T |
| | | Workability Test 2 | 1T | 4T | 0T | 4T |
| | Impact Resistance (kg · cm) | | 50 | 45 | >75 | 45 |
| | MEK Rubbing Test (number of rubbings) | | 75 | >100 | 65 | >100 |
| | Stain Resistance | Red | X | ○ | X | ○ |
| | to oily ink (ΔE) | Black | ○ | ◎ | Δ | ◎ |

TABLE 60

[Topcoating Composition]

| Composition Code | | | C-5 |
|---|---|---|---|
| Compound (III-1) (wt. pts.) | | | 5.0 |
| Polyol | Polyester polyol (wt. pts.) | *1 | 55.2 |
| Curing Agent | Hydrogenated MDI Prepolymer | *2 | 19.9 |
| | IPDI Isocyanurate | *3 | 19.9 |
| Pigment | Rutile-type Titanium Oxide (wt. pts.) | *4 | 100.0 |
| Catalyst | DBTDL (wt. pts.) | *5 | 10.0 |
| Additive | Acronal 4F (wt. pts.) | *6 | 4.8 |

*1 This has a number-average molecular weight of about 3000, and a solid content of 70%
*2 Hydrogenated 4,4'-diphenylmethane diisocyanate prepolymer block
*3 Isophorone diisocyanate-isocyanurate block
*4 Taipake R-820 (produced by Ishihara Sangyo KK)
*5 10% Solution of dibutyl tin dilaurate in cyclohexanone
*6 50% Solution of Acronal 4F (produced by BASF) in cyclohexanone

TABLE 61

| Sample No. of the Invention | | 1 | 2 | 3 | 4 | 5 | 6 |
|---|---|---|---|---|---|---|---|
| Prime Coating Film | Composition Code *1 | A-1 | A-2 | A-2 | A-2 | A-3 | A-4 |
| | Thickness (μm) | 5 | 2 | 5 | 12 | 5 | 5 |
| Topcoating Film | Composition Code *2 | C-5 | C-5 | C-5 | C-5 | C-5 | C-5 |
| | Thickness (μm) | 15 | 15 | 15 | 15 | 15 | 15 |
| Baking Temperature (° C.) | for prime coating film | 210 | 210 | 210 | 210 | 210 | 210 |
| *3 | for topcoating film | 230 | 230 | 230 | 230 | 230 | 230 |

TABLE 61-continued

| Sample No. of the Invention | | 1 | 2 | 3 | 4 | 5 | 6 |
|---|---|---|---|---|---|---|---|
| Appearance | | Good | Good | Good | Good | Good | Good |
| Pencil Hardness | | 2H | 2H | 2H | 2H | 2H | 2H |
| Workability Test 3 | 0T | ○ | ⊚ | ⊚ | ○ | ○ | ⊚ |
| | 1T | ⊚ | ⊚ | ⊚ | ⊚ | ⊚ | ⊚ |
| Adhesiveness | | ⊚ | ⊚ | ⊚ | ⊚ | ⊚ | ⊚ |

*1 Composition code in Tables 18 and 19
*2 Composition code in Table 60
*3 Peak metal temperature of sheet

TABLE 62

| Sample No. of the Invention | | 7 | 8 | 9 | 10 | 11 | 12 |
|---|---|---|---|---|---|---|---|
| Prime Coating Film | Composition Code *1 | B-1 | B-2 | B-2 | B-2 | B-3 | B-4 |
| | Thickness (μm) | 5 | 2 | 5 | 12 | 5 | 5 |
| Topcoating Film | Composition Code *2 | C-5 | C-5 | C-5 | C-5 | C-5 | C-5 |
| | Thickness (μm) | 15 | 15 | 15 | 15 | 15 | 15 |
| Baking Temperature (° C.) | for prime coating film | 210 | 210 | 210 | 210 | 210 | 210 |
| *3 | for topcoating film | 230 | 230 | 230 | 230 | 230 | 230 |
| Appearance | | Good | Good | Good | Good | Good | Good |
| Pencil Hardness | | 2H | 2H | 2H | 2H | 2H | 2H |
| Workability Test 3 | 0T | ⊚ | ⊚ | ⊚ | ○ | ⊚ | ○ |
| | 1T | ⊚ | ⊚ | ⊚ | ⊚ | ⊚ | ⊚ |
| Adhesiveness | | ⊚ | ⊚ | ⊚ | ⊚ | ⊚ | ⊚ |

*1 Composition code in Tables 18 and 19
*2 Composition code in Table 60
*3 Peak metal temperature of sheet

TABLE 63

[Topcoating Composition]

| Composition Code | | | C-6 |
|---|---|---|---|
| Compound (III-1) (wt. pts.) | | | 5.0 |
| Polyol | Polyester Polyol (wt. pts.) | *1 | 51.7 |
| Curing Agent | Hydrogenated MDI Prepolymer | *2 | 21.7 |
| | IPDI Isocyanurate | *3 | 21.7 |
| Pigment | Rutile-type Titanium Oxide (wt. pts.) | *4 | 100.0 |
| Catalyst | DBTDL (wt. pts.) | *5 | 10.0 |
| Additive | Acronal 4F (wt. pts.) | *6 | 4.8 |

*1 This has a number-average molecular weight of about 3000, and a solid content of 70%
*2 Hydrogenated 4,4'-diphenylmethane diisocyanate prepolymer block
*3 Isophorone diisocyanate-isocyanurate block
*4 Taipake R-820 (produced by Ishihara Sangyo KK)
*5 10% Solution of dibutyl tin dilaurate in cyclohexanone
*6 50% Solution of Acronal 4F (produced by BASF) in cyclohexanone

TABLE 64

| Sample No. of the Invention | | | 1 | 2 | 3 | 4 | 5 |
|---|---|---|---|---|---|---|---|
| Prime Coating Film | Composition Code | *1 | P-1 | P-1 | P-1 | P-2 | P-2 |
| | Thickness (μm) | | 2 | 5 | 12 | 2 | 5 |
| Topcoating Film | Composition Code | *2 | C-6 | C-6 | C-6 | C-6 | C-6 |
| | Thickness (μm) | | 15 | 15 | 15 | 15 | 15 |
| Strontium Chromate Content of Prime coating Film per μm of thickness (g/m²) | | | 0.06 | 0.06 | 0.06 | 0.24 | 0.24 |
| Baking Temperature (° C.) | | *3 | 230 | 230 | 230 | 230 | 230 |
| Appearance | | | Good | Good | Good | Good | Good |
| Pencil Hardness | | | 2H | 2H | H | 2H | 2H |
| Workability (0T) | | | ⊚ | ⊚ | ⊚ | ⊚ | ⊚ |
| Adhesiveness | | | ⊚ | ⊚ | ⊚ | ⊚ | ⊚ |
| Corrosion Resistance in Flat Area | | | ○ | ○ | ⊚ | ○ | ⊚ |

*1 Composition code in Table 23
*2 Composition code in Table 63
*3 Peak metal temperature of sheet

TABLE 65

| Sample No. of the Invention | | | 6 | 7 | 8 | 9 | 10 |
|---|---|---|---|---|---|---|---|
| Prime Coating Film | Composition Code | *1 | P-2 | P-3 | P-3 | P-4 | P-4 |
| | Thickness (μm) | | 12 | 5 | 12 | 5 | 12 |
| Topcoating Film | Composition Code | *2 | C-6 | C-6 | C-6 | C-6 | C-6 |
| | Thickness (μm) | | 15 | 15 | 15 | 15 | 15 |
| Strontium Chromate Content of Prime coating Film per μm of thickness (g/m²) | | | 0.24 | 0.06 | 0.06 | 0.24 | 0.24 |
| Baking Temperature (° C.) | | *3 | 230 | 230 | 230 | 230 | 230 |
| Appearance | | | Good | Good | Good | Good | Good |
| Pencil Hardness | | | H | 2H | H | 2H | H |
| Workability (0T) | | | ⊚ | ⊚ | ○ | ⊚ | ○ |
| Adhesiveness | | | ⊚ | ⊚ | ⊚ | ⊚ | ⊚ |
| Corrosion Resistance in Flat Area | | | ⊚ | ○ | ⊚ | ⊚ | ⊚ |

*1 Composition code in Table 23
*2 Composition code in Table 63
*3 Peak metal temperature of sheet

TABLE 66

| Sample No. of the Invention | | | 1 | 2 | 3 | 4 | 5 | 6 | 7 | 8 |
|---|---|---|---|---|---|---|---|---|---|---|
| Topcoating Film | Composition Code | *1 | C-5 | C-5 | C-5 | C-5 | C-5 | C-5 | C-5 | C-5 |
| | Wax  Wax Code | *2 | a | b | c | d | a | a | b | b |
| |     Amount Added | *3 | 2.0 | 2.0 | 2.0 | 2.0 | 1.0 | 5.0 | 1.0 | 5.0 |
| | Film Thickness (μm) | | 15 | 15 | 15 | 15 | 15 | 15 | 15 | 15 |
| | Baking Temperature (° C.) | *4 | 230 | 230 | 230 | 230 | 230 | 230 | 230 | 230 |
| Appearance | | | Good | Good | Good | Good | Good | Good | Good | Good |
| Pencil Hardness | | | 2H | 2H | 2H | 2H | 2H | 2H | 2H | 2H |
| Roll Abrasion Resistance | | | ⊚ | ⊚ | ⊚ | ○ | ○ | ⊚ | ○ | ⊚ |
| Cylinder Drawing Workability | | | ⊚ | ⊚ | ⊚ | ○ | ○ | ⊚ | ○ | ⊚ |
| Repetitive Abrasion Resistance | | | >100 | >100 | >100 | >100 | >100 | >100 | >100 | >100 |

*1 Composition code in Table 60
*2 Wax code in Table 27
*3 Amount (wt. pts.) in terms of the solid content, relative to 100 parts by weight of composition in Table 60
*4 Peak metal temperature of sheet

What is claimed is:

1. A coating composition for precoated steel sheets, which consists essentially of a resin component comprising the following i), ii) and iii):

i) from 1 to 15% by weight, relative to the solid resin content of the composition, of a polyester compound comprising main repeating units of a chemical formula:

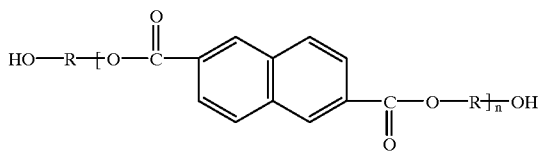

wherein n represents an integer of 1 or more; and R represents an alkylene group having 10 or less carbon atoms, or a 1,4-cyclohexylene-dimethylene group, or a neopentylene group, or a polyoxyalkylene group;

ii) a polyol except i); and iii) a curing agent of a mixture composed of a blocked polyisocyanate compound (A) as obtained by blocking one or more polyisocyanate compounds selected from polyisocyanate of the following group (a), and a blocked polyisocyanate compound (B) as obtained by blocking one or more polyisocyanate compounds selected from polyisocyanates of the following group (b), in a ratio by weight in terms of the solid contents, (A)/(B), of from 70/30 to 30/70:

(a) 4,4'-diphenylmethane diisocyanate, isophorone diisocyanate, tolylene diisocyanate, xylylene diisocyanate, naphthalene-1,5-diisocyanate;

(b) hexamethylene diiisocyanate, trimethylhexamethylene diisocyanate, hydrogenated 4,4'-diphenylmethane diisocyanate, hydrogenated tolylene diisocyanate, hydrogenated xylylene diisocyanate, with the amount of the curing agent of iii) being so defined that the ratio by mol of the isocyanato groups, (NCO), in the curing agent to the total of the hydroxyl groups, (OH), in the polyester compound of i) and the polyol of (ii), (NCO)/(OH), is from 0.8 to 1.2.

2. A coating composition for precoated steel sheets, which consists essentially of a resin component comprising the following i), ii) and iii):

i) from 1 to 18% by weight, relative to the solid resin content of the composition, of a polyester compound comprising main repeating units of a chemical formula:

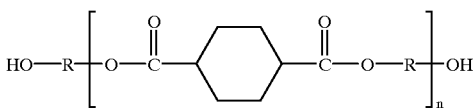

wherein n represents an integer of 1 or more; and R represents an alkylene group having 10 or less carbon atoms, or a 1,4-cyclohexylene-dimethylene group, or a neopentylene group, or a polyoxyalkylene group;

ii) a polyol except i); and iii) a curing agent of a mixture composed of a blocked polyisocyanate compound (A) as obtained by blocking one or more polyisocyanate compounds selected from polyisocyanate of the following group (a), and a blocked polyisocyanate compound (B) as obtained by blocking one or more polyisocyanate compounds selected from polyisocyanates of the following group (b), in a ratio by weight in terms of the solid contents, (A)/(B). of from 70/30 to 30/70:

(a) 4,4'-diphenylmethane diisocyanate, isophorone diisocyanate, tolylene diisocyanate, xylylene diisocyanate, naphtdalene-1,5-diisocyanate;

(b) hexamethylene diiisocyanate, trimethylhexamethylene diisocyanate, hydrogenated 4,4'-diphenylmethane diisocyanate, hydrogenated tolylene diisocyanate, hydrogenated xylylene diisocyanate, with the amount of the curing agent of iii) being so defined that the ratio by mol of the isocyanato groups, (NCO), in the curing agent to the total of the hydroxyl groups, (OH), in the polyester compound of i) and the polyol of (ii), (NCO)/(OH), is from 0.8 to 1.2.

3. A coating composition for precoated steel sheets, which consists essentially of a resin component comprising the following i), ii) and iii):

i) from 1 to 15% by weight, relative to the solid resin content of the composition, of a compound of a chemical formula:

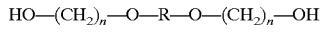

wherein n represents an integer of from 2 to 10; and R represents

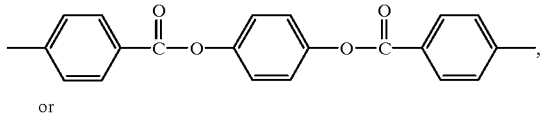

or

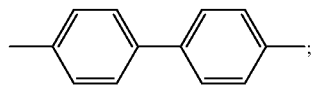

ii) a polyol except i); and iii) a curing agent of a mixture composed of a blocked polyisocyanate compound (A) as obtained by blocking one or more polyisocyanate compounds selected from polyisocyanate of the following group (a), and a blocked polyisocyanate compound (B) as obtained by blocking one or more polyisocyanate compounds selected from polyisocyanates of the following group (b), in a ratio by weight in terms of the solid contents, (A)/(B), of from 70/30 to 30/70:

(a) 4,4'-diphenylmethane diisocyanate, isophorone diisocyanate, tolylene diisocyanate, xylylene diisocyanate, naphthalene-1,5-diisocyanate;

(b) hexamethylene diiisocyanate, trimethylhexamethylene diisocyanate, hydrogenated 4,4'-diphenylmethane diisocyanate, hydrogenated tolylene diisocyanate, hydrogenated xylylene diisocyanate, with the amount of the curing agent of iii) being so defined that the ratio by mol of the isocyanato groups, (NCO), in the curing agent to the total of the hydroxyl groups, (OH), in the polyester compound of i) and the polyol of (ii), (NCO)/(OH), is from 0.8 to 1.2.

4. The coating composition for precoated steel sheets as claimed in claim 1, 2, or 3, wherein the blocked polyisocyanate compound (A) as obtained by blocking the polyisocyanate compound selected from polyisocyanates of the group (a) is any of isocyanurates, adducts and prepolymers, and the blocked polyisocyanate compound (B) as obtained by blocking the polyisocyanate compound selected from polyisocyanates of the group (b) is any of biuret, isocyanurates, adducts and prepolymers.

5. The coating composition for precoated steel sheets as claimed in claim 1, 2 or 3, wherein the polyol except i) comprises an acrylic resin having 2 or more hydroxyl groups in one molecule and having a number-average molecular weight of from 1500 to 12000, and/or a polyester resin having 2 or more hydroxyl groups in one molecule and having a number-average molecular weight of from 1000 to 8000.

6. A precoated steel sheet having a coating film formed from a coating composition of claim 1, 2, or 3.

7. A precoated steel sheet, which has a prime coating film and a topcoating film formed on the chemically-treated surface of a zinc or zinc alloy plated steel sheet substrate and in which the topcoating film is formed from a coating composition of claim 1, 2, or 3.

8. The precoated steel sheet as claimed in claim 7, wherein the prime coating film has a breaking strength of not smaller than 50 kg/cm$^2$ and a breaking elongation of not smaller than 50%, when measured in the form of the film having a width of 5 mm and a thickness of 8±1 μm.

9. The precoated steel sheet as claimed in claim 8, wherein the prime coating film is formed from a coating composition consisting essentially of a bisphenol A-added polyester resin.

10. The precoated steel sheet as claimed in claim 7, wherein the prime coating film contains strontium chromate in an amount of from 0.06 to 0.26 g/m$^2$ of the film of 1 μm thick.

11. The precoated steel sheet as claimed in claim 10, wherein the prime coating film is formed from a coating composition consisting essentially of a polyester resin.

12. The precoated steel sheet as claimed in claim 7, wherein the prime coating film has a dry film thickness of from 2 to 12 μm.

13. The precoated steel sheet as claimed in claim 7, wherein the topcoating film contains wax in an amount of from 0.3 to 30 parts by weight, relative to 100 parts by weight of the solid content of the coating composition exclusive of wax.

14. The precoated steel sheet as claimed in claim 13, wherein the wax to be in the topcoating film has a melting point of not lower than 100° C.

15. The precoated steel sheet as claimed in claim 13, wherein the wax to be in the topcoating film is a mixture composed of polyethylene wax and polytetrafluoroethylene.

16. A method for producing precoated steel sheets, which comprises applying a prime coating composition onto the chemically-treated surface of a zinc or zinc alloy plated steel sheet, then baking it at a peak metal temperature of from 180 to 260° C., then applying thereto a topcoating composition of claim 1, 2, or 3, and thereafter baking it at a peak metal temperature of from 180 to 260° C.

* * * * *